US009375979B2

(12) United States Patent
Karashima et al.

(10) Patent No.: US 9,375,979 B2
(45) Date of Patent: Jun. 28, 2016

(54) WHEEL COVER

(75) Inventors: Yuta Karashima, Miyoshi (JP); Kenji Abe, Toyota (JP); Masatsugu Sasagawa, Toyota (JP); Toshiyuki Tetsuda, Nisshin (JP); Satoru Tsurubuchi, Toyota (JP); Tomoaki Kume, Toyota (JP); Yasuo Noji, Toyota (JP); Yasuhiro Kuraoka, Toyota (JP)

(73) Assignees: TOYOTA JIDOSHA KABUSHIKI KAISHA, Toyota-Shi (JP); PLAMAC CO., LTD., Toyota (JP)

( * ) Notice: Subject to any disclaimer, the term of this patent is extended or adjusted under 35 U.S.C. 154(b) by 114 days.

(21) Appl. No.: 14/127,785

(22) PCT Filed: Jun. 21, 2012

(86) PCT No.: PCT/IB2012/001233

§ 371 (c)(1), (2), (4) Date: Feb. 25, 2014

(87) PCT Pub. No.: WO2012/176049

PCT Pub. Date: Dec. 27, 2012

(65) Prior Publication Data

US 2014/0167491 A1 Jun. 19, 2014

(30) Foreign Application Priority Data

Jun. 23, 2011 (JP) ................................ 2011-139215
Nov. 10, 2011 (JP) ................................ 2011-246327

(51) Int. Cl.
*B60B 1/08* (2006.01)
*B60B 7/06* (2006.01)
(Continued)

(52) U.S. Cl.
CPC ... *B60B 7/06* (2013.01); *B60B 7/00* (2013.01); *B60B 7/008* (2013.01); *B60B 7/04* (2013.01); *B60B 7/066* (2013.01); *B60B 7/18* (2013.01); *B60B 7/08* (2013.01)

(58) Field of Classification Search
CPC ............ B60B 7/04; B60B 7/066; B60B 7/061
USPC ...................... 301/37.23, 37.24, 37.26, 37.31
See application file for complete search history.

(56) References Cited

U.S. PATENT DOCUMENTS 4,235,476 A * 11/1980 Arvidsson ................ B60B 7/04 301/108.1
4,295,685 A * 10/1981 Spisak ...................... B60B 7/10 301/108.3
(Continued)

FOREIGN PATENT DOCUMENTS

CN 200992110 Y 12/2007
DE 29511347 U1 11/1995
(Continued)

OTHER PUBLICATIONS

Japanese Patent Office, International Search Report issued in International Application No. PCT/IB2012/001233, mailed Oct. 10, 2012.

*Primary Examiner* — Jeffrey J Restifo
(74) *Attorney, Agent, or Firm* — Kenyon & Kenyon LLP

(57) ABSTRACT

When removing a wheel cover from a wheel, force in an inner peripheral direction is applied to one end portion of an engaging member. The engaging member pivots (including elastically deforms) about the other end portion, such that an engaging protruding portion pivots and comes away from an engagable protruding portion. As a result, a center attaching portion is able to be removed from an ornament receiving hole, thus enabling the wheel cover to be removed from the wheel.

21 Claims, 40 Drawing Sheets

(51) Int. Cl.

| | |
|---|---|
| ***B60B 7/00*** | (2006.01) |
| ***B60B 7/04*** | (2006.01) |
| ***B60B 7/18*** | (2006.01) |
| *B60B 7/08* | (2006.01) |

(56) References Cited

U.S. PATENT DOCUMENTS

| | | | | | |
|---|---|---|---|---|---|
| 5,039,172 | A * | 8/1991 | Krieger | B60B 7/02 | 118/505 |
| 5,435,631 | A * | 7/1995 | Maloney | B60B 7/00 | 301/37.36 |
| 5,443,582 | A * | 8/1995 | Ching | B60B 7/14 | 301/37.26 |
| 5,992,942 | A * | 11/1999 | Passoth | B60B 3/16 | 301/37.102 |
| 6,238,007 | B1 * | 5/2001 | Wieczorek | B60B 7/0013 | 301/37.31 |
| 6,270,167 | B1 * | 8/2001 | Kemmerer | B60B 7/0013 | 301/37.36 |
| 6,428,112 | B1 * | 8/2002 | Passoth | B60B 7/02 | 301/37.102 |
| 6,857,708 | B2 * | 2/2005 | Hartl | B60B 7/04 | 301/108.1 |
| 7,396,087 | B1 * | 7/2008 | Baker | B60B 7/0013 | 301/37.24 |
| 2007/0228807 | A1 * | 10/2007 | Leslie | B60B 7/0013 | 301/37.26 |
| 2008/0265655 | A1 * | 10/2008 | Doctor | B60B 3/002 | 301/37.26 |
| 2014/0103701 | A1 * | 4/2014 | Chung | B60B 3/008 | 301/108.1 |
| 2014/0152079 | A1 * | 6/2014 | Vickers | B60B 7/08 | 301/37.102 |
| 2014/0167491 | A1 * | 6/2014 | Karashima | B60B 7/00 | 301/37.102 |

FOREIGN PATENT DOCUMENTS

| | | | |
|---|---|---|---|
| EP | 0310777 | A1 | 4/1989 |
| EP | 0826520 | A2 | 3/1998 |
| GB | 2232129 | A | 12/1990 |
| GB | 2291017 | A | 1/1996 |
| JP | 02-138237 | U | 11/1990 |
| JP | 06-000802 | U | 1/1994 |
| JP | 09-132002 | A | 5/1997 |
| JP | 10-193903 | A | 7/1998 |
| JP | 3256213 | B1 | 2/2002 |
| JP | 2006-256360 | A | 9/2006 |

* cited by examiner

F I G . 29
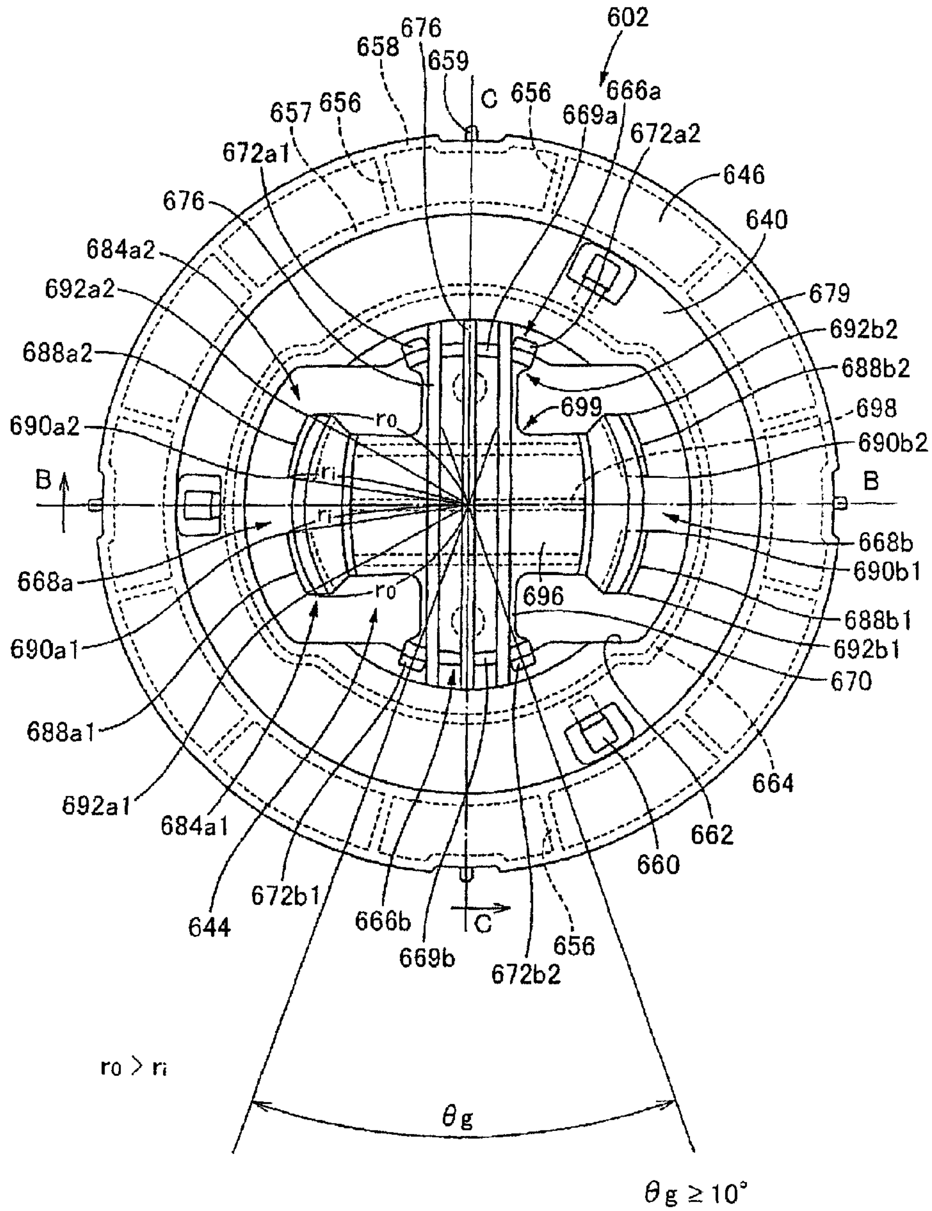

$\theta_h \geq 60°$ $$\frac{\theta_1 \times 4 + \theta_2 \times 4}{360} \geq 0.2$$

F I G . 32
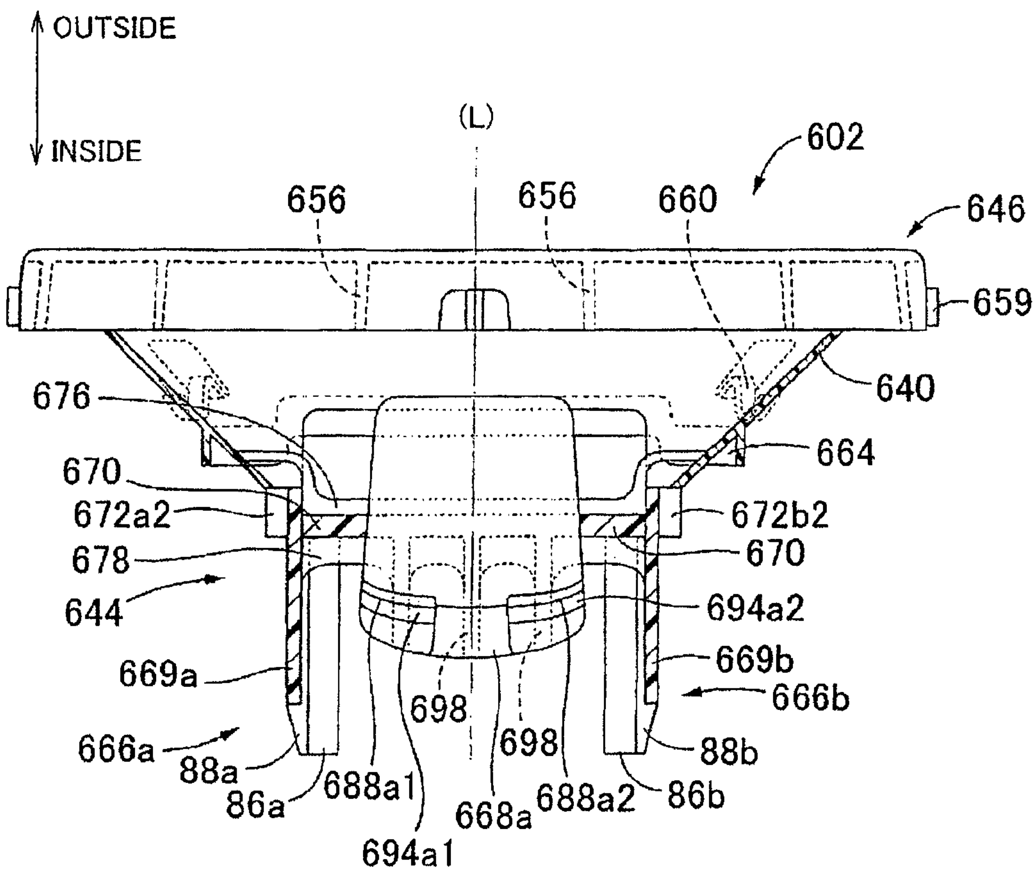

WHEEL COVER

CROSS REFERENCE TO RELATED APPLICATION

This is a national phase application based on the PCT International Patent Application No. PCT/IB2012/001233 filed on Jun. 21, 2012, claiming priority to Japanese application Nos. 2011-139215 filed Jun. 23, 2011, and 2011-246327 filed Nov. 10, 2011, the entire contents of all of which are incorporated herein by reference.

BACKGROUND OF THE INVENTION

1. Field of the Invention

The invention relates to a wheel cover to prevent corrosion, that covers at least a portion of an outside of a wheel.

2. Description of Related Art

Japanese Utility Model Application Publication No. 06-802 (JP 06-802 U) and Japanese Patent Application Publication No. 2006-256360 (JP 2006-256360 A) describe wheel covers that include, as separate members, a i) cover main body, and ii) a cover attaching portion that attaches the cover main body to a wheel. The cover main body is attached to the wheel by a cover attaching portion being inserted into a planned receiving hole to which a center ornament of the wheel attaches (hereinafter this receiving hole will simply be referred to as an "ornament receiving hole"), and an engaging protruding portion that is provided on the cover attaching member being engaged with an engageable protruding portion provided at the ornament receiving hole. Of these, the cover attaching portion described in JP 06-802 U includes a) a plurality of protruding members that extend in an axial direction and each of which has a pawl portion as an engaging protruding portion, and b) a disc-shaped retaining portion that retains these protruding members at an outer peripheral portion. The wheel cover is able to be attached to the wheel by the protruding members being passed through the cover main body, being inserted into the ornament receiving hole, and the pawl portions being engaged with the engageable protruding portion. Also, the wheel cover is able to be removed by the disc-shaped retaining portion being pulled on. The cover attaching portion described in JP 2006-256360 A includes a) a pair of protruding members that extend in an axial direction and in which engaging protruding portions are formed on an outer peripheral surface, b) a connecting rod that connects the pair of protruding members together at end portions thereof, and c) a driving member that is fixed to a center portion of the connecting rod and extends in the axial direction. When the driving member is pushed in the axial direction, pawl portions engage with engageable protruding portion, such that the wheel cover becomes attached to the wheel. Also, when the driving member is pulled in the axial direction, the connecting rod elastically deforms such that the distance between engaging protruding portions becomes smaller. The wheel cover is then able to be removed by separating the engaging protruding portions from the engageable protruding portion. Japanese Patent Application Publication No. 10-193903 (JP 10-193903 A), Japanese Patent Application Publication. No. 09-132002 (JP 09-132002 A), and Japanese Patent No. 3256213 (JP 3256213 B) describe wheel covers that include a) a cover member and b) a cover attaching member that is integrally provided with the cover member. An annular bead (i.e., a concavo-convex portion) is provided in a middle portion in a radial direction of the cover main body of each of these wheel covers. Also, JP 09-132002 A describes a cover member in which an outer peripheral edge abuts against a tire, and the portion that abuts against this tire is R-shaped.

SUMMARY OF THE INVENTION

The invention provides a wheel cover that can be used with a variety of types of wheels, and that has a structure that is different from the wheel covers according to the related art described above.

The wheel cover according to the invention is configured such that, when force in a direction intersecting an axis is applied to one end portion of an engaging member that extends in a direction substantially parallel to the axis, an engaging portion of the wheel cover comes away from an engagable portion of the wheel. When attaching or removing the wheel cover to or from the wheel, force in a direction intersecting the axis, not force parallel to the axis, is applied by a worker. Therefore, according to this structure, the engaging portion may be easily separated from the engagable portion. Also, when removing the wheel cover from the wheel, the load applied to the engaging portion is able to be reduced. Thus, the engaging portion will not be easily damaged, so the number of times that the wheel cover may be used is able to be increased. Moreover, the wheel cover is able to be used with a plurality of types of wheels as long as certain conditions, such as that the engaging portion of the wheel cover be able to engage with the engagable portion of the wheel, are satisfied.

A first aspect of the invention relates to a wheel cover that covers at least a portion of an outside of a wheel. This wheel cover includes i) a cover main body that has an annular shape, and ii) a cover attaching portion that attaches the cover main body to the wheel by being attached to the wheel on an inner peripheral side of the cover main body. The cover attaching portion includes a) a plurality of engaging members, each of which has an engaging portion that selectively engages with an engagable portion of the wheel, the plurality of engaging members extending in a direction that includes a component of a direction parallel to an axis of the cover attaching portion, and b) an engaging member retaining portion that holds the plurality of engaging members to the cover attaching portion at the other end portion of each of the engaging members, in a state where the engaging portion of each of the engaging members is separated from the engagable portion of the wheel when force in a direction intersecting the axis is applied to one end portion of each of the plurality of engaging members.

With this structure, the cover attaching portion is attached to the inner peripheral side of the cover main body, and a portion (i.e., a portion on the inner peripheral side) of the cover main body overlaps with a portion (i.e., a portion on the outer peripheral side) of the cover attaching portion. Also, the engaging members extend in a direction that includes a component of a direction that is parallel to the axis of the cover attaching portion. For example, the engaging members may extend substantially parallel to the axis. Also, the axis of the cover attaching portion is parallel (and is also aligned with) an axis (a center axis) of the wheel when the cover attaching portion is attached to the wheel. When attaching or removing the wheel cover to or from the wheel (hereinafter simply referred to as "during attachment/removal"), force in a direction intersecting the axis is applied by a worker to one end portion of the engaging member. It is preferable that force in a direction substantially orthogonal to the axis, i.e., force in a direction substantially parallel to the radial direction, for example, be applied. The engaging member retaining portion may be regarded as a portion that holds the engaging members to the main body of the cover attaching portion (hereinafter, simply referred to as the "attaching portion main body"), or regarded as a portion of the attaching portion main body or as a portion that includes the attaching portion main body.

Also, in the wheel cover according to the structure described above, the engagable portion of the wheel may include an engagable protruding portion provided on an inner peripheral surface of an insertion hole provided along a center axis of the wheel. Also, the cover attaching portion may be a center attaching portion that attaches the cover main body to the wheel by being inserted into the insertion hole, and the plurality of engaging members may each have an engaging protruding portion as the engaging portion provided in a state opposing at least a portion of the engagable protruding portion.

With this structure, an ornament receiving hole (i.e., a planned hole where a center ornament is attached; hereinafter the same), for example, may be used as the insertion hole. An engagable protruding portion that protrudes to the inner peripheral side and extends in the circumferential direction is provided on an inner peripheral surface of the ornament receiving hole. Also, the engagable protruding portion may be provided continuous (in an annular shape) in the circumferential direction, or provided at a portion (in an arc-shape) in the circumferential direction, or the like. The engaging portion may be regarded as representing individual engaging protruding portions or may be regarded as a portion that includes a plurality of engaging protruding portions.

Also, in the wheel cover according to the structure described above, each of the plurality of engaging members may have a shape that extends parallel to the axis, and the engaging members may be provided separated from each other in a circumferential direction. The engaging member retaining portion may hold the plurality of engaging members to the cover attaching portion at the other end portion, on an inner peripheral side of the plurality of engaging members, and be a rigid retaining portion that has a structure that is harder to deform in a radial direction of the cover attaching portion than the plurality of engaging members are.

With this structure, a plurality of engaging members are provided separated in the circumferential direction. For example, two may be provided in opposing positions (i.e., in positions separated by a center angle of 180°), three may be provided in positions separated by center angles of 120°, or four or more may be provided. Each of the plurality of engaging members extends substantially parallel to the axial direction, and one end portion is positioned at the open side of the insertion hole and is free. Also, the engaging protruding portions are provided on the other end portions, and are retained by the engaging member retaining portion. The engaging member retaining portion will not easily deform in the radial direction of the cover attaching portion. Therefore, when force in the inner peripheral direction is applied to the one end portions of the engaging members, the engaging members pivot (including elastically deform) about a portion near the other end portions, such that the engaging protruding portions move to the inner peripheral side and thus come away from the engagable protruding portion. The plurality of engaging members and the rigid retaining portion and the like may be regarded as forming pan inserting portion that is inserted into the insertion hole of the center attaching portion.

Also, in the wheel cover according to the structure described above, one end portions of the engaging members may be positioned to an outside in the axial direction of a portion where the engaging protruding portions are provided, and may be free.

With this structure, the outside in the axial direction (also simply referred to as the "outside") is the outside of the wheel when the wheel cover is attached to the wheel. In other words, the outside is the open side of the insertion hole when the cover attaching portion is inserted into the insertion hole of the wheel. Force in a direction intersecting the axis is applied to the outside of the engaging protruding portions, so the engaging protruding portions are able to easily pivot about the other end portions. As a result, the engaging protruding portions are able to be separated from the engagable portion.

Also, in the wheel cover according to the structure described above, the rigid retaining portion may include at least one reinforcing member that extends in the radial direction.

With this structure, having the reinforcing member be a plate-shaped member that extends in the longitudinal direction, for example, and providing this reinforcing member in a state such that the radial direction is the longitudinal direction enables deformation in the radial direction to be inhibited. When a pair of engaging members are provided in opposing positions, an engaging portion connecting member is a member that connects the pair of engaging members together in the radial direction, and the reinforcing member is provided on this engaging portion connecting member, a change in the distance in the radial direction between the pair of engaging members is able to be inhibited. As a result, even if force in the radial direction is applied to at least one of the engaging members, the engaging members will not easily come close together, so the engaging protruding portions will not easily separate from the engagable protruding portion. A single plate-shaped reinforcing member (e.g., a rib) may be provided, or a plurality thereof may be provided. However, deformation in the radial direction is better able to be inhibited when more, rather than fewer, of the reinforcing members are provided.

Also, in the wheel cover according to the structure described above, the rigid retaining portion may include an engaging portion connecting member that connects the plurality of engaging members together, and at least one reinforcing member that protrudes in the axial direction from the engaging portion connecting member, and extends in the longitudinal direction of the engaging portion connecting member.

Also, in the wheel cover according to the structure described above, the rigid retaining portion may also include a protruding portion connecting member that connects together in the radial direction portions of the plurality of engaging members where the engaging protruding portions are provided.

With this structure, a change in the distance in the radial direction between the engaging protruding portions is able to be inhibited, by directly connecting together portions of the engaging members where the engaging protruding portions are provided by the protruding portion connecting member. The protruding portion connecting member may be formed by a portion of at least one of the engaging portion connecting member and the reinforcing member described above, or it may be separate from the engaging portion connecting member and the reinforcing member. For example, when the protruding portion connecting member is formed by a portion of the reinforcing member, the engaging portion connecting member may be a member that is generally U-shaped, and the reinforcing member may be a flat plate member having a trapezoidal shape. If force that tries to bend the cover main body to the outside from the inside (i.e., force that tries to lift the cover main body up) is applied to the cover main body by wind or the like when the vehicle is transported with the wheel cover attached to the wheel, force from the inside toward the outside (i.e., force that tries to remove the cover attaching portion) will be consequently applied to the cover attaching portion. Therefore, if the engaging protruding portions are made so as not to easily deform in the inner peripheral direction (i.e., in a direction in which they come close to one another) at the cover attaching portion, the cover attaching portion will not easily come off.

Also, in the wheel cover according to the structure described above, the engaging member may also include a radial direction distance determining portion that, when a pair of the engaging members are provided in opposing positions and the cover attaching portion is provided between this pair of engaging members, inhibits the pair of engaging members from coming closer together when external force in the radial direction that acts between the pair of engaging members is smaller than a predetermined set value, and allows the pair of engaging members to come closer together when the external force is equal to or greater than the set value.

In this structure, the radial direction distance determining portion may include, for example, a first rod that is provided on one engaging member, extends in a direction that includes a radial direction component, and has a first abutting surface, and a second rod that is provided on the other engaging member, extends in a direction that includes a radial direction component, and has a second abutting surface. If, when the first abutting surface of the first rod is abutted against the second abutting surface of the second rod, external force in the radial direction that acts between the pair of engaging members is equal to or less than friction force generated between them, the pair of engaging members are inhibited from coming closer together. If the external force becomes greater than the friction force, sliding contact occurs between the first abutting surface and the second abutting surface, which allows the pair of engaging members to come closer together. For example, when force that tries to bend the cover main body outward is applied to the cover main body by wind or the like, outward force is also applied to the cover attaching portion, such that force that tries to bring the pair of engaging members closer together is applied. In this case, the force that tries to bring the pair of engaging members closer together, i.e., the force in the radial direction, is usually smaller than the set value. Therefore, the cover attaching portion is able to be better inhibited from being pulled of by wind or the like. Also, during attachment/detachment of the wheel cover to/from the wheel, force of equal to or greater than the set value is applied between the pair of engaging members by a worker. In this case, the pair of engaging members are allowed to come closer together.

In the wheel cover according to the structure described above, the center attaching portion may have a pair of the engaging members that oppose each other, and each of the pair of engaging members may have a curved shape. The one end portions may be positioned to the inner peripheral side of the other end portions, and the engaging member retaining portion may retain the pair of engaging members at the other end portions.

According to this structure, each of the engaging members is curved in a general U-shape, with the one end portion positioned on the inner peripheral side and the other end portion positioned on the outer peripheral side, and the engaging members being retained at the other end portions. When force toward the inner peripheral side is applied to the one end portions by a worker during attachment/removal, the engaging members pivot about the other end portions, such that the engaging protruding portions come away from the engagable protruding portion.

Also, in the wheel cover according to the structure described above, the one end portions may be connected together. According to this structure, connecting the one end portions together enables force in the direction that brings the one end portions closer together (i.e., force in the inner peripheral, direction) may easily be applied to both of the one end portions during attachment/removal, so operability may be improved.

Also, in the wheel cover according to the structure described above, the other end portions and the one end portions of the engaging members may be positioned on the open side of the insertion hole when the center attaching portion is inserted into the insertion hole, and the engaging protruding portions may be provided on the side opposite the open portion of the insertion hole near the curved portions of the engaging members. According to this structure, force in a direction intersecting the axis is applied to the outside of the engaging protruding portions during attachment/removal, so the engaging protruding portions may be easily pivoted about the other end portions, thus enabling the engaging protruding portions to be separated from the engagable protruding portion.

Also, in the wheel cover according to the structure described above, the engaging members may include reinforcing portions that protrude in the axial direction and extend in the longitudinal direction. According to this structure, when the engaging members themselves are made so as not to easily deform the radial direction, the engaging members are able to be better pivoted about the other end portions by force in the radial direction being applied to the one end portions, and the engaging protruding portions are able to be moved to the inner peripheral side by this pivoting.

Also, in the wheel cover according to the structure described above, each of the plurality of engaging members may include at least two engaging protruding portions provided separated by a gap in a circumferential direction, the engaging protruding portion serving as the engaging portion.

If the engaging members are pivoted about the other end portions when the engaging members are plate-shaped and only one engaging protruding portion that is an engaging portion is provided extending in the circumferential direction, the difference between the position in the axial direction of the end portion in the circumferential direction of the engaging protruding portion, and the position in the axial direction of the center portion of the engaging protruding portion will be large. Therefore, during attachment/removal, the engaging protruding portion may be unable be easily engaged with, or easily disengaged from, the engagable protruding portion. On the other hand, the difference in the positions in the axial direction of the end portion and the center portion may be decreased by reducing the width (i.e., the length in the circumferential direction) of the engaging members, as well as reducing the width of the engaging protruding portion. However, when the number of the engaging members is the same, the engaging portion of the engaging protruding portion and the engagable protruding portion is less, so the cover attaching portion may come off more easily when force toward the outside is applied to the cover attaching portion due to wind or the like. Also, while it is possible to reduce the width of the engaging members and increase their number, doing so would make the structure complex. Therefore, by providing an engaging protruding portion on both sides, separated by a gap in the center portion in the circumferential direction of each of the engaging members, the difference in the positions in the axial direction between both end portions in the circumferential direction of the engaging protruding portion may be reduced, thus facilitating engagement and disengagement. Also, a decrease in the engaging portion is inhibited, so even if outward force due to wind or the like is applied, the cover attaching portion will not come off easily. Moreover, the structure is able to be simple. For example, this technical characteristic may be employed when the length (width) in the circumferential direction of the engaging members is equal to or greater than a center angle of 25°, equal to or greater than a center angle of 30°, equal to or greater than a center angle of 40°, or equal to or greater than a center angle of 50°. This is because, as described above, when the width of the engaging members is small, there is little merit to employing the characteristic. Also, a plurality of the engaging members are provided in the circumferential direction, so the width is smaller than a center angle of 180°. An engaging protruding portion that extends continuous in the width direction may be provided on each of the engaging members, and one or more cutouts may also be provided on this engaging protruding portion.

Also, in the wheel cover according to the structure described above, an outer peripheral edge of each engaging protruding portion may be curved. According to this structure, the outer peripheral edge of the engaging protruding portion may have a shape that extends substantially along the inner peripheral surface of the insertion hole, i.e., that extends in a general arc-shape. Therefore, compared with when the outer peripheral edge has a shape that extends linearly, the entire engaging protruding portion is able to engage with the engagable protruding portion formed at the insertion hole.

Also, in the wheel cover according to the structure described above, each of the plurality of engaging members may include a pair of the engaging protruding portions, and each of the pair of engaging protruding portions may have a shape in which, on an outer peripheral edge of the engaging protruding portion, a distance, from the axis, of an end portion on a side opposite a side where the pair of engaging protruding portions are close together is greater than a distance, from the axis, of an end portion on the side where the pair of engaging protruding portions are close together.

In this structure, when two engaging protruding portions are provided separated from each other by a gap in the width direction (i.e., the circumferential direction) on an engaging member, the end portion that is on the center side of the engaging member, of each outer peripheral edge of the engaging protruding portion, i.e., the end portion on the side where the two engaging protruding portions are close together, will be referred to as the near side end portion, and the end portion on both end portion sides of the engaging member, of each outer peripheral edge of the engaging protruding portion will be referred to as the non-near side end portion. The radius of the non-near side end portion of each engaging protruding portion is larger than the radius of the near side end portion of each engaging protruding portion. However, the shape of the engaging protruding portion may be, for example, a shape in which the distance of the outer peripheral edge from the axis becomes continuously larger from the near side end portion toward the non-near side end portion, a shape such that that distance becomes larger in steps from the near side end portion toward the non-near side end portion, or a shape in which the distance from the axis becomes larger than at another portion, only near the non-near side end portion. Making the radius (i.e., the distance from the axis) of the non-near side end portion of the outer peripheral edge of the engaging protruding portion larger results in this non-near side end portion being the most difficult to come off. For example, even if the near side end portion of the engaging protruding portion disengages from the engageably protruding portion due to outward force being applied to the engaging member due to wind or the like as described above, the non-near side end portion is caught on the engagable protruding portion, so outward force applied to the engaging member will be received at each of the non-near side end portions. In this case, when comparing the non-near side end portions with the near side end portions, the non-near side end portions are positioned apart from each other, so when the force applied by wind or the like is the same, the force received by one non-near side end portion is less than the force received by the near side end portion. Therefore, if the maximum force that is able to be received by one engaging protruding portion is the same, a larger external force may be received when it is received by the non-near side end portion, so even if a large external force is applied, the cover attaching portion will not easily come off. Also, even if a large external force is applied, the force received by the engaging protruding portion is small, so the outer peripheral edge and the like will not easily be damaged, ground down, or deformed or the like. For these reasons, it is appropriate that the radius of the non-near side end portion be made larger than the radius of the near side end portion, and external force be received at the non-near side end portion.

Also, in the wheel cover according to the structure described above, the engagable portion of the wheel may include an engagable protruding portion provided on an inner peripheral surface of an insertion hole provided along the center axis of the wheel, and each of the plurality of engaging members may include i) an engaging protruding portion that is able to engage with the engagable protruding portion, and ii) an abutting surface that is able to abut against the inner peripheral surface.

In this structure, the abutting surface abuts against the inner peripheral surface of the insertion hole of the wheel when the cover attaching portion is attached to the wheel. Therefore, when outward force is applied to the cover attaching portion due to wind or the like, friction force may be generated between the cover attaching portion and the wheel, thus making the cover attaching portion that much more resistant to coming off. Also, when outward force is applied due to wind or the like, this force is received by both the abutting surface and the outer peripheral edge (i.e., the portion that abuts with the engagable protruding portion). Therefore, providing the abutting surface enables the force that is applied to the outer peripheral edge to be reduced, so damage, grinding, and plastic deformation or the like are less likely to occur near the outer peripheral edge. The abutting surface is positioned to the inside of the outer peripheral edge when the cover attaching portion is attached to the wheel.

Also, in the wheel cover according to the structure described above, the plurality of engaging members may each include an engaging member main body that retains the engaging portion, and the engaging portion may be formed with material having a larger friction coefficient than the engaging member main body. In this structure, using material having a large friction coefficient, such as rubber, for example, enables the cover attaching portion to resist coming off easily. Also, material that is less rigid than the engaging member main body may also be used.

Also, in the wheel cover according to the structure described above, an engaging protruding surrounding portion that includes the engaging protruding portion, of the engaging member, and a portion excluding the engaging protruding surrounding portion may be formed with material having different thermal expansion coefficients.

According to this structure, when the area near the engaging protruding portion is formed with material having an extremely small thermal expansion coefficient, for example, the dimensional stability of the engaging protruding portion may be improved, so a change in tightening force (also referred to as engaging force or binding force) caused by a change in temperature may be suppressed. Also, if the portion excluding the engaging protruding portion surrounding portion is made with material that expands when the temperature is high, then if the temperature becomes high while the vehicle is being transported, the force pushing the engaging protruding portion into the insertion hole may be increased, so a decrease in the binding force when the temperature is high may be inhibited. Resin normally has a positive thermal expansion coefficient. Furthermore, if the area near the engaging protruding portion is made with material having a negative expansion coefficient (i.e., that expands when the temperature is low), a decrease in binding force when the temperature is low may be inhibited.

Also, in the wheel cover according to the structure described above, each of the plurality of engaging members may include plurality of engaging protruding portions having a different protrusion amount in a radial direction of the cover attaching portion and being separated at intervals in a direction of the axis from each other, the engaging protruding portion serving as the engaging portion.

According to this structure, the engaging members have the engaging protruding portions as the plurality of engaging portions with different protrusion amounts in the radial direction, and thus may also be used with wheels having ornament receiving holes with different inside diameters. Therefore, the wheel cover may be used with a large variety of types of wheels. The engaging protruding portions are preferably arranged such that those with small protrusion amounts are on the inside (i.e., the side opposite the opening of the insertion hole) in the axial direction, and those with large protrusion amounts are on the outside. This is because the engaging protruding portions with small protrusion amounts may be used when the engaging protruding portions with large protrusion amounts do not abut against the inner peripheral surface of the insertion hole. The plurality of engaging protruding portions separated in the axial direction may all have the same protrusion amounts in the radial direction. In this case, even if the position in the axial direction in which the engagable protruding portion of the insertion hole is provided is different, the stress applied to the cover main body may be reduced, so the cover main body may be attached well. Also, the plurality of engaging protruding portions do not necessarily have to be arranged in a single line. They may also be provided in positions offset with respect to the axis.

Also, in the wheel cover according to the structure described above, the plurality of engaging members may each include an engaging member main body, and a protruding member that is pivotally retained in an engaged position engagable with the engagable protruding portion, and a disengaged position away from the engagable protruding portion.

Also, in the wheel cover according to the structure described above, the plurality of engaging members may each include a) an engaging member main body that retains the engaging protruding portion, and b) a spring member that is provided on the engaging member main body, and applies urging force in a direction pushing the engaging protruding portion against the inner peripheral surface of the insertion hole.

In this structure, the spring member may be provided on an inner portion of the engaging member main body or on an outer portion of the engaging member main body. For example, the spring member may be provided along the surface of the main body of the engaging member. In either case, if the spring member is taut in a state applying urging force in a direction that pushes the engaging protruding portion against the inner peripheral surface of the insertion hole, a large binding force is able to be obtained.

Also, in the wheel cover according to the structure described above, the cover attaching portion may include at least one guide member that extends in a direction substantially parallel to the axis.

According to this structure, providing the guide member facilitates insertion of the cover attaching portion into the insertion hole. The guide member is preferably provided at equidistant intervals in the circumferential direction, i.e., is preferably provided in positions separated by a center angle of 180°, or in positions separated by center angles of 120°, or the like. Also, the guide member is preferably provided between adjacent engaging members from among the plurality of engaging members, i.e., the guide member and the engaging member are preferably provided alternately in the circumferential direction.

Also, in the wheel cover according to the structure described above, the at least one guide member may include a sloped surface slopes in a direction radially outward toward the outside of the wheel, when the wheel cover is attached to the wheel.

In this structure, a sloped surface is provided on an end portion on the inside in the axial direction of the guide member. By providing the sloped surface, even if the cover attaching portion is inserted from a direction intersecting the axial direction, it is possible to correct the posture of the cover attaching portion to a posture parallel to the axis. As a result, the cover attaching portion is able to be inserted nicely into the insertion hole. The sloped surface may be a flat surface or a curved surface.

Also, in the wheel cover according to the structure described above, the cover attaching portion may be able to be inserted into an insertion hole of the wheel provided along a center axis of the wheel, and the at least one guide member (each of the guide members, if there is more than one) may include a) a guide member main body, and b) a force receiving portion that is provided protruding radially outward on the guide member main body, and that has an abutting surface that abuts against an inner peripheral surface of the insertion hole, when the cover attaching portion is inserted into the insertion hole.

According to this structure, the force receiving portion is abutted against the inner peripheral surface of the insertion hole when the cover attaching portion is inserted into the insertion hole. Force applied between the wheel cover and the wheel is received by the engaging protruding portion and the force receiving portion, so providing the force receiving portion makes it possible to reduce the force that is received by the engaging protruding portion.

Also, in the wheel cover according to the structure described above, the abutting surface may be provided separated by a center angle of 180°. In this structure, at least a pair of the force receiving portions are preferably provided in positions separated by a center angle of 180°.

Also, in the wheel cover according to the structure described above, a ratio of a width of the abutting surface to a width of the guide member main body may be equal to or less than ⅓.

If the width of the force receiving surface is too large, the resistance when the cover attaching portion is inserted into the insertion hole will be large, which is undesirable. Therefore, the ratio of the width of the abutting surface to the width of the guide member main body is preferably equal to or less than ⅓, as it is with this structure. Also, the ratio may be a value of equal to or less than 0.4, a value of equal to or less than 0.3, or a value of equal to or less than 0.25. Also, the abutting surface is preferably provided near both end portions in the width direction of the guide member main body. This is so that the interval (i.e., the distance) of the abutting surface may be increased, so that force in the radial direction may be received evenly over the entire circumference.

Also, in the wheel cover according to the structure described above, the cover attaching portion may include i) a plurality of guide members, ii) a guide connecting member that connects the plurality of guide members together, and iii) a reinforcing member that is provided on the guide connecting member and inhibits deformation in a radial direction of the cover attaching portion.

According to this structure, even if outward force is applied to the cover attaching portion due to wind or the like, such that force that tries to bring the plurality of guide member main bodies closer together is applied to the plurality of guide member main bodies, the guide member main bodies will not easily come closer together. As a result, the abutting surface will not easily come away from the inner peripheral surface of the insertion hole, so abutment between the abutting surface and the inner peripheral surface is able to be well maintained.

Also, in the wheel cover according to the structure described above, the engaging member retaining portion may include an engaging portion connecting member that connects the plurality of engaging members that are connected to the guide connecting member.

According to this structure, the plurality of guide members are fixed to the attaching portion main body, the plurality of guide members are connected by the guide connecting member, and the engaging portion connecting member is connected to the guide connecting member. As a result, the engaging members are held to the attaching portion main body. The engaging member retaining portion may be regarded as being formed by the guide connecting member and the engaging portion connecting member and the like, and the engaging member retaining portion may be regarded as being formed by the guide connecting member, the engaging portion connecting member, and the attaching portion main body, and the like. In this case, the rigidity of the guide connecting member is large, so the engaging portion connecting member is able to be well retained. Also, the corner of the connecting portion of the guide connecting member and the engaging portion connecting member is able to be R-shaped, so in this case, the connecting portion (i.e., the guide connecting member and the engaging portion connecting member) will not easily deform or be damaged.

Also, in this wheel cover according to the structure described above, the wheel may include a tire, and a tire retaining portion that retains the tire. The cover main body may have a shape that abuts against the tire when the cover main body is attached to the wheel by the cover attaching portion.

According to this structure, the wheel cover extends to a position where it abuts against the tire, i.e., a side wall of the tire, so the disc portion of the wheel is able to be well protected by the wheel cover. For example, at least a portion of the outer peripheral edge portion is preferably shaped protruding to the inside when the wheel cover is attached to the wheel.

Also, in the wheel cover according to the structure described above, the outer peripheral edge of the cover main body may have a curved portion that abuts against the tire. According to this structure, the tire abuts against the portion that forms the R-shape of the cover main body (i.e., the curved portion), so the tire will not easily be scratched.

Also, in the wheel cover according to the structure described above, a plurality of semispherical protruding portions may be formed separated in the circumferential direction on the outer peripheral edge portion of the cover main body.

In this structure, the protruding portions are shaped protruding to the inside when the wheel cover is attached to the wheel. The abutting strength may be increased by the protrusions abutting against the tire, so relative rotation between the tire and the cover main body will not easily occur. Also, increasing the abutting strength between these enables the gap between the tire and the cover main body to be reduced. When the contact force between the cover main body and the tire is weak when the vehicle is traveling with the wheel cover attached to a wheel, the cover main body and the wheel may rotate relative to one another and consequently leave sliding marks on the outer peripheral surface of the tire. Also, the cover main body may rotate relative to the wheel due to vibrations or the like while the vehicle is being transported. Therefore, by increasing the contact force between the cover main body and the tire, the cover main body and the wheel tend to rotate together, making sliding contact between the cover main body and the tire less likely. Also, force that tries to bend the cover main body to the outside is applied to the cover main body due to outside air entering the gap between the cover main body and the tire from wind or the like while the vehicle is being transported. Therefore, if the gap between the cover main body and, the tire is made smaller, the force that tries to bend the cover main body to the outside will not as easily be applied, and thus that force may be reduced.

Also, in the wheel cover according to the structure described above, the cover main body may also include at least one depression provided in a middle portion in the radial direction.

The surrounding portion that includes the depression tends to deform easier than other portions. Therefore, according to this structure, deformation is absorbed at the surrounding portion that includes the depression. A plurality of the depressions may be provided separated in the circumferential direction, or the depression may be provided continuous in the circumferential direction. When the depression is provided in an annular shape, the depth of the concave portion may be made to differ cyclically in the circumferential direction (for example, deep portions and shallow portions may be provided). The depression provided continuous in the circumferential direction may be regarded as a single depression, or as being formed by a plurality of depressions. For example, in a depression provided continuous in the circumferential direction, a portion where the depth is uniform may be regarded as being a single depression. The depression has a wider open portion than a concavo-convex portion (i.e., a bead). The depression may also be provided overlapping with at least a portion of a bead. Also, the shape of the depression is arbitrary. A bottom surface may have a shape defined by at least one of a curve and a straight line. For example, the bottom surface may be generally oval-shaped, or multangular-shaped. Providing a complex-shaped depression continuous in the circumferential direction is thought to enable deformation to be more easily absorbed than providing simple-shaped depressions separated in the circumferential direction.

Also, in the wheel cover according to the structure described above, the cover main body may include at least one of one or more concavo-convex portions (i.e., beads) extending in the radial direction of the cover main body, and one or more concavo-convex portions (i.e., beads) extending in the circumferential direction.

In this structure, the bead extending in the radial direction may extend from an inner peripheral portion to an outer peripheral portion of the cover main body, may extend from the inner peripheral portion to a middle portion, may extend from the middle portion to the outer peripheral portion, or may extend at the middle portion, or the like. The inner peripheral portion and the outer peripheral portion are portions near the inner peripheral edge and the outer peripheral edge, respectively. For example, the inner peripheral portion may be an annular portion within a set range from the inner peripheral edge, and the outer peripheral portion may be an annular portion within a set range from the outer peripheral edge. The middle portion is a portion that excludes the inner peripheral portion and the outer peripheral portion, and may be an annular portion within a set range that includes a position 1/n (n=2, 3, . . . ) of the radius of the cover main body. Also, an inner peripheral side end portion of the bead in the radial direction may be an outer peripheral edge (or an area near there) of a center connectable portion to which the center attaching portion is connected, and an outer peripheral side end portion may be an inner peripheral edge (or an area near there) of an outer peripheral edge portion on which the protrusions are formed or that is formed in an R-shape of the cover main body. The bead that extends in the circumferential direction may extend in an annular shape or in an arc-shape. Providing beads that extend in an arc-shape lined up in the circumferential direction enables them to be arranged in a generally annular shape. When a bead that extends in the circumferential direction is provided in the middle portion of the cover main body, the middle side end portion of the radial bead may be an edge (or an area near there) of the circumferential bead. Also, only one bead extending in the radial direction and only one bead extending in the circumferential direction may be provided, or a plurality of beads extending in the radial direction and a plurality of beads extending in the circumferential direction may be provided. One of the bead extending in the radial direction and the bead extending in the circumferential direction may be provided on the cover main body, but preferably both of the beads are provided on the cover main body. The rigidity of the cover main body may be set to a desired amount and desired strength distribution. As described above, there may be times when force from the inside toward the outside, i.e., force that tries to bend the cover main body outward, acts on the cover main body, due to wind or the like, while the vehicle is being transported. Therefore, providing the radial bead and the circumferential bead inhibits bending in the radial direction and the circumferential direction. Also, when force that tries to bend the cover main body outward due to wind or the like acts on the cover main body, the cover attaching portion may detach and the wheel cover may come off. Therefore, if the rigidity of the cover main body is increased, the outward force will not easily act on the cover attaching portion, so the wheel cover will not easily come off.

Also, in the wheel cover according to the structure described above, the cover main body may include at least one annular concavo-convex portion (i.e., an annular bead) provided on the outer peripheral side of the at least one depression.

The length in the radial direction between the rotational center axis of the wheel and the abutting point of the wheel cover and the tire, and the length in the axial direction between the open portion of the ornament receiving hole of the wheel and the abutting point of the wheel cover and the tire (these lengths may also be referred to as the "offset amounts") are usually different for each type of wheel. Thus, when the wheel cover is attached to the wheel, the cover main body may deform depending on the type (i.e., the shape) of the wheel. Therefore, in the cover main body according to this structure, an annular concavo-convex portion (i.e., an annular bead) is provided on a portion to the outer peripheral side of the depression. This annular bead divides a portion to the inner peripheral side of the bead from a portion to the outer peripheral side of the bead, and thus inhibits deformation that occurs on the inner peripheral side from affecting the outer peripheral side. Therefore, even if the portion to the inner peripheral side of the bead deforms, the portion to the outer peripheral side is still able to abut nicely against the tire. In this sense, the middle portion where the depression is formed may be referred to as a "stress relieving portion", and the portion to the outer peripheral side of the bead may be referred to as a "tire opposing portion". A depression or the like is not provided on the tire opposing portion.

Also, in the wheel cover according to the structure described above, the annular concavo-convex portion (i.e., an annular bead) may be provided on the outer peripheral side of a position ⅓ the length in the radial direction of the cover main body, from the outer peripheral edge of the cover main body.

In this structure, when the cover main body has an annular shape, the annular bead is provided on a portion to the outer peripheral side of a position ⅓ of a difference R between the inside diameter and the outside diameter, from the outer peripheral edge. The annular bead is preferably provided to the outer peripheral side of 0.4 R, to the outer peripheral side of 0.3 R, to the outer peripheral side of 0.25 R, or to the outer peripheral side of 0.2 R, and preferably provided to the inner peripheral side of 0.1 R, to the inner peripheral side of 0.15 R, to the inner peripheral side of 0.2 R, or to the inner peripheral side of 0.3 R. The annular bead is provided in a position where the outer peripheral edge is able to nicely abut against the tire. If the annular bead is too far from the outer peripheral edge, the region of the stress relieving portion will become small, and deformation may not be able to be absorbed well. Also, if the annular bead is too close to the outer peripheral edge, the region of the tire opposing portion will become small, and the outer peripheral edge will tend to rise up off of the tire. Thus, the annular bead is preferably provided in the position described above.

Also, in the wheel cover according to the structure described above, the cover main body may include a plurality of liner concavo-convex portions (i.e., linear beads) that extend in the radial direction of the cover main body. In this structure, there are preferably three or more beads that extend linearly in the radial direction provided radially. For example, three beads may be provided at intervals with center angles of 120°, or four beads may be provided at intervals with center angles of 90°, or the like.

Also, in the wheel cover according to the structure described above, the cover main body may include i) a plurality of inner peripheral side short concavo-convex portions (i.e., inner peripheral side short beads) that extend linearly in the radial direction of the cover main body from an inner peripheral portion to a middle portion, and ii) a plurality of outer peripheral side short concavo-convex portions (i.e., outer peripheral side short beads) that extend linearly in the radial direction of the cover main body from the middle portion to an outer peripheral portion. The number of outer peripheral side short beads may be equal to or less than the number of inner peripheral side short beads.

According to this structure, even if the portion on the outer peripheral side of the cover main body bends easily, if the portion on the inner peripheral side is made to so that it will not bend easily, external force applied to the cover attaching portion may be reduced, so the wheel cover may be inhibited from easily coming off of the wheel. Therefore, the rigidity of the inner peripheral side is preferably greater than the rigidity of the outer peripheral side. The outer peripheral side short beads do not necessarily have to be provided. Also, the numbers of the outer peripheral side short beads may be the same as the number of the inner peripheral side short beads. Further, two or more each of the inner peripheral side short beads and the outer peripheral side short beads are preferably provided between adjacent long beads (i.e., long concavo-convex portions).

Also, in the wheel cover according to the structure described above, the inner peripheral side short beads and the outer peripheral side short beads may be provided in same-phase positions.

When comparing a case in which the inner peripheral side short beads and the outer peripheral side short beads are alternately provided (i.e., when they are provided at offset phases) with a case in which the inner peripheral side short beads and the outer peripheral side short beads are provided at the same phases, the cover main body is able to resist deformation more, according to simulation and the like, when the inner peripheral side short beads and the outer peripheral side short beads are provided at the same phases, like this structure. The number of outer peripheral side short beads may be the same as the number of inner peripheral side short beads, or the number of outer peripheral side short beads may be less.

Also, in the wheel cover according to the structure described above, the cover main body may include a plurality of arc-shaped concavo-convex portions (i.e., arc-shaped beads) arranged lined up in the circumferential direction, with each of the arc-shaped beads between the plurality of linear beads that extend in the radial direction of the cover main body. In this structure, the arc-shaped beads may be provided between adjacent long beads (i.e., long concavo-convex portions), provided between short beads (i.e., short concavo-convex portions), and provided between a long bead and a short bead, and the like.

Also, in the wheel cover according to the structure described above, the cover main body may include a center connectable portion that is provided on an inner peripheral portion of the cover main body and on which the cover attaching portion is arranged. Also, a plurality of concavo-convex portions (i.e., beads) may be provided on a portion to the outer peripheral side of the center connectable portion.

According to this structure, a bead is provided to the outer peripheral side of the center connectable portion. As a result, external force that acts on the cover main body is received at a portion to the outer peripheral side of the center connectable portion, so that external force will not easily reach the center connectable portion. A step in the axial direction is provided on an outer peripheral side portion of the center connectable portion. By providing a barrier at this step, the effects from force applied to the outer peripheral side portion may be better inhibited from reaching the center connectable portion. Also, the center connectable portion is positioned to the outer peripheral side of the insertion hole of the wheel when the wheel cover is attached to the wheel.

Also, in the wheel cover according to the structure described above, the wheel cover may include a relative rotation inhibiting portion that inhibits relative rotation between the cover main body and the wheel.

According to this structure, inhibiting relative rotation in which there is sliding contact between the cover main body and the tire (hereinafter, simply referred to as "relative rotation") makes it possible to inhibit the tire from being marked with sliding marks. The relative rotation inhibiting portion may be i) a portion that is provided on the cover main body and that includes a wheel engaging portion that is able to engage with the wheel in a state inhibiting relative rotation with respect to the wheel, or ii) a portion that is provided between the cover main body and the cover attaching portion, and that includes a cover/attaching portion relative rotation inhibiting portion that inhibits relative, rotation between the cover main body and the cover attaching portion. The cover attaching portion does not rotate relative to the wheel as easily as the cover main body does. Therefore, rotating force that acts on the cover main body is transmitted to the cover attaching portion via the cover/attaching portion relative rotation inhibiting portion, and is received by the cover attaching portion. As a result, relative rotation of the cover main body with respect to the wheel is inhibited. A portion that engages the cover main body with the tire with large contact force, or a portion that engages the cover main body in a state in which relative rotation with the wheel may be inhibited, using a spoke of the wheel, the gap between adjacent spokes, or end portions on the outer peripheral side of the wheel or the like corresponds to the wheel engaging portion.

Also, in the wheel cover according to the structure described above, a portion of the cover main body may have a lower thermal expansion coefficient than another portion.

If a portion of the cover main body that easily elastically deforms or easily deforms with heat is formed with material having a smaller thermal expansion coefficient than other portions, for example, like this structure, deformation of the overall cover main body due to heat may be reduced. Therefore, a decrease in contact with the tire may be inhibited. In particular, dimensional stability with respect to heat may be improved by using material having an extremely small thermal expansion coefficient or material in which the thermal expansion coefficient is a negative value. The portion that easily deforms from heat corresponds to an easily elastically deformable portion. For example, a portion that includes a concavo-convex portion (i.e., a bead) and a portion that includes a depression and the like correspond to easily elastically deformable portions. The entire cover main body may also be formed with material having a small thermal expansion coefficient, but in this case, there are issues such as an increase in material costs. Therefore, forming a portion with material having a small thermal expansion coefficient makes it possible to inhibit unnecessary deformation due to heat, and thus inhibit a decrease in contact with the tire, while reducing material costs.

Also, in the wheel cover according to the structure described above, the wheel cover may include a cover/attaching portion connecting portion that connects the cover main body and the cover attaching portion together. According to this structure, connecting the cover main body and the cover attaching portion facilitates attachment of the wheel cover to the wheel.

Also, in the wheel cover according to the structure described above, the cover/attaching portion connecting portion may include a plurality of connecting pawls that are provided on the outer peripheral surface of the cover attaching portion and protrude radially outward. The cover main body may be connected to the cover attaching portion by the plurality of connecting pawls being caught on an inner peripheral edge portion of the cover main body.

In this structure, the connecting pawls are provided on the outer peripheral surface of the attaching portion main body, and the cover attaching portion and the cover main body are connected together using these connecting pawls. The connecting pawls may be provided at equidistant intervals on the outer peripheral surface of the attaching portion main body, or one or more pairs of connecting pawls may be provided opposing each other. The connecting pawls are preferably provided symmetrically with respect to a line orthogonal to the axis. The connecting pawls catch on the inner peripheral edge, or there around, of the cover main body.

Also, in the wheel cover according to the structure described above, an end portion on the inner peripheral side of the cover main body may include a sloped surface that becomes closer to the inside toward the inner peripheral side. Also, the cover/attaching portion connecting portion may use one of i) a screw mechanism, ii) a ratchet mechanism, and iii) a tapered insertion mechanism, provided between the sloped surface and the main body of the cover attaching portion. In this structure, the cover/attaching portion connecting portion may use a screw mechanism, a ratchet mechanism, or a tapered insertion mechanism, provided between the attaching portion main body of the cover attaching portion and the sloped surface of the cover main body.

Also, in the wheel cover according to the structure described above, the cover/attaching portion connecting portion may include a relative rotation inhibiting type connecting portion that connects the cover main body and the cover attaching portion together in a state in which relative rotation between the two is inhibited.

In this structure, the cover/attaching portion connecting portion may or may not have a relative rotation inhibiting function. Therefore, the relative rotation inhibiting type connecting portion may include, for example, one or more radially protruding portions provided on one of the cover attaching portion and the cover main body, and a radially recessed portion that corresponds to the radially protruding portion and is provided on the other of the cover attaching portion and the cover main body. Also, the shape of a portion on which the cover attaching portion is arranged, of the center connectable portion provided on an inner peripheral portion of the cover main body may be a multangular shape when viewed from above, and the shape of the outer peripheral edge of the cover attaching portion may be a corresponding multangular shape.

Also, in the wheel cover according to the structure described above, the cover main body may include a center connectable portion that is provided on an inner peripheral portion of the cover main body and on which the cover attaching portion is arranged. Also, the center connectable portion may include i) an inner peripheral sloped portion that is formed on the inner peripheral edge and is sloped with respect to the axis, ii) an annular flat surface, and iii) an annular wall portion. Also, the annular wall portion may be corrugated. According to this structure, the center attaching portion abuts against the annular flat surface, and pushing force is applied in the axial direction. Also, forming the annular wall portion in a corrugated shape enables the rigidity of the wall portion to be increased, so even if the portion of the cover main body that is to the outer peripheral side of the annular wall portion bends, the portion of the cover main body that is to the inner peripheral side of the annular wall portion will not easily be affected.

Also, in the wheel cover according to the structure described above, the cover attaching portion may include a) an annular groove-shaped pressure apply portion that is provided on an outer peripheral portion and pushes the cover main body in the axial direction, and b) a radial reinforcing portion that is provided on an inside portion of the groove-shaped pressure apply portion and has a plurality of reinforcing members that extend in the radial direction.

According to this structure, the groove-shaped pressure apply portion is provided on the outer peripheral edge on the open side of the attaching portion main body, and is positioned to the outer peripheral side of the insertion hole of the wheel when the wheel cover is attached to the wheel. Providing the radial reinforcing portion on the groove-shaped pressure apply portion makes the groove-shaped pressure apply portion less prone to deforming in the radial direction. As a result, a decrease in the pushing force of the cover attaching portion against the cover main body may be inhibited, so the wheel cover will not easily come off.

Also, in the wheel cover according to the structure described above, the cover main body may include a center connectable portion that is provided on an inner peripheral portion of the cover main body and on which the cover attaching portion is arranged. Also, the center connectable portion may include i) an inner peripheral sloped portion that is formed on the inner peripheral edge and is sloped with respect to the axis, ii) an annular flat surface, and iii) an annular wall portion. The cover attaching portion may include an annular groove-shaped pressure apply portion that pushes the cover main body in the axial direction. A plurality of protruding portions may also be provided that protrude in the radial direction on the outer peripheral surface of the groove-shaped pressure apply portion, and in which the distance, from the axis, of the outer peripheral edge of the groove-shaped pressure apply portion is less than the distance, from the axis, of a boundary line between the annular wall portion and the annular flat surface of the cover main body.

According to this structure, the radius of the outer peripheral edge of the cover attaching portion is less than the radius of the outer peripheral edge of the annular flat surface of the cover main body, so the work of connecting the cover attaching portion to the cover main body is easier. Also, the radius to the protruding portions of the cover attaching portion is substantially the same as the radius of the outer peripheral edge of the annular flat surface of the cover main body, so rattling may be inhibited when the cover attaching portion is connected to the cover main body (i.e., when the wheel cover is attached to the wheel).

Also, in the wheel cover according to the structure described above, the cover attaching portion may include a middle pushing portion that pushes toward the wheel, at a middle portion in the radial direction of the cover main body. According to this structure, for example, an arm portion may be provided on an outer peripheral portion of the cover attaching portion, and this arm portion may push the cover main body against the wheel at the middle portion in the radial direction. As a result, the cover main body is inhibited from rising up, so the outer peripheral edge may be made to abut nicely against the tire.

A second aspect of the invention relates to a wheel cover that covers at least a portion on an outside of a wheel that includes a tire and a tire retaining portion that retains the tire. The wheel cover is attached to the wheel in a state in which an outer peripheral edge of the wheel cover abuts against the tire, and the wheel cover includes i) at least one depression provided in a middle portion in a radial direction of the wheel cover, and ii) at least one annular concavo-convex portion (i.e., annular bead) provided on an outer peripheral side of a position that is ⅓ a length in the radial direction of the wheel cover from an outer peripheral edge, on an outer peripheral side of the at least one depression of the wheel cover. Here, the technical characteristics according to the structures described above may be employed in the wheel cover according to this aspect.

A third aspect of the invention relates to a wheel cover that covers at least a portion of an outside of a wheel. This wheel cover includes a cover main body that has an annular shape, and a cover attaching portion that attaches the cover main body to the wheel by being attached to the wheel on an inner peripheral side of the cover main body. The cover main body includes i) a plurality of long concavo-convex portions (i.e., long beads) that extend linearly in a radial direction of the cover main body, from an inner peripheral portion to an outer peripheral portion, ii) a plurality of inner peripheral side short concavo-convex portions (i.e., inner peripheral side short beads) that extend linearly in the radial direction of the cover main body, from the inner peripheral portion to a middle portion, and iii) a plurality of arc-shaped concavo-convex portions (i.e., arc-shaped beads) arranged aligned in a circumferential direction on an outer peripheral side of the plurality of inner peripheral side short beads. Here, the technical characteristics according to the structures described above may be employed in the wheel cover according to this aspect.

A fourth aspect of the invention relates to a wheel cover that covers at least a portion of an outside of a wheel. This wheel cover includes a cover main body that has an annular shape, and a cover attaching portion that attaches the cover main body to the wheel by being attached to the wheel on an inner peripheral side of the cover main body. The wheel includes a connectable protruding portion provided on an inner peripheral surface of an insertion hole provided along a center axis of the wheel, and the cover attaching portion includes an engaging recessed portion that is able to engage with the engagable protruding portion of the wheel and is provided slanted with respect to the center axis. According to this structure, the wheel cover is able to be attached to the wheel and removed from the wheel by relative rotation of the cover attaching portion relative with respect to the wheel about the center axis. Here, the technical characteristics according to the structures described above may be employed in the wheel cover according to this aspect.

A fifth aspect of the invention relates to a wheel cover that covers at least a portion of an outside of a wheel. This wheel cover includes a cover main body that has an annular shape, and a cover attaching portion that attaches the cover main body to the wheel by being attached to the wheel on an inner peripheral side of the cover main body. The cover attaching portion includes a) an engaging portion that is able to engage with an engagable portion of the wheel, and b) an engaging member main body that retains the engaging portion. The engaging member main body has a structure that is able to expand and contract in the axial direction. Here, the technical characteristics according to the structures described above may be employed in the wheel cover according to this aspect.

A sixth aspect of the invention relates to a wheel cover that covers at least a portion of an outside of a wheel. This wheel cover includes a cover main body that has an annular shape, and a cover attaching portion that attaches the cover main body to the wheel by being attached to the wheel on an inner peripheral side of the cover main body. The cover attaching portion includes a) a plurality of engaging members that are held to an attaching portion main body, have engaging portions that selectively engage with an engagable portion of the wheel, and extend in a direction that includes a component of a direction parallel to an axis, and b) a binding force applying member that is a separate member from the attaching portion main body and that pushes the plurality of engaging portions toward the engagable portion by being arranged between the plurality of engaging members. With this structure, the binding force applying member is attached between the plurality of engaging members after the attaching portion main body has been attached to the wheel. As a result, the engaging portions are able to be pushed toward the engagable portion. Here, the technical characteristics according to the structures described above may be employed in the wheel cover according to this aspect.

A seventh aspect of the invention relates to a wheel cover that covers at least a portion of an outside of a wheel. This wheel cover includes a cover main body, and a cover attaching portion that attaches the cover main body to the wheel. The cover attaching portion includes a) a plurality of engaging members that extend in a direction that includes a component parallel to the axis of the cover attaching portion and that have engaging portions that are able to engage with an engagable portion of the wheel, and b) an engaging member retaining portion that, with the engaging portions separated from the engagable portion as a result of force in a direction intersecting the axis being applied to one end portion of each of the plurality of engaging members, holds the plurality of engaging members at the other end portions. In this structure, the cover main body is not limited to being annular-shaped. Also, a spoke of the wheel or the like may be used as the engagable portion. Here, the technical characteristics according to the structures described above may be employed in the wheel cover according to this aspect.

Also, in the wheel cover according to the structure described above, the cover main body may include a structure in which a radius of the cover main body is able to be adjusted.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 29 is a plan view of a cover attaching portion of the wheel cover according to the sixteenth example embodiment;

FIG. 32 is a sectional view taken along line C-C in FIG. 29;

DETAILED DESCRIPTION OF EMBODIMENTS

Hereinafter, example embodiments of the wheel cover for preventing corrosion of the invention will be described in detail with reference to the accompanying drawings. The wheel cover covers at least a portion (i.e., a portion including a disc portion) of a wheel when a vehicle is being transported. In some cases, the vehicle may travel with the wheel cover attached to the wheel.

First Example Embodiment

Figure 1:
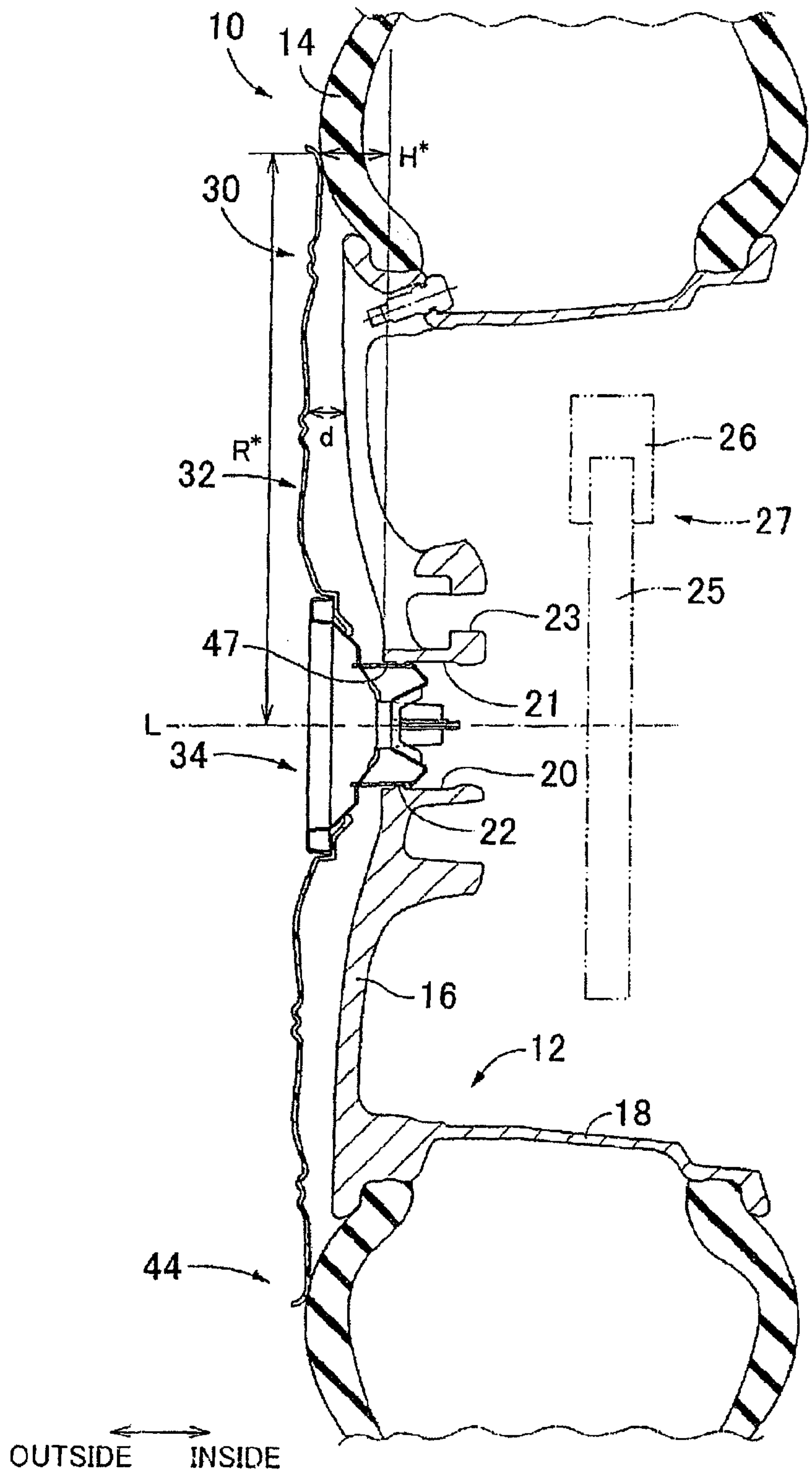
FIG. 1 is a sectional view (a portion) showing a wheel cover according to a first example embodiment of the invention attached to a wheel.
Figure 2A:
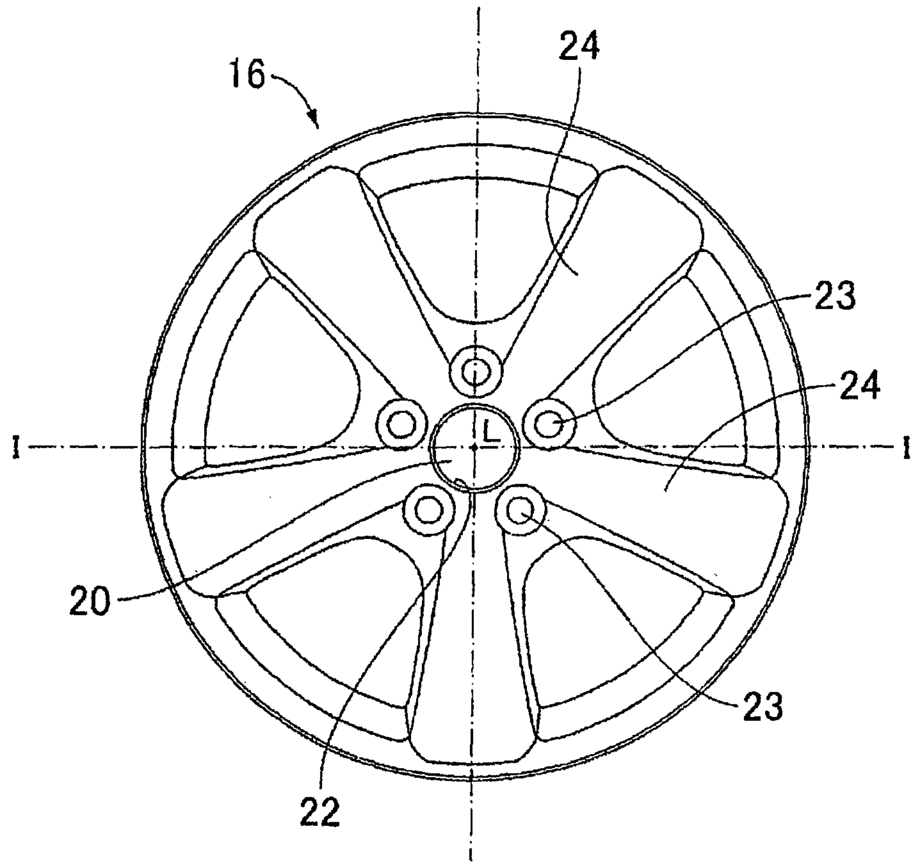
FIG. 2A is a front view of a disc portion of the wheel according to the first example embodiment.
Figure 2B:
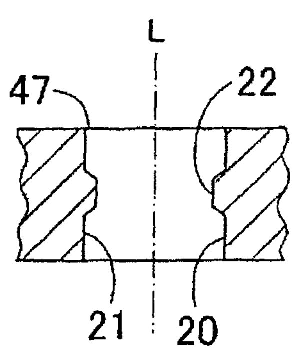
FIG. 2B is a sectional view (a portion) taken along line I-I in FIG. 2A that is the disc portion according to the first example embodiment.

A wheel 10 includes a tire retaining portion 12 and a tire 14, as shown in FIGS. 1, 2A, and 2B. The tire holding portion 12 includes a disc portion 16 that has a general disc shape, and an annular rim 18 provided on an outer periphery of the disc portion 16. The tire 14 is held to the rim 18. A planned hole to which a center ornament attaches (hereinafter this hole will be referred to as an "ornament receiving hole") 20 is formed in a center portion of the disc portion 16. The ornament receiving hole 20 extends along a rotational axis L (hereinafter, simply referred to as "axis L"). An engageable protruding portion 22 that serves as an annular engageable portion is formed on an inner peripheral surface 21. FIG. 2A shows the positions of hub bolt holes 23 and spokes 24. Also, a disc brake 27 that includes a brake rotating body 25 that is able to rotate together with the wheel 10, and a caliper 26 that presses a friction member against the brake rotating body 25, and the like are arranged to the inside of the wheel 10.

A wheel cover 30 is attached to the wheel 10. The wheel cover 30 mainly covers the outside of the disc portion 16 of the wheel 10, and includes, as separate members, a cover main body 32 and a center attaching portion 34 that serves as a cover attaching portion. The wheel cover 30 attaches to the wheel 10 by the center attaching portion 34 being inserted into the ornament receiving hole 20 while a portion of an outer peripheral portion of the center attaching portion 34 is overlapped with a portion of an inner peripheral portion of the cover main body 32. The cover main body 32 and the center attaching portion 34 may be made of resin material such as polypropylene or polyethylene, for example, but they may also be made of other material such as heavy paper or wood or the like. Regardless of the material of which they are made, it is desirable that the cover main body 32 and the center attaching portion 34 be able to bend and not be very rigid, i.e., it is desirable that they be flexible.

(Cover Main Body)

Figure 3A:
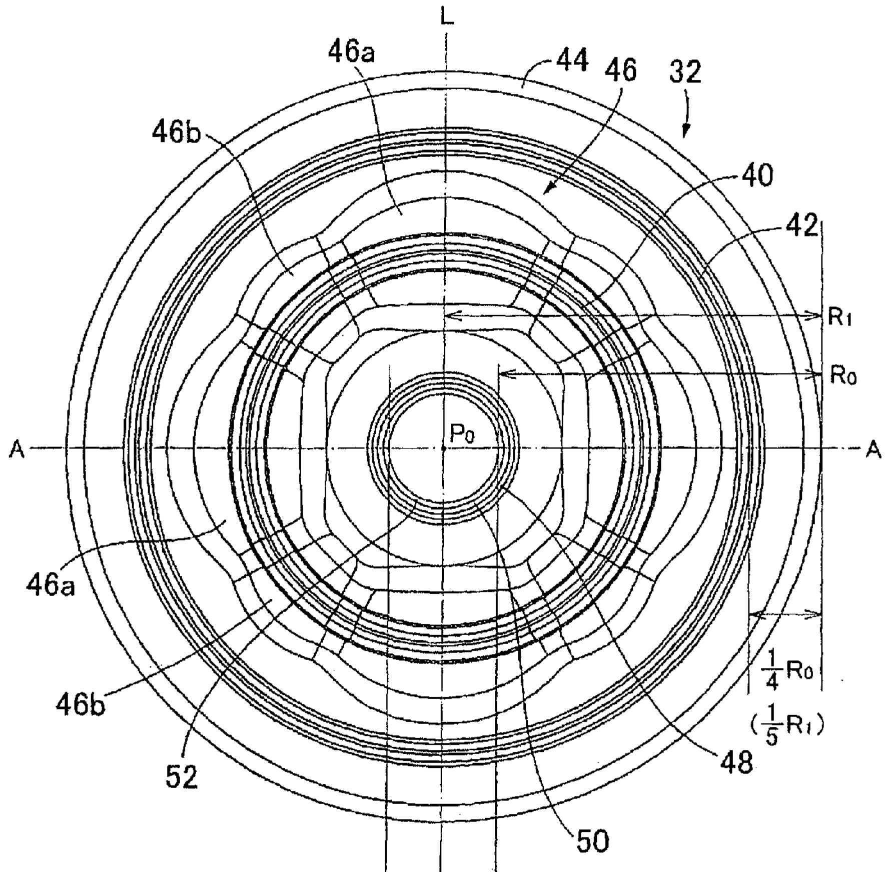
FIG. 3A is a front view of a cover main body of the wheel cover according to the first example embodiment.
Figure 3B:
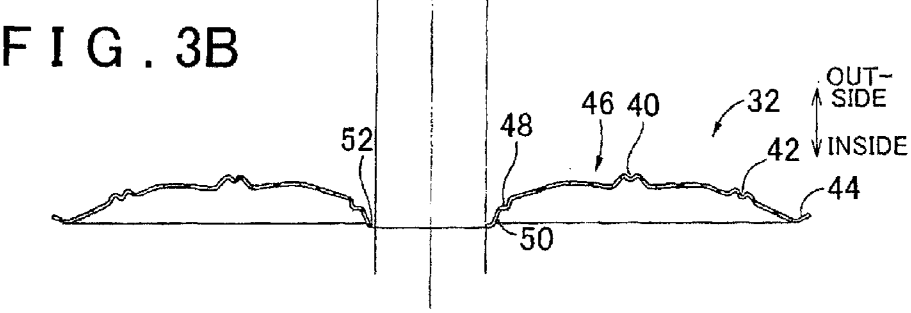
FIG. 3B is a sectional view taken along line A-A in FIG. 3A.

As shown in FIG. 3A, the cover main body 32 is a plate-shaped member having a generally annular shape. As shown in FIG. 3B, a middle portion in the radial direction is curved so as to protrude outward with respect to an outside surface of the disc portion 16 (this surface may be referred to as a "design surface"), when the wheel cover 30 is attached to the wheel 10 (hereinafter, this state may simply be referred to as "attached" or "attached state"). Therefore, in an attached state, a distance d (see FIG. 1) between the outside surface of the disc portion 16 and the inside surface of the cover main body 32 is often provided. In other words, the wheel cover 30 is able to be used with various types of wheels by having the cover main body 32 be formed in a curved shape in which it protrudes to the outside when attached. In this specification, the outside and the inside refer to the outside and the inside of the wheel 10 when the wheel cover 30 is attached to the wheel 10, and may be referred to as the outside and the inside in the direction of the axis L (hereinafter, simply referred to as the "axial direction"), or simply as the outside and the inside.

The cover main body 32 has annular beads (annular concavo-convex portions) 40 and 42 that are formed in positions spaced apart from one another in the radial direction, as shown in FIG. 3A. In this specification, the term "bead" refers to a concavo-convex portion such as that illustrated in FIG. 3B (i.e., the beads 40 and 42), for example. The bead 42 is formed to the outer peripheral side of the bead 40. These beads 40 and 42 give the cover main body 32 rigidity. The bead 40 is provided in a substantially center portion in the radial direction of the cover main body 32, and the bead 42 is provided in a position approximately 0.25 of a length R0 in the radial direction of the cover main body 32 from the outer peripheral edge, i.e., approximately 0.2 of a length R1 from a center PO (which is not a physical object, but a point on the axis L when the wheel cover 30 is attached to the wheel 10) of the cover main body 32 to the outer peripheral edge. The bead 42 may be provided to the outer peripheral side of a position 0.4 of the length R0 (i.e., 0.4 R0), provided to the outer peripheral side of a position of (0.3 R0), provided to an inner peripheral side of a position of (0.1 R0), or provided to the inner peripheral side of a position of (0.2 R0). Also, the outer peripheral edge portion of the cover main body 32 has an R-shape (referred to as an "R-shaped portion 44", an "outer peripheral edge portion", or simply an "outer peripheral edge 44"). The curved portion of the R-shaped portion 44 is able to abut against the tire 14, so the tire 14 will not easily be scratched. Also, the tire 14 abuts against the wheel cover 30, so the disc portion 16 is able to be well protected from the outside.

A depression 46 that is continuous in the circumferential direction is formed in a portion where the bead 40 is formed in the center portion of the cover main body 32. This depression 46 is provided extending in the radial direction, enveloping the entire bead 40. The depression 46 includes depressions 46*a* and 46*b* in which the depths of the concave portions (i.e., the depths in the axial direction) differ from each other. The depressions 46*a* and 46*b* are provided alternately in positions separated by 90°. The depressions 46*a* and 46*b* have both shapes in which the bottom surface is defined by a curved line and a straight line. The shapes and numbers of the depressions 46*a* and 46*b* are arbitrary. Forming the depression 46 enables the portion of the cover main body 32 that is on the inner peripheral side of the bead 42 to be able to deform easily, thereby enabling stress to easily be absorbed. The depression 46 is concave, oriented with the outside being open and the inside being the bottom portion, as shown in FIG. 3B. The shape of the wheel 10 may vary, with i) a length R* in the radial direction between the axis L and a contact point of the tire 14 and the outer peripheral edge 44 of the cover main body 32, and ii) a distance H* in a direction parallel to the axis L between the contact point and an open portion 47 of the ornament receiving hole 20 of the disc portion 16 (hereinafter, R* and H* may collectively be referred to as the "offset length") often differing depending on the type of wheel, as shown in FIG. 1. Therefore, if the offset length and the shape of the cover main body 32 do not match, force will be applied to the cover main body 32 and the cover main body 32 may consequently deform when the wheel cover 30 is attached to the wheel 10. Also, if there is a gap between the R-shaped portion 44 and the tire 14 due to deformation of the cover main body 32 (i.e., if the R-shaped portion 44 rises up off of the tire 14), the likelihood of rain or the like getting into the disc portion 16 increases, which is undesirable. Therefore, in the wheel cover 30 according to this example embodiment, the depression 46 is formed in the middle portion of the cover main body 32, so the cover main body 32 deforms easily. Also, the portion on the inner peripheral side is separated from the portion on the outer peripheral side by the bead 42, so even if the portion on the inner peripheral side deforms, the portion on the outer peripheral side of the bead 42 will not easily deform. As a result, even if the offset length and the shape of the cover main body 32 do not match, the shape (i.e., the flatness and roundness and the like) is maintained on the outer peripheral side of the bead 42, so the R-shaped portion 44 of the cover main body 32 is able to stably abut against the tire 14. In this sense, the inner peripheral side of the bead 42 may be referred to as a "stress relieving portion", and the outer peripheral side of the bead 42 may be referred to as a "tire opposing portion".

Also, a connectable portion (a portion that overlaps with the center attaching portion 34) to which the center attaching portion 34 attaches is provided on a portion to the inner peripheral side of the portion of the cover main body 32 where the depression 46 is formed. This connectable portion includes an annular flat surface portion 48 that extends flat in the radial direction, and a sloped portion 50 that has a sloped surface that is sloped with respect to the axis L to the inner peripheral side of the flat surface portion 48. The sloped portion 50 includes a sloped surface that slopes farther inward toward the inner periphery. An inner peripheral edge portion 52 of the sloped portion 50 is a portion that protrudes in the inner peripheral direction (including the flat surface in the radial direction). The provision of the inner peripheral edge portion 52 is not absolutely essential. Hereinafter, the connectable portion may also be referred to as a "center connectable portion".

(Center Attaching Portion)

Figure 4:
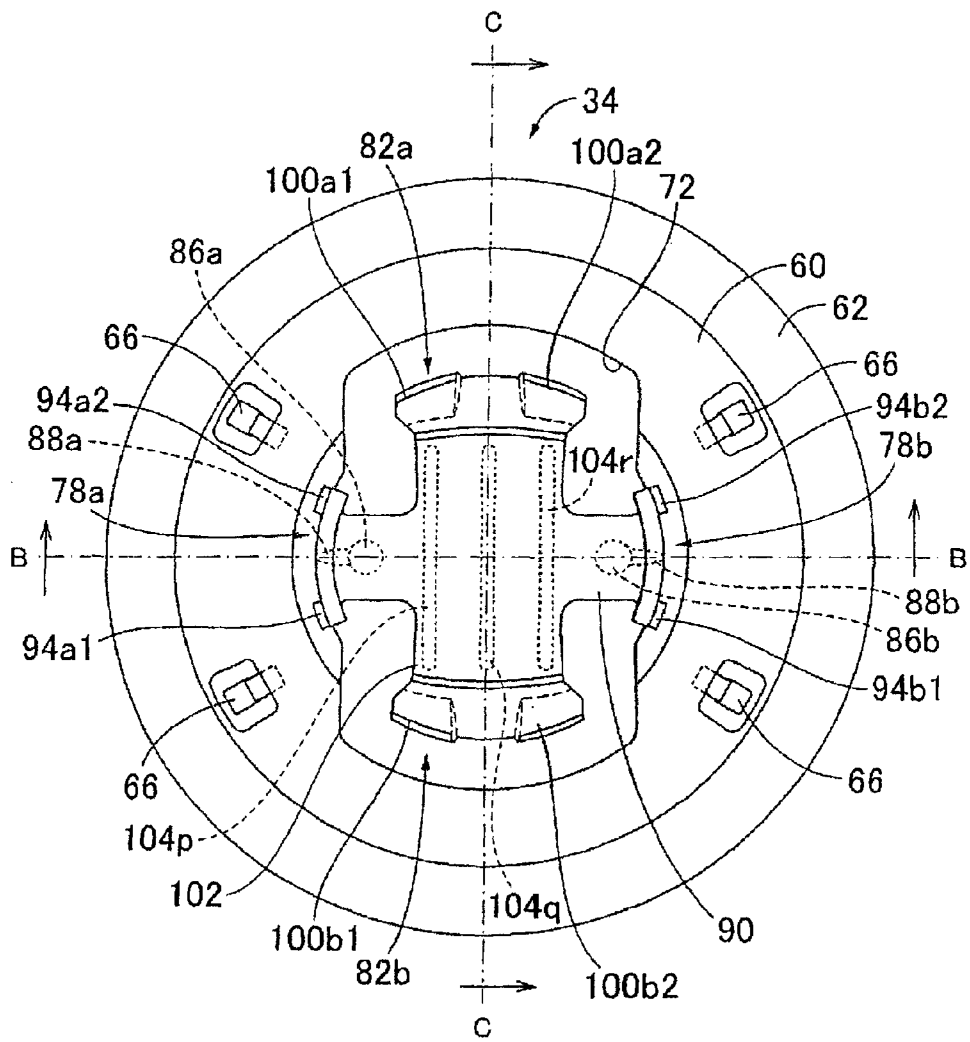
FIG. 4 is a plan view of a cover attaching portion of the wheel cover according to the first example embodiment.
Figure 5:
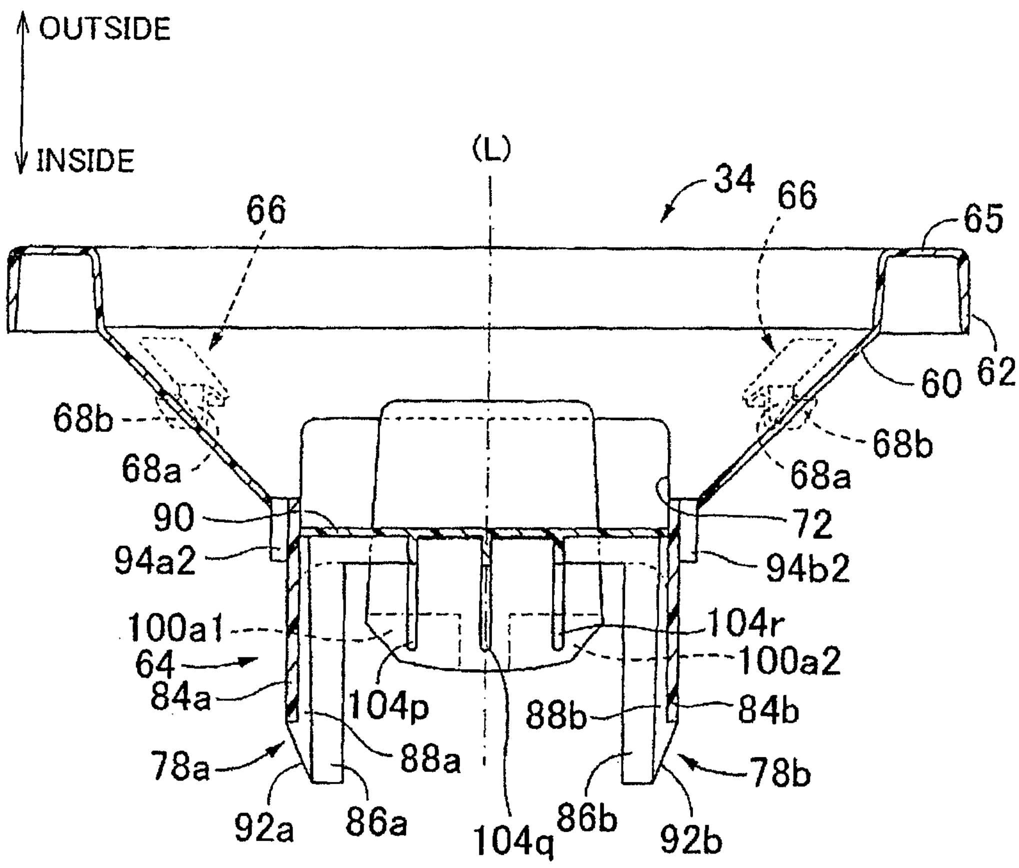
FIG. 5 is a sectional view taken along line B-B in FIG. 4.
Figure 6:
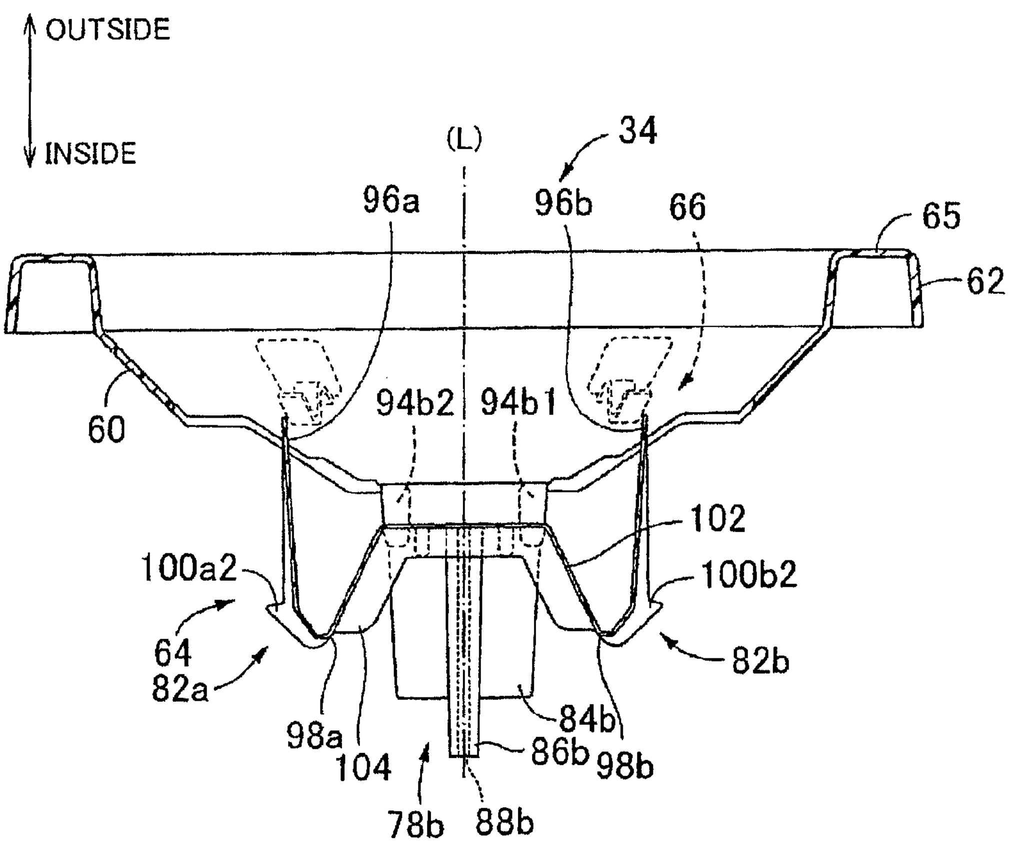
FIG. 6 is a sectional view taken along line C-C in FIG. 4.

As shown in FIGS. 4 to 6, the center attaching portion 34 includes i) an attaching portion main body 60 has a generally conical shape, ii) a pressure apply portion 62 formed on an outer periphery of the attaching portion main body 60, and iii) an inserting portion 64 that is inserted into the ornament receiving hole 20. The axis of the center attaching portion 34 is aligned with the axis L of the wheel 10 when the center attaching portion 34 is attached to the wheel 10.

(Attaching Portion Main Body)

The attaching portion main body 60 includes a sloped surface that is sloped such that the radius increases from the inside of the axis L toward the outside of the axis L. The pressure apply portion 62 is provided on the outermost side of the sloped surface. The pressure apply portion 62 protrudes outward, with the outwardly protruding top surface being flat (i.e., a flat surface 65). The pressure apply portion 62 opposes the flat surface portion 48 of the cover main body 32 when the center attaching portion 34 is connected to the cover main body 32. Also, the flat surface 65 provided to facilitate the work of connecting the center attaching portion 34 to the cover main body 32 and the like, as will be described later.

(Cover/Attaching Portion Connecting Portion)

Four connecting pawls 66 are formed on the sloped surface of the attaching portion main body 60. The four connecting pawls 66 are provided in the same position in the axial direction, and in symmetrical positions with respect to lines B-B and C-C that extend in the radial direction, and have shapes in which plate-shaped members curve in the radial direction (i.e., shapes with a recess to the outside), as shown in FIGS. 4 to 6. In other words, the connecting pawls 66 are formed in shapes that enable the inner peripheral edge portion 52 of the sloped portion 50 of the cover main body 32 to be housed between opposing portions 68*a* and 68*b* (see FIG. 5). Also, the connecting pawls 66 have shapes that enable them to easily deform in the radial direction. In this example embodiment, four of the connecting pawls 66 are provided, but two or three, or five or more may also be provided. Also, the connecting pawls 66 may be provided at equidistant intervals. In this example embodiment, the connecting pawls 66 of the center attaching portion 34 and the inner peripheral edge portion 52 of the cover main body 32 and the like form a cover/attaching portion connecting portion 70 (see FIGS. 7A to 7C). An opening 72 that has a generally oval shape is provided on the inside of the attaching portion main body 60.

(Inserting Portion)

The inserting portion 64 is held to the attaching portion main body 60. The inserting portion 64 includes a pair of guide members 78*a* and 78*b* provided in positions in which the phases are 180° apart, and a pair of engaging members 82*a* and 82*b*. The guide members 78*a* and 78*b* and the engaging members 82*a* and 82*b* are alternately provided.

(Guide)

The guide members 78*a* and 78*b* extend substantially parallel to the axis L and each includes a guide portion main body 84*a* and 84*b*, a reinforcing rod 86*a* and 86*b*, and a sloped surface retaining member 88*a* and 88*b* and the like, as shown in FIG. 5. The guide portion main bodies 84*a* and 84*b* are held to a portion corresponding to a narrow portion of the opening 72 of the attaching portion main body 60. Also, the pair of guide portion main bodies 84*a* and 84*b* are connected by a guide connecting member 90 that extends in the diametrical direction. Each of the guide portion main bodies 84*a* and 84*b* is generally shaped like a portion of a cylinder, with the outer peripheral surface opposing the inner peripheral surface 21 of the ornament receiving hole 20. Meanwhile, the reinforcing rods 86*a* and 86*b* are provided on the inner peripheral sides of the guide portion main bodies 84*a* and 84*b*, respectively, and the sloped surface retaining members 88*a* and 88*b* are provided between the outer peripheral surfaces of the guide portion main bodies 84*a* and 84*b* and the reinforcing rods 86*a* and 86*b*. The sloped surface retaining members 88*a* and 88*b* are provided on the inside in the axial direction, and each includes a sloped surface 92*a* and 92*b* that slopes radially outward farther toward the outside, with the radially outermost edge of the sloped surface 92*a* and 92*b* being continuous with the outer peripheral surface of the guide portion main body 84*a* and 84*b*. The sloped surfaces 92*a* and 92*b* are provided to make it easier to insert the inserting portion 64 into the ornament receiving hole 20. Even if the inserting portion 64 is inserted at an angle with respect to the axis L, the sloped surfaces 92*a* and 92*b* enable the posture of the inserting portion 64 to be corrected to a posture that is parallel to the axis L. The sloped surfaces 92*a* and 92*b* may be flat surfaces or curved surfaces.

Also, force receiving portions 94*a*1 and 94*a*2 and force receiving portions 94*b*1 and 94*b*2 are provided on both end portions, in the circumferential direction, of the end portions on the outside in the axial direction, of the guide portion main bodies 84*a* and 84*b*. The force receiving portions 94*a*1 and 94*a*2 and the force receiving portions 94*b*1 and 94*b*2 extend in a direction parallel to the axis L, and the outer peripheral surfaces thereof are able to abut against the inner peripheral surface 21 of the ornament receiving hole 20 (hereinafter, the outer peripheral surfaces of the force receiving portions 94*a*1, 94*a*2, 94*b*1, and 94*b*2 may be referred to as "abutting surfaces"). The outside diameter defined by the outer peripheral surfaces of the guide portion main bodies 84*a* and 84*b* is smaller than the inside diameter of the ornament receiving hole 20. Therefore, if the force receiving portions 94 (the reference characters a1, a2, b1, and b2 will be omitted when referring to all of the force receiving portions collectively when it is not necessary to distinguish among the force receiving portions 94*a*1, 94*a*2, 94*b*1, and 94*b*2; the same also applies to other members, so when it is not necessary to differentiate among them, reference characters a and b will be omitted) are not provided, the guide portion main bodies 84*a* and 84*b* do not against the inner peripheral surface 21 of the ornament receiving hole 20 when the wheel cover 30 is attached to the wheel 10, so force applied between the wheel 10 and the wheel cover 30 is received by engaging protruding portions that will be described later. In contrast, when the force receiving portions 94 are provided, force is also received by the force receiving portions 94, so the force received by the engaging protruding portions is lessened. As a result, the engaging protruding portions are not as easily damaged. Accordingly, the force receiving portions 94 are preferably provided in opposing positions (i.e., positions spaced apart by a center angle of 180°). In this example embodiment, the relative positional relationship is such that the force receiving portions 94*a*1 and 94*b*2 oppose one another, and the force receiving portions 94*a*2 and 94*b*1 oppose one another. In this example embodiment, two each the force receiving portions 94 are provided on each of the guide portion main bodies 84*a* and 84*b*, with one force receiving portion 94 being provided on each end portion in the circumferential direction of each of the guide portion main bodies 84*a* and 84*b*. Alternatively, three or more of the force receiving portions 94 may be provided on each of the guide portion main bodies 84*a* and 84*b*. Also, one may be provided in a center portion in the circumferential direction of each of the guide portion main bodies 84*a* and 84*b*. On the other hand, while it is possible to provide the force receiving portions 94 across the entire guide portion main bodies 84*a* and 84*b* in the circumferential direction, if the area of the abutting surface of the force receiving portions 94 is too large, resistance when attaching the wheel cover 30 to the wheel 10 will increase. In contrast, providing the force receiving portions 94 on a portion in the circumferential direction of the guide portion main bodies 84 enables the load received by the engaging protruding portions to be reduced while avoiding excessive resistance.

(Engaging Portion)

As shown in FIG. 6, the engaging members 82*a* and 82*b* extend substantially parallel to the axis L. Outside end portions of the engaging members 82*a* and 82*b* are designated one end portions 96*a* and 96*b*, and inside end portions thereof are designated other end portions 98*a* and 98*b*. The one end portions 96*a* and 96*b* are positioned protruding to the outside from the opening 72 and are free. Also, two each of an engaging protruding portion 100*a* and an engaging protruding portion 100*b* (i.e., engaging protruding portions 100*a*1, 100*a*2, 100*b*1, and 100*b*2) are provided with gaps therebetween in a center portion in the circumferential direction, on the other end portions 98*a* and 98*b*. In this example embodiment, each of the engaging protruding portions 100*a*1, 100*a*2, 100*b*1, and 100*b*2 corresponds to an engaging portion. Also, the engaging members 82*a* and 82*b* are connected by an engaging portion connecting member 102 at the other end portions 98*a* and 98*b*. The engaging portion connecting member 102 is generally U-shaped and is fixed to the guide connecting member 90 at a middle portion. The engaging members 82*a* and 82*b* are held to the attaching portion main body 60 via the engaging portion connecting member 102 and the guide connecting member 90. A plurality of reinforcing portions (ribs) 104*p*, 104*q*, and 104*r* (see FIGS. 4 and 5) that extend in the diametrical direction are provided parallel to each other on the engaging portion connecting member 102. Each of these reinforcing portions 104*p*, 104*q*, and 104*r* is a plate-shaped member that is provided protruding out in the axial direction from the engaging portion connecting member 102, making the engaging members 82*a* and 82*b* less prone to deforming in a direction in which they come closer together.

When force in the inner peripheral direction is applied to the one end portions 96*a* and 96*b* of the engaging members 82*a* and 82*b*, the engaging members 82*a* and 82*b* pivot about the other end portions 98*a* and 98*b* (also including elastic deformation (bending toward the inner peripheral side)), such that the engaging protruding portions 100*a*1, 100*a*2, 100*b*1, and 100*b*2 pivot toward the inner peripheral side. If the engaging protruding portions 100*a* were provided continuous in the circumferential direction (i.e., if they were not divided by the center portion), the difference between the positions in the axial direction of the center portions and the end portions in the circumferential direction of the engaging protruding portions 100*a* would increase (i.e., the center portion would be positioned farther to the outside in the axial direction) in the pivoted state. As a result, the center portions of the engaging protruding portions 100*a* may catch on the engageable protruding portion 22 of the ornament receiving hole 20, thus making smooth attachment/removal difficult. On the other hand, if the lengths in the circumferential direction of the engaging members 82 and the engaging protruding portions 100 are shortened, the difference in the positions in the axial direction between both end portions of the engaging protruding portions 100 would be less, but the portion that engages with the engageable protruding portion 22 would also be reduced, so the center attaching portion 34 is apt to come off. Also, it is possible to shorten the lengths in the circumferential direction of the engaging members 82 and increase the number of engaging members 82, but doing so would make the structure complex. In contrast, increasing the lengths in the circumferential direction of the engaging members 82*a* and 82*b* and providing the engaging protruding portions 100*a*1, 100*a*2, 100*b*1, and 10062 in sets of two with gaps in the center portions makes it possible to reduce the difference in the positions in the axial direction between both end portions in the circumferential direction of the engaging protruding portions 100*a*1, 100*a*2, 100*b*1, and 100*b*2, without making the structure complex. Doing so also makes the center attaching portion 34 less apt to come off.

If force in the inner peripheral direction were to be applied to the one end portions 96*a* and 96*b* when the reinforcing portions 104*p*, 104*q*, and 104*r* are not provided, the engaging portion connecting member 102 and the engaging members 82 would deform. Therefore, when the force is released, the engaging portion connecting member 102 and the engaging members 82 may not return sufficiently, so sufficient binding force may not be able to be obtained. In contrast, when the reinforcing portions 104*p*, 104*q*, and 104*r* are provided on the engaging portion connecting member 102, even if force is applied to the one end portions 96*a* and 96*b*, the engaging portion connecting member 102 will not easily deform. Instead, mainly the engaging members 82*a* and 82*b* will deform. Therefore, when the force is released, the engaging protruding portions 100 are able to pivot to the outer peripheral side, thus inhibiting the binding force from becoming insufficient. In this example embodiment, the guide connecting member 90 and the engaging portion connecting member 102 that includes the reinforcing portions 104*p*, 104*q*, and 104*r* form a rigid retaining portion.

FIGS. 4 to 6 show a state in which the center attaching portion 34 is formed from a plurality of members, but the center attaching portion 34 may also be integrally formed (i.e., formed by a single member). For example, when made by injection molding or the like, the center attaching portion 34 will be integrally formed. That is, regardless of the method by which the center attaching portion 34 is formed, the center attaching portion 34 may be integrally formed or formed from a plurality of members. This also applies to the example embodiments described below.

(Attaching and Removing Operations)

Next, the operations of attaching and removing the wheel cover 30 structured as described above to and from the wheel 10 will be described.

(Attaching Operation)

(Operation 1)

Figure 7A:
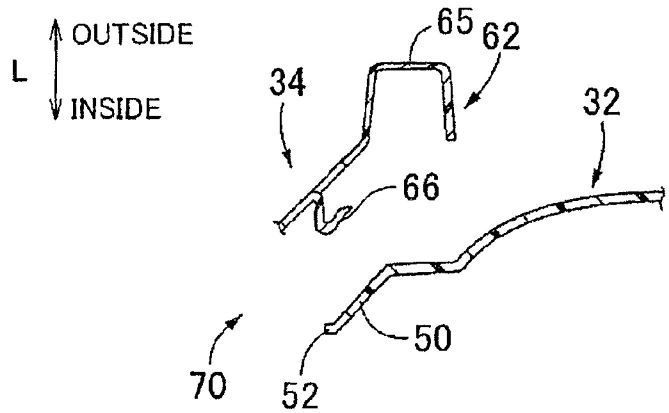
FIGS. 7A to 7C are operational views when connecting the cover attaching portion to the cover main body of the wheel cover according to the first example embodiment.
Figure 7B:
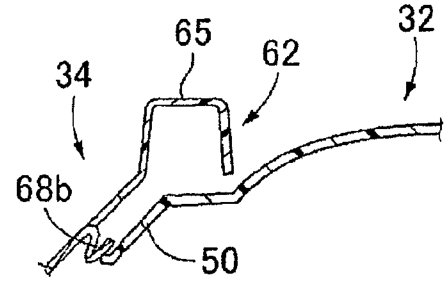
Figure 7C:
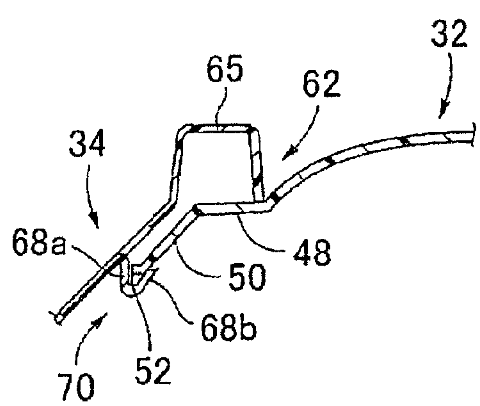

The center attaching portion 34 and the cover main body 32 are connected together in advance. As shown in FIGS. 7A to 7C, a worker inserts the center attaching portion 34 in the axial direction on the inner peripheral side of the cover main body 32. As shown in FIG. 7B, the connecting pawls 66 (i.e., the outer peripheral surface of the opposing portion 68*b*) are pushed to the inner peripheral side by the inner peripheral edge portion 52 (or the sloped portion 50) of the cover main body 32, and thus elastically deform. When the connecting pawls 66 pass the inner peripheral edge portion 52 and the pushing force is released, the connecting pawls 66 return to their original shape by restoring force, such that the inner peripheral edge portion 52 of the cover main body 32 is housed between the opposing portions 68*a* and 68*b*, as shown in FIG. 7C. As a result, the center attaching portion 34 and the cover main body 32 are connected together. In this case, the connecting operation is easy when the worker pushes the flat surface 65 of the pressure apply portion 62 of the center attaching portion 34 toward the cover main body 32. Also, in this state, the pressure apply portion 62 of the center attaching portion 34 is positioned on the flat surface portion 48 of the cover main body 32, and the cover main body 32 and the center attaching portion 34 overlap (with the cover main body 32 on the inside and the center attaching portion 34 on the outside) in the axial direction at a portion on the inner peripheral side of the flat surface portion 48 of the cover main body 32. In this way, the inner peripheral edge portion 52 effectively serves to make the connecting pawls 66 elastically deform in the radial direction.

(Operation 2)

Figure 8A:
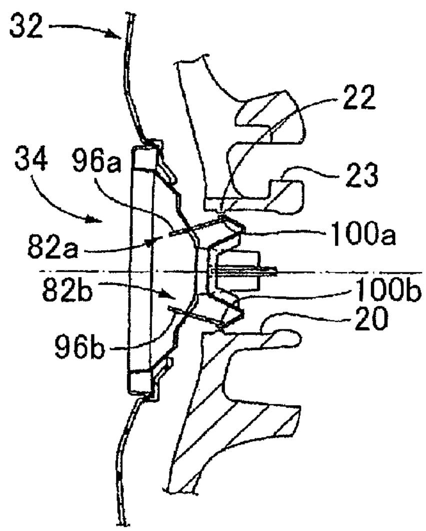
FIGS. 8A and 8B are operational views when attaching the wheel cover according to the first example embodiment to the wheel.
Figure 8B:
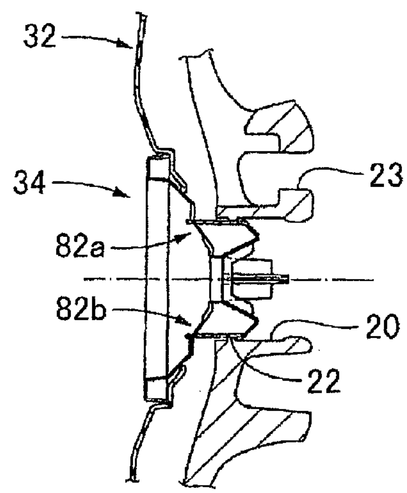

The cover main body 32 and the center attaching portion 34 that have been connected together are then attached to the wheel 10. The center attaching portion 34 is inserted into the ornament receiving hole 20, and the worker applies force in the inner peripheral direction to the one end portions 96*a* and 96*b* of the engaging members 82*a* and 82*b*, as shown in FIG. 8A. The engaging protruding portions 100*a* and 100*b* are moved to the inner peripheral side by the pivoting of the engaging members 82*a* and 82*b*. The worker then pushes the center attaching portion 34 in along the axis L until the engaging protruding portions 100*a* and 100*b* are positioned to the inside of the engageable protruding portion 22. In this state, when the force in the inner peripheral direction that is applied to the one end portions 96*a* and 96*b* is released, the engaging protruding portions 100*a*1, 100*a*2, 100*b*1, and 100*b*2 are able to be made to engage on the inside in the axial direction of the engageable protruding portion 22, as shown in FIG. 8B, by the restoring force. In this state, the pressure apply portion 62 of the center attaching portion 34 abuts against the flat surface portion 48 of the cover main body 32, and the worker pushes the cover main body 32 toward the wheel 10. Also, stress generated in the wheel cover 30 due to the shape (i.e., the offset amount) of the wheel 10 not matching the shape of the wheel cover 30 is received by a portion of the cover main body 32 that is on the inner peripheral side of the bead 42, and causes this portion to deform. As a result, the outer peripheral edge 44 of the cover main body 32 is able to be well abutted against the tire 14, so the disc portion 16 of the wheel 10 can be well protected from the outside.

The attaching operation is not limited to being performed in the manner described above. For example, when the center attaching portion 34 is inserted into the ornament receiving hole 20, the center attaching portion 34 may simply be pushed in a direction parallel to the axis L (i.e., pushed at the flat surface 65 of the pressure apply portion 62). The engaging protruding portions 100*a*1, 100*a*2, 100*b*1, and 100*b*2 are able to be pushed in to the inside of the engageable protruding portion 22 by the elastic deformation of the engaging members 82*a* and 82*b*. Also, attachment of the cover main body 32 to the wheel 10 may also be performed simultaneously with the connection of the cover main body 32 to the center attaching portion 34. The cover main body 32 may be attached to the wheel 10, and the cover main body 32 may be connected to the center attaching portion 34, by placing the cover main body 32 against the wheel 10 and inserting the center attaching portion 34 into the ornament receiving hole 20.

(Removing Operation)

Figure 8C:
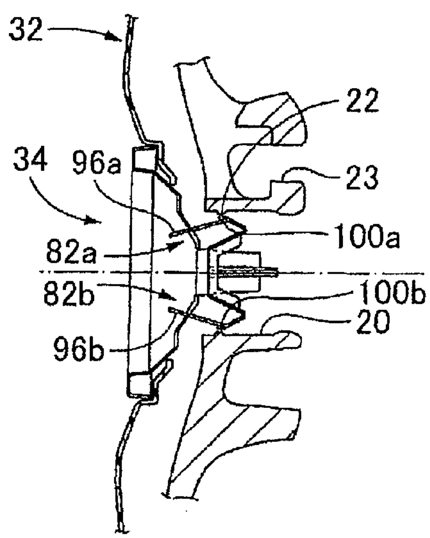
FIGS. 8C and 8D are operational views when removing the wheel cover according to the first example embodiment from the wheel.
Figure 8D:
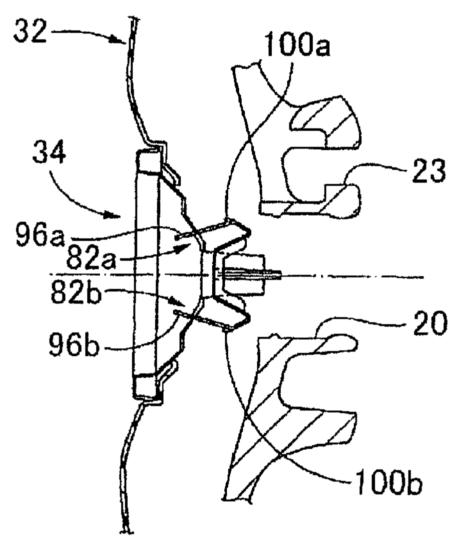

As shown in FIG. 8C, the worker applies force in the inner peripheral direction to the one end portions 96*a* and 96*b* of the engaging members 82*a* and 82*b* (i.e., force to bring the engaging members 82*a* and 82*b* closer together). Pivoting of the engaging members 82*a* and 82*b* causes the engaging protruding portions 100*a*1, 100*a*2, 100*b*1, and 100*b*2 to move to the inner peripheral side, and thus come away from the engageable protruding portion 22. The engaging protruding portions 100 disengage from the engageable protruding portion 22, so as shown in FIG. 8D, the center attaching portion 34 is able to be easily moved to the outside in the axial direction (i.e., pulled out), thus enabling the wheel cover 30 to be removed from the wheel 10.

In this way, in this example embodiment, the engaged state and the disengaged state of the engaging protruding portions 100 and the engageable protruding portion 22 are switched by the pivoting of the engaging protruding portions 100 following the pivoting (also including bending) of the engaging members 82. Therefore, during attachment/removal, the load that is applied to the engaging protruding portions 100 is reduced, so the engaging protruding portions 100 will not easily be damaged. As a result, the number of times that the wheel cover 30 can be used is able to be increased.

Figure 9A:
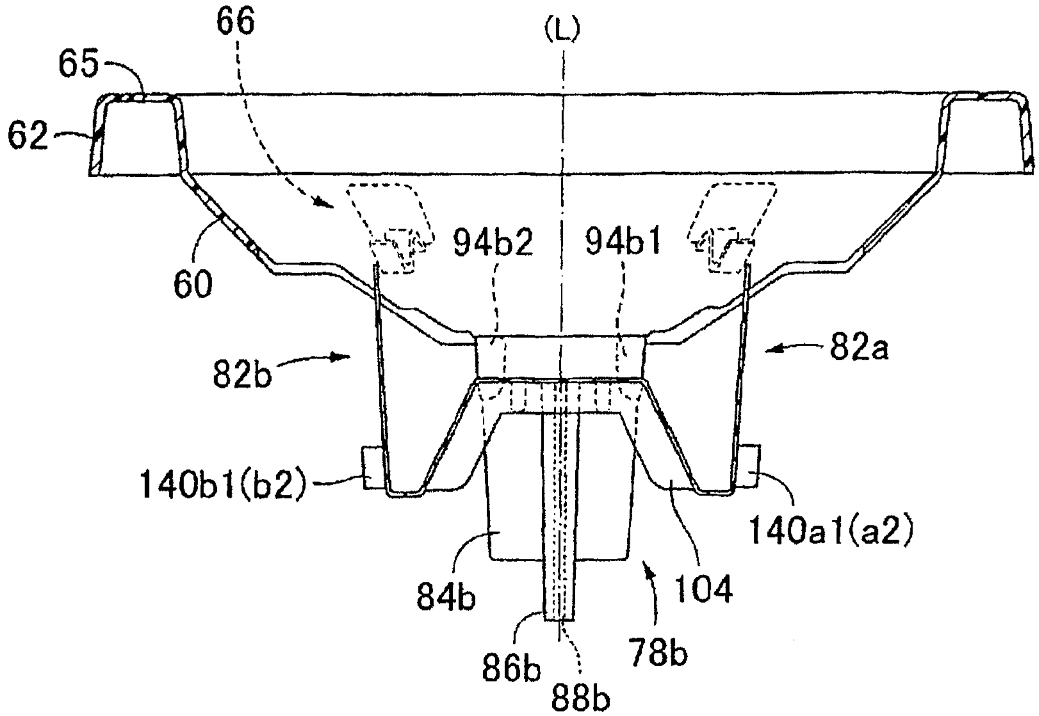
FIG. 9A is a view corresponding to the sectional view taken along line C-C in FIG. 4, of a cover attaching portion of a wheel cover according to a modified example of the first example embodiment of the invention.
Figure 9B:
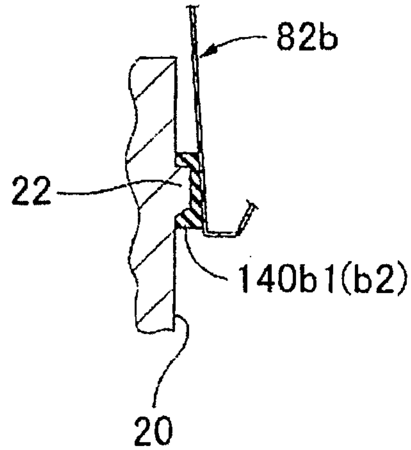
FIG. 9B is a sectional view of the main portions when the cover attaching portion in FIG. 9A is attached to the wheel.

In the example embodiment described above, the engaging protruding portions 100*a*1, 100*a*2, 100*b*1, and I 00*b*2 and portions of the engaging members 82*a* and 82*b* other than the engaging protruding portions are made of the same type of resin material, but the engaging protruding portions may also be made of material with a larger friction coefficient than the portions of the engaging members 82*a* and 82*b* other than the engaging protruding portions. FIGS. 9A and 9B show one example of this. As shown in FIGS. 9A and 9B, the engaging protruding portions are engaging protruding portions 140*a*1 (140*a*2) and 140*b*1 (140*b*2) that are made of rubber. In this way, the engaging protruding portions 140 are made of material with a high friction coefficient such as rubber, so in an attached state, even if force in a direction parallel to the axis L is applied to the wheel cover 30, the wheel cover 30 will not easily come off of the wheel 10 because of friction force. As shown in FIG. 9B, when the engaging protruding portions 140 are engaged with the engageable protruding portion 22, the engaging protruding portions 140 are not positioned to the inside of the engageable protruding portion 22 with a space therebetween, but are able to abut against the engageable protruding portion 22. Rubber or the like is not very rigid and easily elastically deforms, so the elastic deformation of the rubber or the like itself enables it to be engaged while abutting against the engageable protruding portion 22.

Second Example Embodiment

Figure 10:
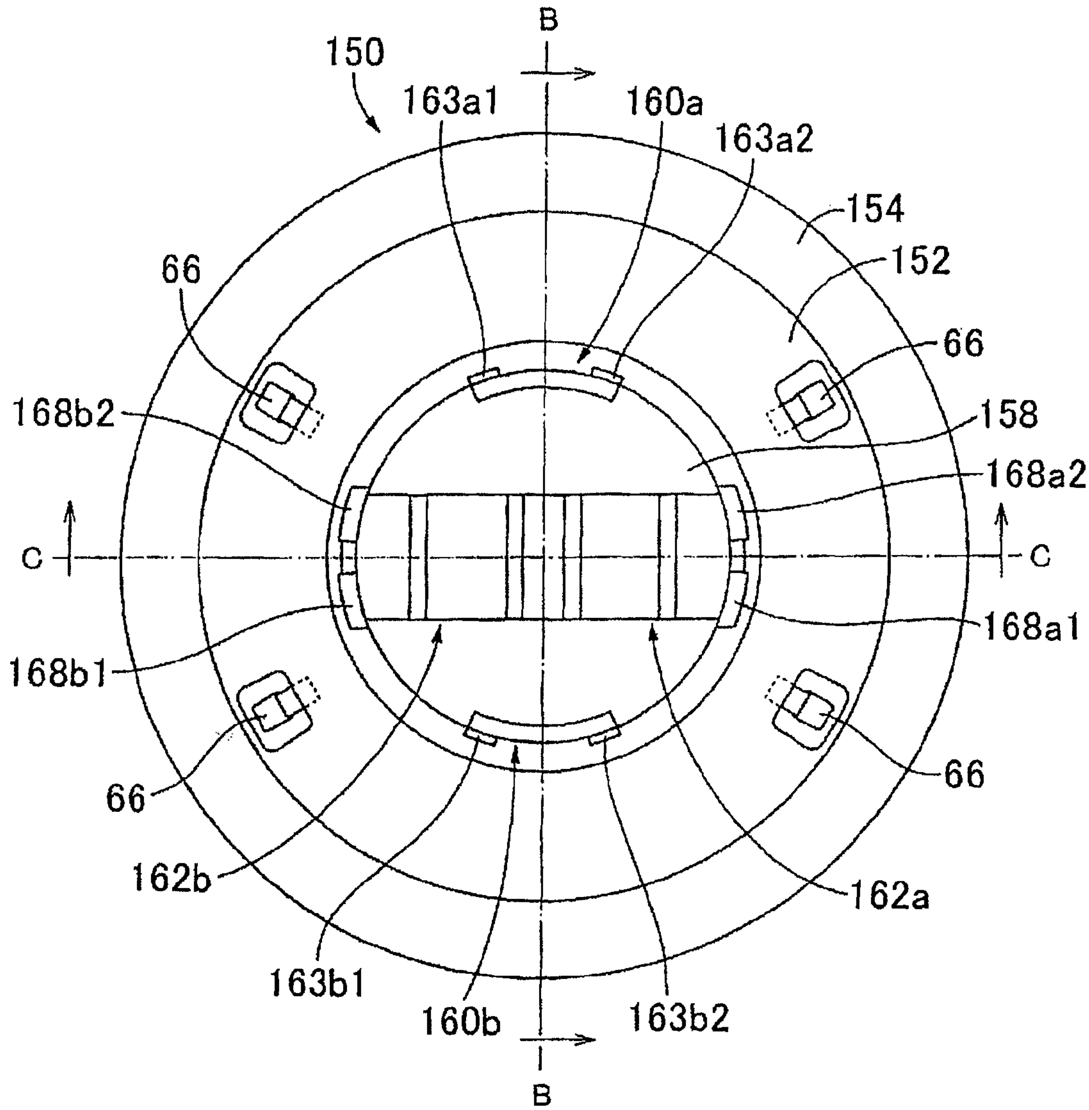
FIG. 10 is a plan view of a cover attaching portion of a wheel cover according to a second example embodiment of the invention.
Figure 11:
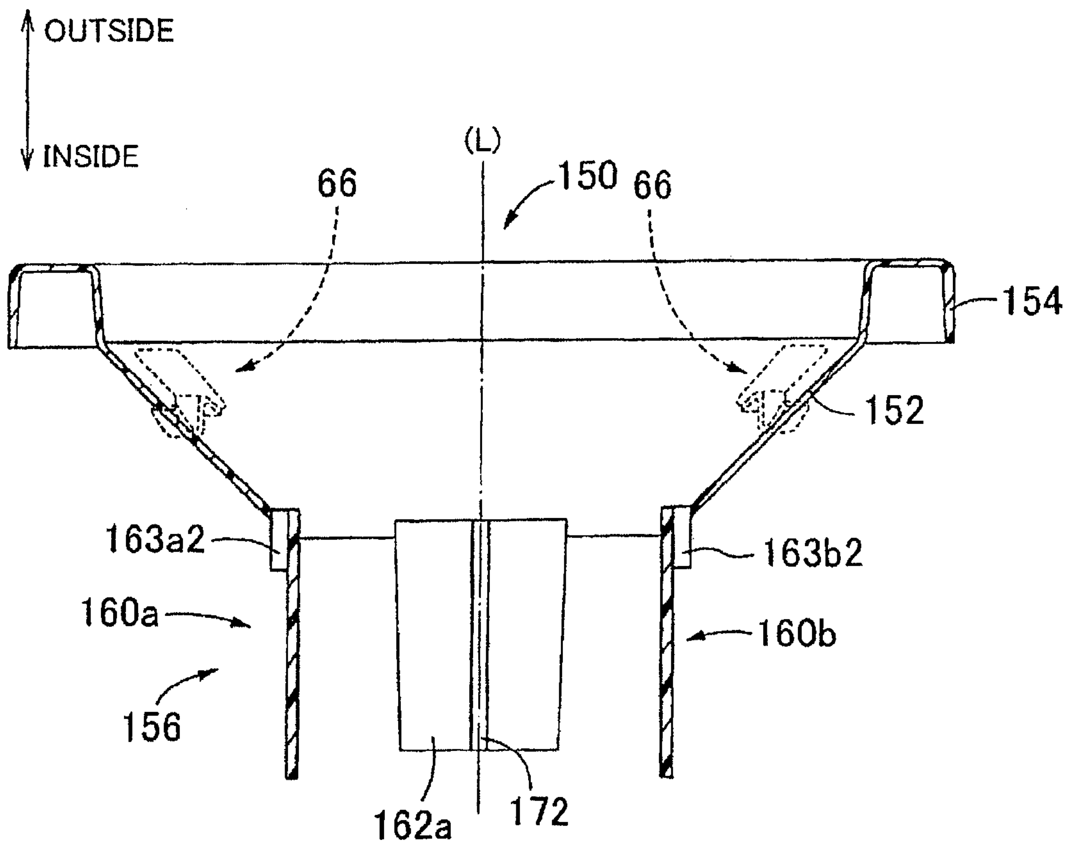
FIG. 11 is a sectional view taken along line B-B in FIG. 10.
Figure 12:
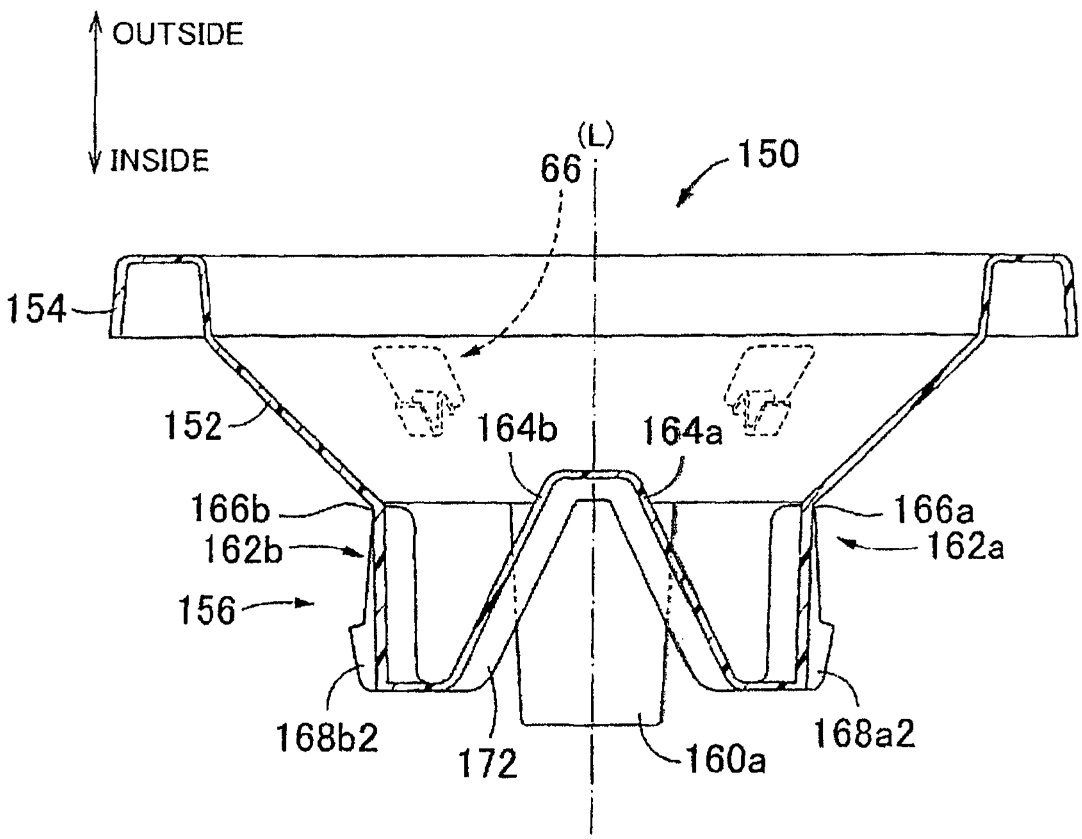
FIG. 12 is a sectional view taken along line C-C in FIG. 10.

A center attaching portion 150 of a wheel cover according to a second example embodiment will now be described with reference to FIGS. 10 to 12. The cover main body 32 is the same as it is in the first example embodiment, so a description thereof will be omitted. In FIGS. 10 to 12, the center attaching portion 150 includes an attaching portion main body 152, a pressure apply portion 154, and an inserting portion 156. The attaching portion main body 152 has a generally conical shape. The pressure apply portion 154 is provided on an outside open portion, and a circular opening 158 is provided on the inside.

(Inserting Portion)

The inserting portion 156 includes a pair of guide members 160*a* and 160*b*, and a pair of engaging members 162*a* and 162*b*. As shown in FIGS. 10 and 11, the pair of guide members 160*a* and 160*b* are held to the inner peripheral surface of the attaching portion main body 152. Force receiving portions 163*a*1, 163*a*2, 163*b*1, and 163*b*2 are provided on both end portions (i.e., one on each), in the circumferential direction, of the outside end portions of the guide members 160*a* and 160*b*.

(Engaging Portions)

As shown in FIGS. 10 and 12, the engaging members 162*a* and 162*b* are curved in general U-shapes, with one end portions 164*a* and 164*b* positioned on the inner peripheral side, and other end portions 166*a* and 166*b* positioned on the outer peripheral side. The engaging members 162*a* and 162*b* are held to the attaching portion main body 152 at the other end portions 166*a* and 166*b*. In this example embodiment, the attaching portion main body 152 serves as an engaging member connecting portion. Also, the one end portions 164*a* and 164*b* and the other end portions 166*a* and 166*b* are positioned on the outside, a curved portion is positioned on the inside, and engaging protruding portions 168*a*1, 168*a*2, 168*b*1, and 168*b*2 are provided on portions on the inside thereof. A portion that includes the one end portions 164*a* and 164*b* of the engaging members 162*a* and 162*b* is sloped toward the inner peripheral side farther toward the outside in the axial direction, and in this example embodiment, the one end portions 164*a* and 164*b* come close to the opening 158. Also, the edges of the one end portions 164*a* and 164*b* are connected together so as to form a generally inverted V-shape. Furthermore, reinforcing portions 172 (ribs) that protrude in the axial direction are provided between the other end portions 166*a* and 166*b*, along the diametrical direction, on the engaging members 162*a* and 162*b*.

(Attaching and Removing Operations)

Figure 13A:
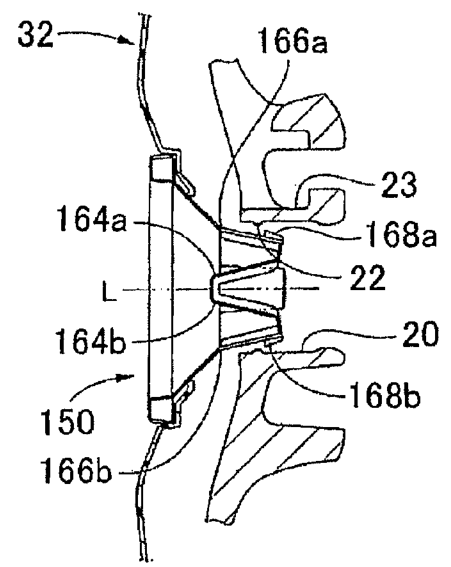
FIGS. 13A and 13B are operational views when attaching the wheel cover according to the second example embodiment to a wheel.
Figure 13B:
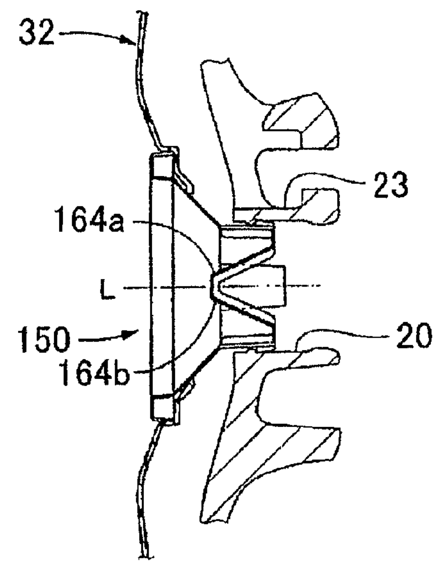
Figure 13C:
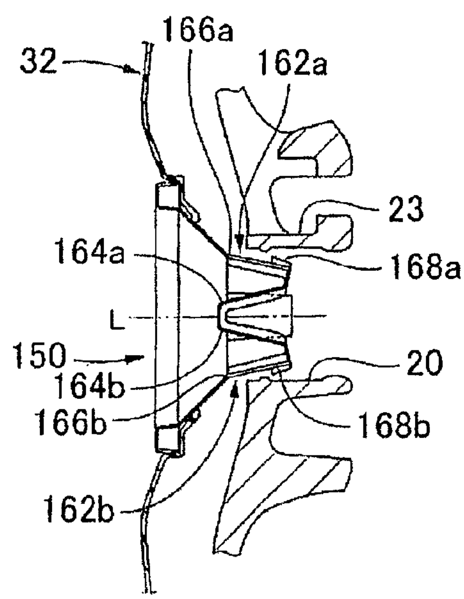
FIGS. 13C and 13D are operational views when removing the wheel cover according to the second example embodiment from the wheel.
Figure 13D:
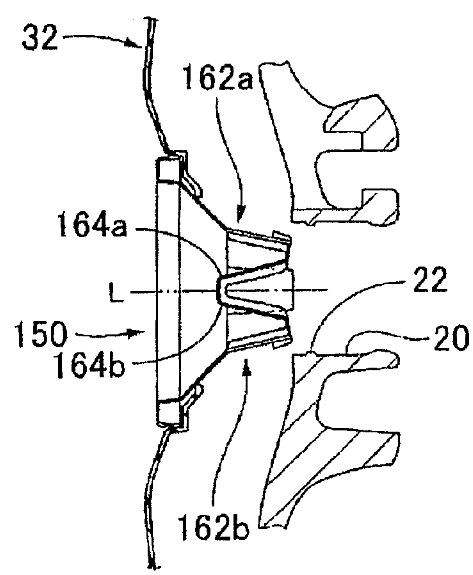

When attaching the wheel cover structured as described above, a worker applies force in a direction that brings the one end portions 164*a* and 164*b* (i.e., the portions that form the inverted V-shape) closer together (i.e., toward the inner peripheral side), as shown in FIG. 13A. The engaging members 162*a* and 162*b* pivot about the other end portions 166*a* and 166*b*, such that the engaging protruding portions 168*a* and 168*b* move in the inner peripheral direction. After the center attaching portion 150 has been pushed in the axial direction until the engaging protruding portions 168*a* and 168*b* are positioned to the inside of the engageable protruding portion 22, the force applied to the one end portions 164*a* and 164*b* is released. As shown in FIG. 13B, the engaging members 162*a* and 162*b* return to their original states, such that the engaging protruding portions 168*a* and 168*b* engage on the inside of the engageable protruding portion 22. When removing the wheel cover, a worker applies force in the direction to bring the one end portions 164*a* and 164*b* closer together, as shown in FIG. 13C. The engaging protruding portions 168*a* and 168*b* are moved in the inner peripheral direction, such that the state changes from an engaged state to a disengaged state. As a result, the center attaching portion 150 can be pulled out along the axis L, thus enabling the wheel cover 30 to be removed from the wheel 10, as shown in FIG. 13D. In this way, in this example embodiment, the engaging members 162*a* and 162*b* are made to pivot around a portion to the outside of the position where the engaging protruding portions 168*a* and 168*b* are provided, by force that squeezes the inverted V-shaped portion being applied. As a result, the engaging protruding portions 168*a* and 168*b* are able to be nicely separated from the engageable protruding portion 22.

It is not absolutely essential that the engaging members 162*a* and 162*b* be made of a single material. That is, the engaging protruding portions 168*a* and 168*b* (or surrounding portions that include the engaging protruding portions 168*a* and 168*b*) may be made of material with a smaller thermal expansion coefficient than other portions. Zirconium tungstate ($ZrW_2O_3$) and silicon oxide ($LiO_2$—$Al_2O_3$-$nSiO_2$) or the like correspond to materials with a small thermal expansion coefficient. These are also materials that expand slightly (i.e., materials in which the thermal expansion coefficient is negative) when the temperature decreases. General purpose resin such as polypropylene is material that expands (i.e., material in which the thermal expansion coefficient is positive) when the temperature rises, so the portion of the engaging members 162*a* and 162*b* other than the engaging protruding portions 168*a* and 168*b* can conceivably be made of material with a positive thermal expansion coefficient. In this way, if the dimensional stability of the engaging protruding portions 168*a* and 168*b* can be improved, a change in the tightening force (i.e., the binding force) caused by a change in temperature can be suppressed.

Third Example Embodiment

Figure 14:
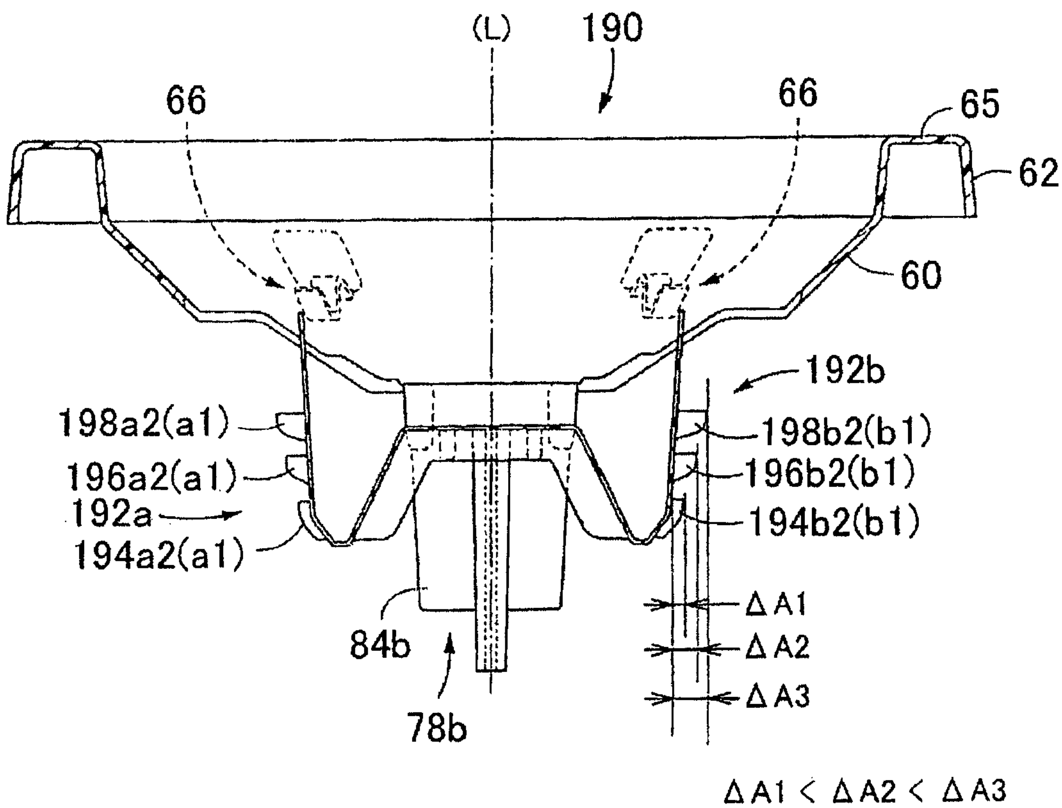
FIG. 14 is a sectional view (i.e., a view corresponding to the sectional view taken along line C-C in FIG. 4) of a cover attaching portion of a wheel cover according to a third example embodiment of the invention.

Next, a center attaching portion 190 of a wheel cover according to a third example embodiment of the invention will be described with reference to FIG. 14. The other portions are the same as they are in the first example embodiment, so descriptions thereof will be omitted. In this example embodiment, a plurality of engaging protruding portions 194*a*, 194*b*, 196*a*, 196*b*, 198*a*, and 198*b* are provided with gaps therebetween in the axial direction, on engaging members 192*a* and 1926, as shown in FIG. 14. The engaging protruding portions 194*a*1 (194*a*2), 194*b*1 (194*b*2), 196*a*1 (196*a*2), 196*b*1 (196*b*2), 198*a*1 (198*a*2), and 198*b*1 (198*b*2) each have a different protrusion amount ΔA in the radial direction. The protruding portions 198 positioned on the outside in the axial direction have the largest protrusion amount ΔA3 in the radial direction, the protrusion amount ΔA1 of the protruding portions 194 positioned on the inside is the smallest, and the protrusion amount ΔA2 of the protruding portions 196 positioned in the middle is medium-sized (i.e., $\Delta A1<\Delta A2<\Delta A3$). When the inside diameter of the ornament receiving hole 20 is large, the insertion length of the center attaching portion 190 into the ornament receiving hole 20 is increased, and when the inside diameter is small, the insertion length is decreased. Therefore, even if the inside diameter of the ornament receiving hole 20 is different, the wheel cover of this example embodiment is able to be used. Also, the protruding portions 198 with the large protrusion amount ΔA are provided on the outside in the axial direction. Therefore, the insertion length need only be small when the inside diameter of the ornament receiving hole 20 is small, and the insertion length need only be large when the inside diameter is large. The design is such that the protruding portions 198 with the large protrusion amount ΔA will not to get in the way when the inside diameter is small.

Fourth Example Embodiment

Figure 15:
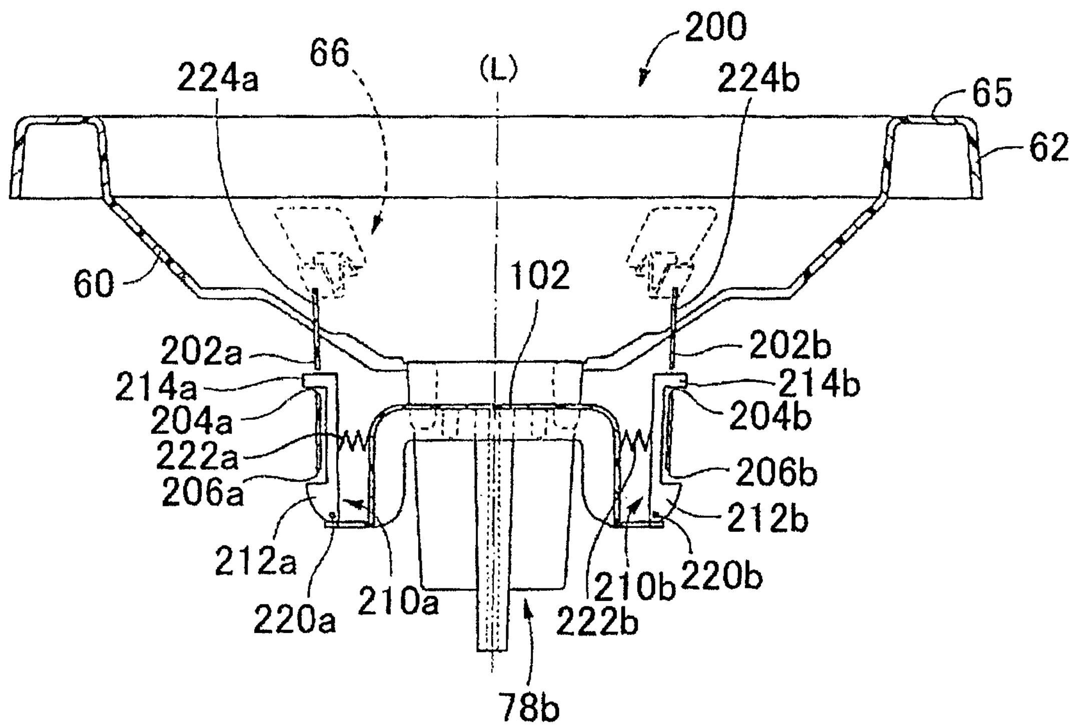
FIG. 15 is a sectional view (i.e., a view corresponding to the sectional view taken along line C-C in FIG. 4) of a cover attaching portion of a wheel cover according to a fourth example embodiment of the invention.

Next, a center attaching portion 200 of a wheel cover according to a fourth example embodiment of the invention will be described with reference to FIG. 15. The other portions are the same as they are in the first example embodiment, so descriptions thereof will be omitted. In FIG. 15, engaging member main bodies 202*a* and 202*b* are provided in positions opposing one another. Outer holes 204*a* and 204*b* and inner holes 206*a* and 206*b* that open in the radial direction are provided in two locations separated in the axial direction in the engaging member main bodies 202*a* and 202*b*, and protruding members 210*a* and 210*b* are arranged on the inner peripheral side of the engaging member main bodies 202*a* and 202*b*. Each of the protruding members 210*a* and 210*b* is a member that extends in a direction parallel to the axis L, and has an engaging protruding portion 212*a* and 212*b* formed on an inside end portion, and a rod 214*a* and 214*b* provided extending in the radial direction on an outer end portion. The protruding members 210*a* and 210*b* are retained so as to be able to pivot about pivot shafts 220*a* and 220*b* at the inside end portion, in a posture with the engaging protruding portions 212*a* and 212*b* protruding out in the outer peripheral direction from the inner holes 206*a* and 206*b*, and the rods 214*a* and 214*b* protruding in the outer peripheral direction from the outer holes 204*a* and 204*b*, and are retained via springs 222*a* and 222*b* at a middle portion. The springs 222*a* and 222*b* are provided in a state that applies urging force to the protruding members 210*a* and 210*b* in a direction that pushes the engaging protruding portions 212*a* and 212*b* to the outer peripheral side.

In the center attaching portion 200 structured as described above, when the rods 214*a* and 214*b* are pushed to the inner peripheral side against the urging force of the springs 222*a* and 222*b*, in the engaging member main bodies 202*a* and 202*b*, the protruding members 210*a* and 210*b* pivot about the pivot shafts 220*a* and 220*b* such that the engaging protruding portions 212*a* and 212*b* move to the inner peripheral side. As a result, the engaging protruding portions 212*a* and 212*b* move away from the engageable protruding portion 22. In this state, the wheel cover can be easily attached to or removed from the wheel 10 by moving (i.e., pushing in or pulling out) the center attaching portion 200 parallel to the axis L. In this example embodiment, the engaging members are formed by the protruding members 210*a* and 210*b*, the rods 214*a* and 214*b* correspond to one end portions of the protruding members 210*a* and 210*b*, portions that are retained by the pivot shafts 220*a* and 220*b* correspond to the other end portions, and the portion that includes the pivot shafts 220*a* and 220*b* of the engaging member main bodies 202*a* and 202*b*, and the engaging portion connecting member 102 and the like form an engaging member retaining portion. The rods 214*a* and 214*b* may be referred to as operating rods.

In this example embodiment, the engaging member main bodies 202*a* and 202*b* are pivoted by force in the inner peripheral direction being applied to one end portions 224*a* and 224*b* to the outsides of the engaging member main bodies 202*a* and 202*b*, and as a result, the protruding members 210*a* and 210*b* are pivoted. As the protruding members 210*a* and 210*b* pivot, the engaging protruding portions 212*a* and 2126 move to the inner peripheral side and disengage from the engageable protruding portion 22. In this way, the operation to attach the wheel cover to or remove the wheel cover from the wheel 10 may also be performed by operating the one end portions 224*a* and 224*b* to the inner peripheral side. Also, the protruding members 210*a* and 210*b* are also able to be pivotally held, at the inner peripheral side or the outer peripheral side of the protruding members 210*a* and 210*b*, to the engaging member main bodies 202*a* and 202*b*. Furthermore, the technical characteristics described in this example embodiment may be applied to the center attaching portion described in the second example embodiment. The outer peripheral edge of the engaging member main bodies 202*a* and 202*b* may be held to the attaching portion main body 152 of the center attaching portion 150 described in the second example embodiment. In this case, the protruding members 210*a* and 210*b* are made lengths whereby the rods 214*a* and 214*b* are positioned to the outside of the opening 158.

Fifth Example Embodiment

Figure 16:
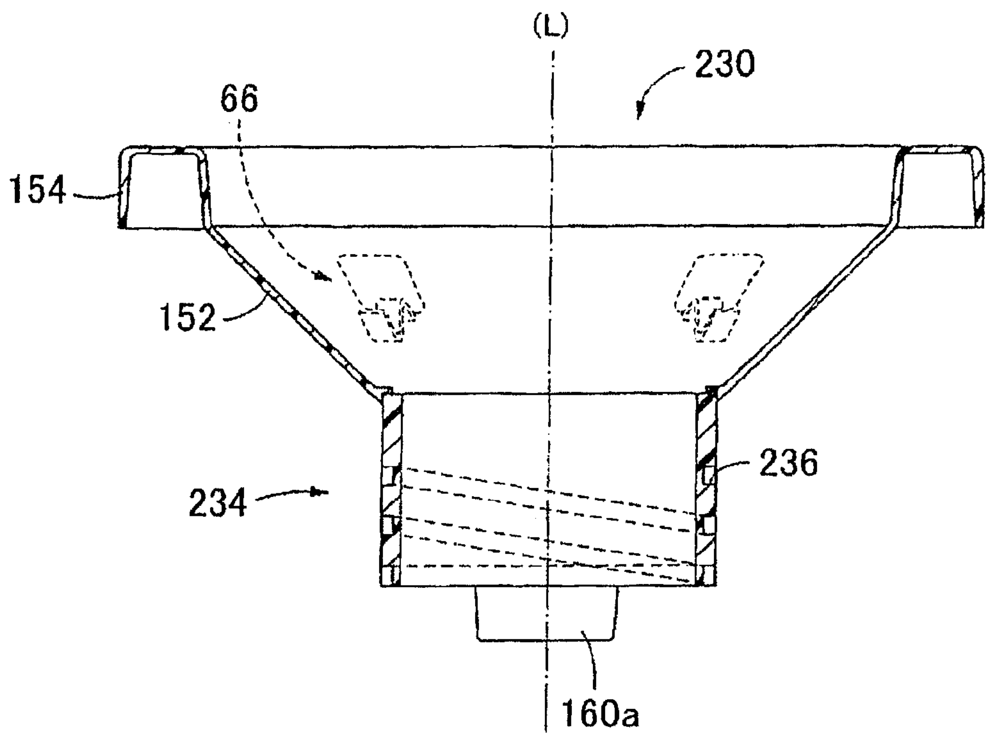
FIG. 16 is a sectional view (i.e., a view corresponding to the sectional view taken along line C-C in FIG. 10) of a cover attaching portion of a wheel cover according to a fifth example embodiment of the invention.

Next, a center attaching portion 230 of a wheel cover according to a fifth example embodiment of the invention will be described with reference to FIG. 16. The other portions are the same as they are in the second example embodiment, so descriptions thereof will be omitted. With the center attaching portion 230, a cylindrical portion 234 that serves as an inserting portion is held to the attaching portion main body 152. A spiral groove 236 is formed in an outer peripheral surface of the cylindrical portion 234, and is able to screw together with the engageable protruding portion 22 of the ornament receiving hole 20. In this example embodiment, with the cylindrical portion 234 inserted into the ornament receiving hole 20, the center attaching portion 230 is rotated relative to the wheel 10 about the axis L (and may also be rotated relative to the cover main body). As a result, the center attaching portion 230 moves to the inside along the axis L, such that the wheel cover attaches to the wheel 10. Also, the center attaching portion 230 moves to the outside of the axis L by being rotated in the reverse direction about the axis L. As a result, the wheel cover can be removed from the wheel 10.

Sixth Example Embodiment

Figure 17:
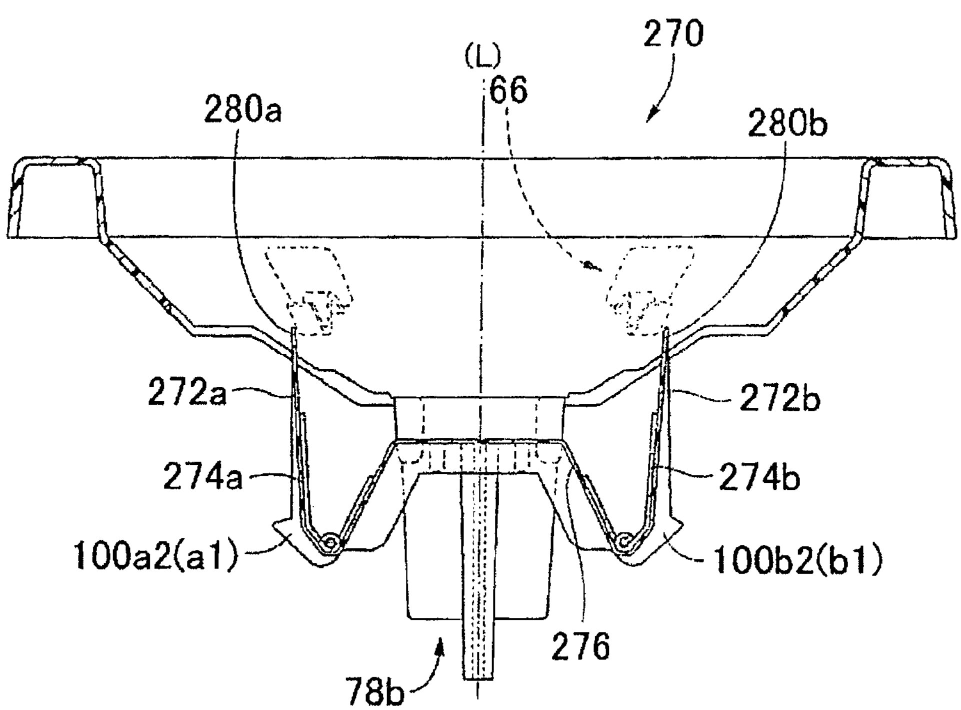
FIG. 17 is a sectional view (i.e., a view corresponding to the sectional view taken along line C-C in FIG. 4) of a cover attaching portion of a wheel cover according to a sixth example embodiment of the invention.

Next, a center attaching portion 270 of a wheel cover according to a sixth example embodiment of the invention will be described with reference to FIG. 17. The other portions are the same as they are in the first example embodiment, so descriptions thereof will be omitted. The center attaching portion 270 according to this example embodiment has the same shape as the center attaching portion 34 of the first example embodiment, but as shown in FIG. 17, spring members 274*a* and 274*b* are arranged on engaging members 272*a* and 272*b*. The spring members 274*a* and 274*b* are provided in a state in which they apply urging force to push the engaging members 272*a* and 272*b* to the outer peripheral side, i.e., in a direction that widens a gap (in the radial direction) between the engaging members 272*a* and 272*b* and a connecting member 276. As a result, urging force in a direction that pushes toward the inner peripheral surface 21 of the ornament receiving hole 20 is applied to the engaging protruding portions 100*a*1 (100*a*2) and 100*b*1 (10062). When force in the inner peripheral direction is applied to one end portions 280*a* and 280*b* of the engaging members 272*a* and 272*b*, the engaging protruding portions 100*a* and 100*b* move to the inner peripheral side and away from the engageable protruding portion 22. Force large enough to pivot the engaging members 272*a* and 272*b* against the urging force of the spring members 274*a* and 274*b* is applied to the one end portions 280*a* and 280*b*.

Seventh Example Embodiment

Figure 18A:
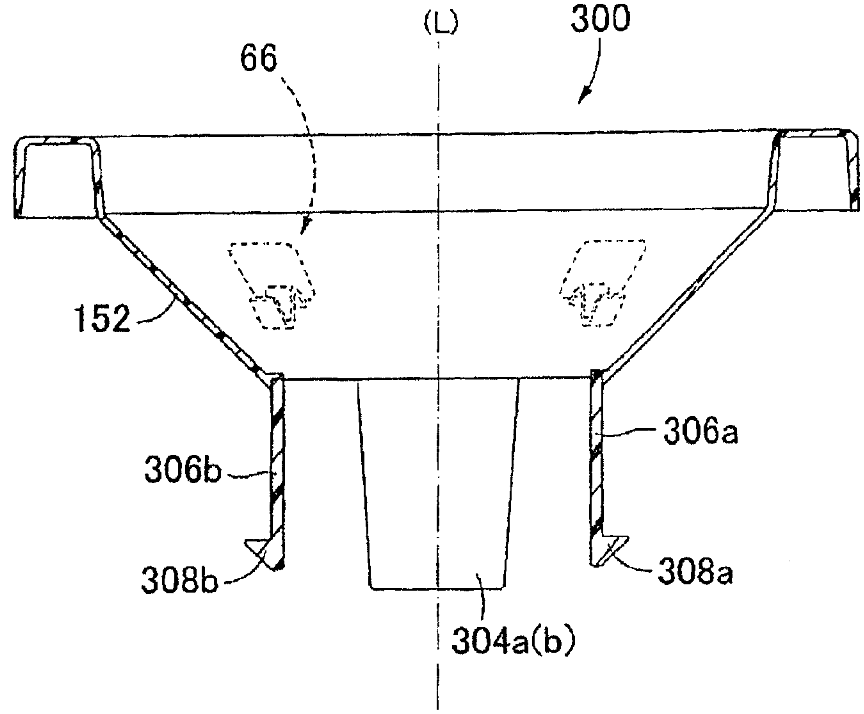
FIG. 18A is a sectional view (i.e., a view corresponding to the sectional view taken along line C-C in FIG. 10) of a cover attaching portion of a wheel cover according to a seventh example embodiment of the invention.
Figure 18B:
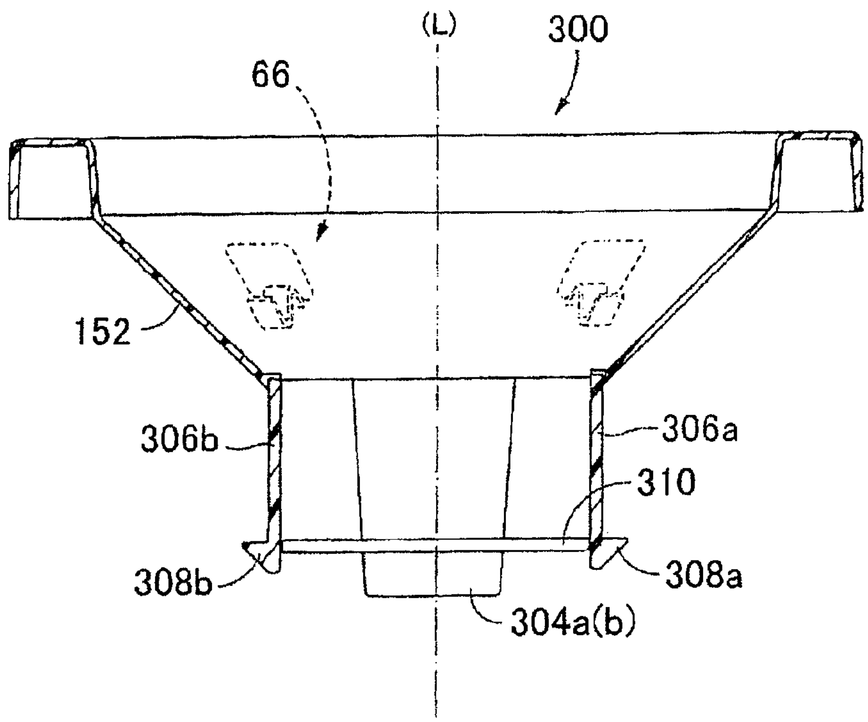
FIG. 18B is a sectional view of the wheel cover according to the seventh example embodiment of the invention attached to a wheel.

Next, a center attaching portion 300 of a wheel cover according to a seventh example embodiment of the invention will be described with reference to FIGS. 18A and 18B. The other portions are the same as they are in the second example embodiment, so descriptions thereof will be omitted. As shown in FIG. 18A, the center attaching portion 300 of this example embodiment includes the attaching portion main body 152, a pair of guide members 304*a* and 304*b* retained to the inside of the attaching portion main body 152, and a pair of engaging members 306*a* and 306*b*. The guide members 304*a* and 304*b* and the engaging members 306*a* and 306*b* are provided alternately in the circumferential direction. The guide members 304*a* and 304*b* and the engaging members 306*a* and 306*b* extend in a direction that is substantially parallel to the axis L, and engaging protruding portions 308*a* and 308*b* are provided on inside end portions of the engaging members 306*a* and 306*b*. As shown in FIG. 18B, when the center attaching portion 300 is pushed into the ornament receiving hole 20 in the direction parallel to the axis L by a worker, the engaging protruding portions 308*a* and 308*b* elastically deform (i.e., bend to the inner peripheral side) by contacting the inner peripheral surface 21 of the ornament receiving hole 20. Then after the center attaching portion 300 is inserted to the point where the engaging protruding portions 308*a* and 3086 are positioned to the inside of the engageable protruding portion 22 of the ornament receiving hole 20, a rod-shaped binding force applying member 310 is pushed, in a posture extending in the diametrical direction, in between the pair of engaging members 306*a* and 306*b* by a worker. As a result, the wheel cover attaches to the wheel 10. Also, by removing the binding force applying member 310, the center attaching portion 300 is able to easily be pulled out in a direction parallel to the axis L, thus enabling the wheel cover to be removed from the wheel 10. In this way, the pair of engaging members 306*a* and 306*b* are prevented from coming closer together while the binding force applying member 310 is held taut between the pair of engaging members 306*a* and 306*b*. Thus, even if force in the radial direction is mistakenly applied to the pair of engaging members 306*a* and 306*b* during an operation to attach or remove the wheel cover or the like, the wheel cover will not come off of the wheel 10. The binding force applying member 310 may also have a ring-shape or a shape in which a rod is arranged in the center of a ring or the like.

Eighth Example Embodiment

Figure 19A:
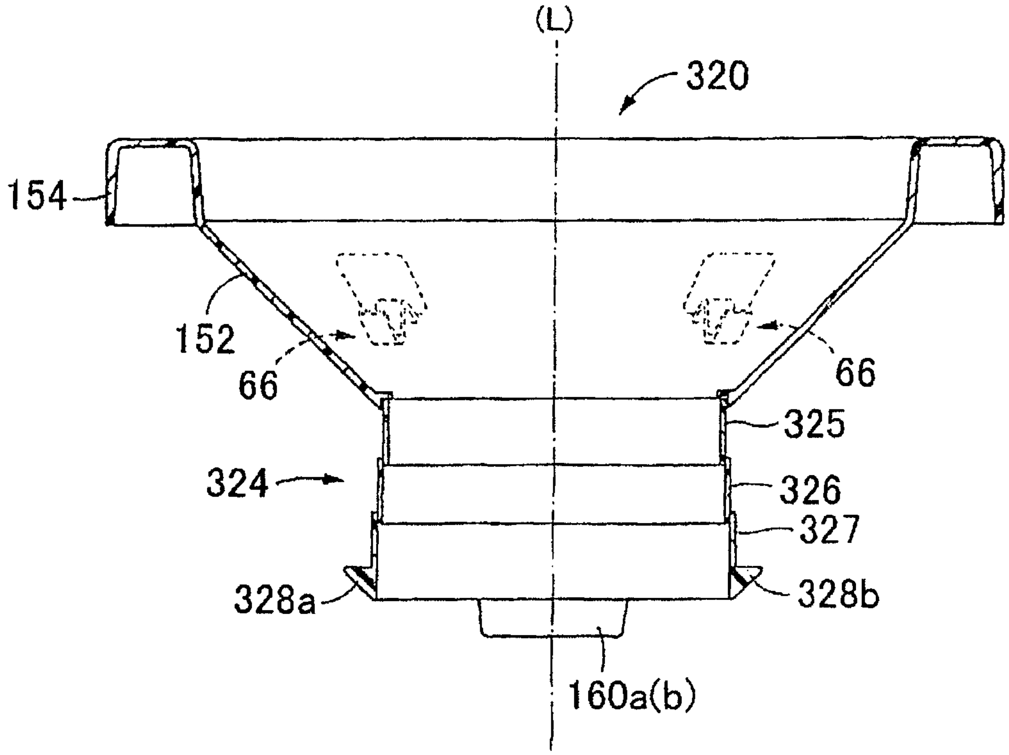
FIG. 19A is a sectional view (i.e., a view corresponding to the sectional view taken along line C-C in FIG. 10) of a cover attaching portion of a wheel cover according to an eighth example embodiment of the invention.
Figure 19B:
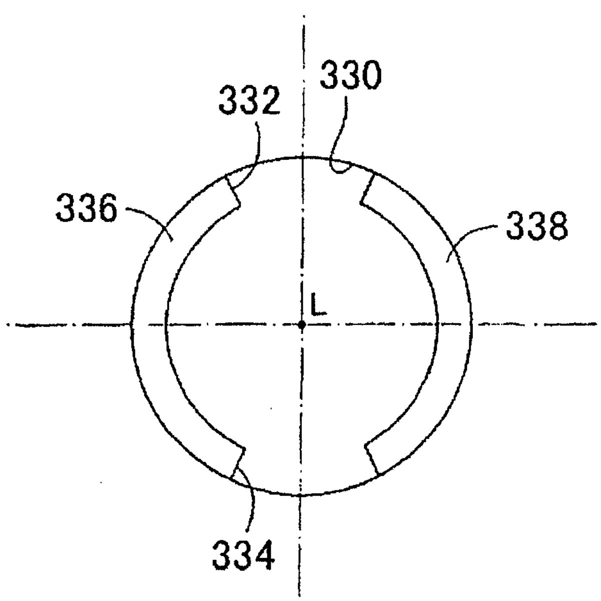
FIG. 19B is a view of the shape of an ornament receiving hole of the wheel to which the wheel cover according to the eighth example embodiment attaches.

Next, a center attaching portion 320 of a wheel cover according to an eighth example embodiment of the invention will be described with reference to FIG. 19A. The other portions are the same as they are in the second example embodiment, so descriptions thereof will be omitted. In the center attaching portion 320 shown in FIG. 19A, an inserting portion 324 that is held to the attaching portion main body 152 is able to expand and contract. The inserting portion 324 includes a plurality of cylindrical, portions 325 to 327 that extend in a direction parallel to the axis L. The plurality of cylindrical portions 325 to 327 are arranged overlapping each other, and are shaped inclined in a direction in which the inside diameter becomes smaller toward the outside. Therefore, it is possible to fix the plurality of cylindrical portions 325 to 327 in positions relative to each other, and thus adjust the length, by adjusting the overlapping portions of the plurality of cylindrical portions 325 to 327. A pair of engaging protruding portions 328*a* and 328*b* are provided on opposing portions of the cylindrical portion 327 that is positioned farthest to the outer peripheral side, among the plurality of cylindrical portions 325 to 327. Meanwhile, in this example embodiment, a pair of engagable protruding portions 336 and 338 are formed, across gaps 332 and 334 in positions separated by a center angle of 180°, on an inner peripheral surface of an ornament receiving hole 330 of the wheel 10, as shown in FIG. 19B. The shape is that of an annular engagable protruding portion with a pair of cutouts formed in it.

The center attaching portion 320 is pushed into the ornament receiving hole 330 in a direction parallel to the axis L by a worker, at a relative phase in which the engaging protruding portions 328*a* and 328*b* correspond to the gaps 332 and 334. After the engaging protruding portions 328*a* and 328*b* pass through the gaps 332 and 334, the engaging protruding portions 328*a* and 328*b* are rotated relative to the wheel, such that the engaging protruding portions 328*a* and 328*b* are positioned to the insides of the engagable protruding portions 336 and 338. As a result, the engaging protruding portions 328*a* and 328*b* engage with the engagable protruding portions 336 and 338, such that the wheel cover is attached to the wheel 10. Also, the center attaching portion 320 is relatively rotated about the axis L in the ornament receiving hole 330 by the worker, such that the engaging protruding portions 328*a* and 328*b* are placed in a relative phase corresponding to the gaps 332 and 334. The center attaching portion 320 is then pulled out in a direction parallel to the axis L. The wheel cover is removed from the wheel 10 by removing the center attaching portion 320 from the ornament receiving hole 330. The pair of engaging members may form a cylindrical shape that is able to expand and contract (i.e., telescope).

Ninth Example Embodiment

Figure 20:
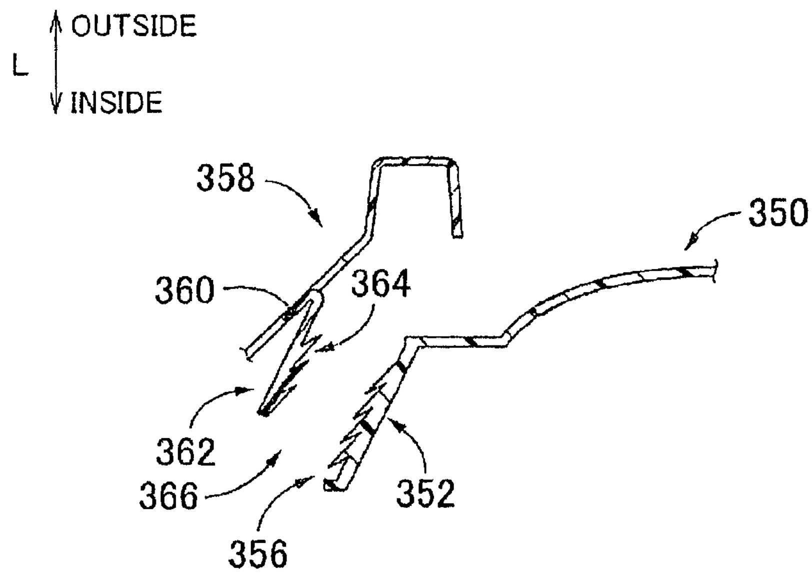
FIG. 20 is a sectional view (a portion) of a cover/attaching portion connecting portion of a wheel cover according to a ninth example embodiment of the invention.

Next, a wheel cover according to a ninth example embodiment of the invention will be described with reference to FIG. 20. In this example embodiment, the structure of the cover/attaching portion connecting portion differs from that described in the first example embodiment. The other portions are the same as they are in the first example embodiment, so descriptions thereof will be omitted. In the example embodiments described below, the inner peripheral edge portion 52 is not essential, so it is omitted from FIGS. 21, 23A, and 23B. A first toothed portion 356 is formed on a sloped portion 352 on the inner peripheral side of a cover main body 350. Also, a plurality of connecting protruding portions 362 that protrude radially outward from an attaching portion main body 360 of a center attaching portion 358 are provided, and a second toothed portion 364 that is able to engage with the first toothed portion 356 is formed on each of the connecting protruding portions 362. The first toothed portion 356 and the second toothed portion 364 together form a ratchet mechanism. The center attaching portion 358 is allowed to move relative to the cover main body 350 from the outside to the inside, but is prevented from moving in the opposite direction. The connecting protruding portions 362 may be rod-shaped, plate-shaped, or shaped like cylinders that are fixed to the outer peripheral surface of the attaching portion main body 360. In this way, while the first toothed portion 356 is engaged with the second toothed portion 364, the center attaching portion 358 will not easily slip to the outside with respect to the cover main body 350. As a result, the center attaching portion 358 and the cover main body 350 are able to be well connected. Also, the relative positional relationship in the connected state of the center attaching portion 358 and the cover main body 350 can be adjusted by adjusting the engaging (i.e., meshing) position of the first toothed portion 356 and the second toothed portion 364. When separating these, after the wheel cover has been removed from the wheel 10, a worker separates (i.e., detaches) the connecting protruding portions 362 from the sloped portion 352. In this example embodiment, the first toothed portion 356 and the second toothed portion 364 together form a cover/attaching portion connecting portion 366.

Tenth Example Embodiment

Figure 21:
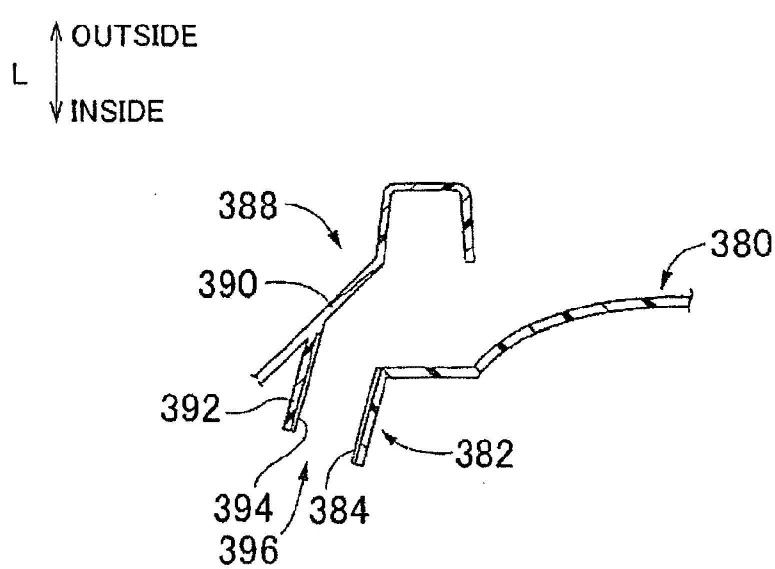
FIG. 21 is a sectional view (a portion) of a cover/attaching portion connecting portion of a wheel cover according to a tenth example embodiment of the invention.

Next, a wheel cover according to a tenth example embodiment of the invention will be described with reference to FIG. 21. In this example embodiment, the structure of the cover/attaching portion connecting portion differs from that described in the first example embodiment. The other portions are the same as they are in the first example embodiment, so descriptions thereof will be omitted. One of a male screw portion and a female screw portion (for example, the female screw portion) 384 is formed on a sloped portion 382 on an inner peripheral side of a cover main body 380, and the other of the male screw portion and the female screw portion (for example, the male screw portion) 394 is formed on a connecting protruding portion 392 provided on an attaching portion main body 390 of a center attaching portion 388. The connecting protruding portion 392 has a generally cylindrical shape, and is provided protruding in the radial direction on an outer peripheral surface of the attaching portion main, body 390. The male screw portion 394 of the connecting protruding portion 392 and the female screw portion 384 of the sloped portion 382 together form a screw mechanism. When the center attaching portion 388 is rotated relative to the cover main body 380 about the axis, the male screw portion 394 consequently screws into the female screw portion 384, such that the two become connected together. Also, rotating the center attaching portion 388 in the opposite direction relative to the cover main body 380 causes the two to become disconnected. In this example embodiment, the connecting protruding portion 392 on which the male screw portion 394 is formed and the sloped portion 382 on which the female screw portion 384 is formed and the like form a cover/attaching portion connecting portion 396.

Eleventh Example Embodiment

Figure 22:
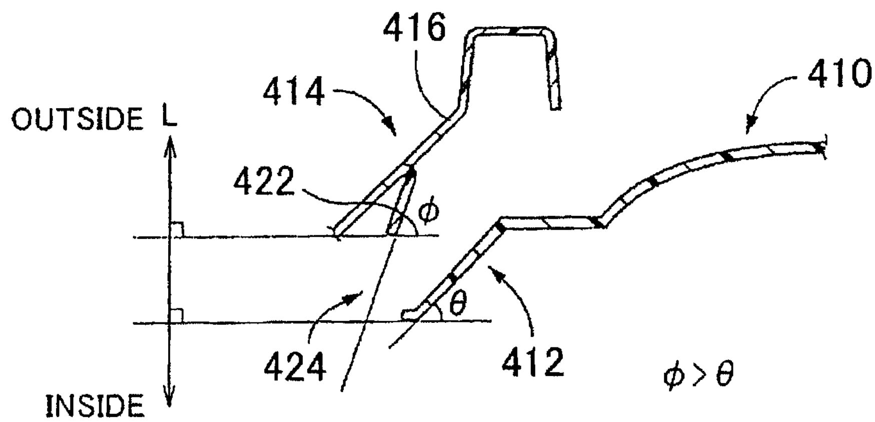
FIG. 22 is a sectional view (a portion) of a cover/attaching portion connecting portion of a wheel cover according to an eleventh example embodiment of the invention.

Next, a wheel cover according to an eleventh example embodiment of the invention will be described with reference to FIG. 22. In this example embodiment, the structure of the cover/attaching portion connecting portion differs from that described in the first example embodiment. The other portions are the same as they are in the first example embodiment, so descriptions thereof will be omitted. A sloped portion 412 on an inner peripheral side of a cover main body 410 is provided sloped at an angle 13 with respect to a direction orthogonal to the axis L (i.e., a radial direction). A plurality (at least one pair provided in opposing positions) of connecting protruding portions 422 are provided at equidistant intervals on an attaching portion main body 416 of a center attaching portion 414. The connecting protruding portions 422 are provided slanted at an angle $\phi$ with respect to the radial direction. This angle $\phi$ is larger than the angle $\theta$ (i.e., $\theta<\phi$). When the center attaching portion 414 is inserted in a direction parallel to the axis L to the inner peripheral side of the cover main body 410, the connecting protruding portions 422 engage with the sloped portion 412, and as a result of the sloped surface, the cover main body 410 becomes connected with the center attaching portion 414. This example embodiment is advantageous in that there is no need to form pawls or toothed portions or the like. In this example embodiment, the connecting protruding portions 422 and the sloped portion 412 and the like form a cover/attaching portion connecting portion 424. The connecting protruding portions 422 may be cylindrical members that are fixed to the outer peripheral surface of the attaching portion main body 416 of the center attaching portion 414.

Twelfth Example Embodiment

Figure 23A:
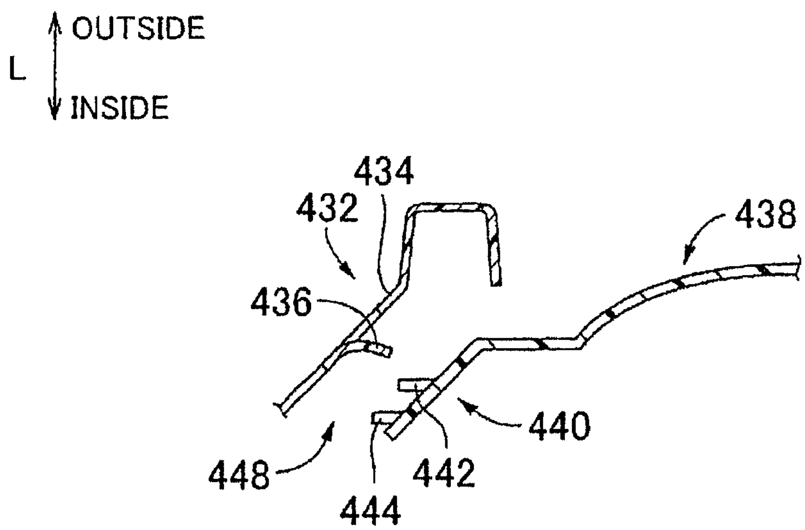
FIGS. 23A and 23B are sectional views (portions) of a cover/attaching portion connecting portion of a wheel cover according to a twelfth example embodiment of the invention.
Figure 23B:
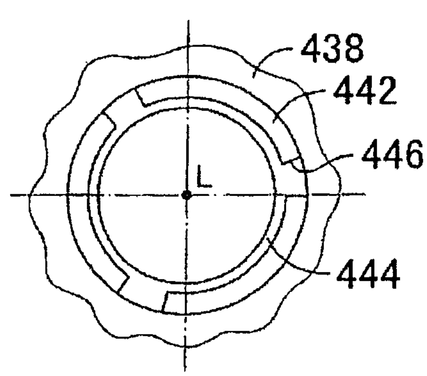

Next, a wheel cover according to a twelfth example embodiment of the invention will be described with reference to FIGS. 23A and 23B. In this example embodiment, the structure of the cover/attaching, portion connecting portion differs from that described in the first example embodiment. The other portions are the same as they are in the first example embodiment, so descriptions thereof will be omitted. As shown in FIG. 23A, three connecting protruding portions 436 are formed in positions separated by center angles of 120° on an outer peripheral surface of an attaching portion main body 434 of a center attaching portion 432. The connecting protruding portions 436 are shaped protruding out in the radial direction. As shown in FIG. 23B, retaining members 442 that protrude on the inner peripheral side are formed with gaps 446 therebetween, in positions separated by center angles of 120° on a sloped portion 440 on the inner peripheral side of a center connectable portion of a cover main body 438. An annular retaining member 444 is formed to the inside (i.e., to the inner peripheral side) of the retaining members 442. When a worker moves the center attaching portion 432 to the inside parallel to the axis L at a relative phase in which the connecting protruding portions 436 correspond to the gaps 446, the connecting protruding portions 436 abut against the annular retaining member 444. Then when the center attaching portion 432 is rotated relative to the cover main body 438, the connecting protruding portions 436 come to be in positions between the retaining members 442 and 444. As a result, the center attaching portion 432 becomes connected to the cover main body 438. The connecting protruding portions 436 are retained from both sides in the direction parallel to the axis L, so the center attaching portion 432 does not easily come off in the direction parallel to the axis L. The center attaching portion 432 is able to be removed from the cover main body 438 by rotating the center attaching portion 432 relative to the cover main body 438, to a relative phase where the connecting protruding portions 436 correspond to the gaps 446. In this example embodiment, the retaining members 442 and 444, and the connecting protruding portions 436 and the like make up a cover/attaching portion connecting portion 448.

Thirteenth Example Embodiment

Figure 24:
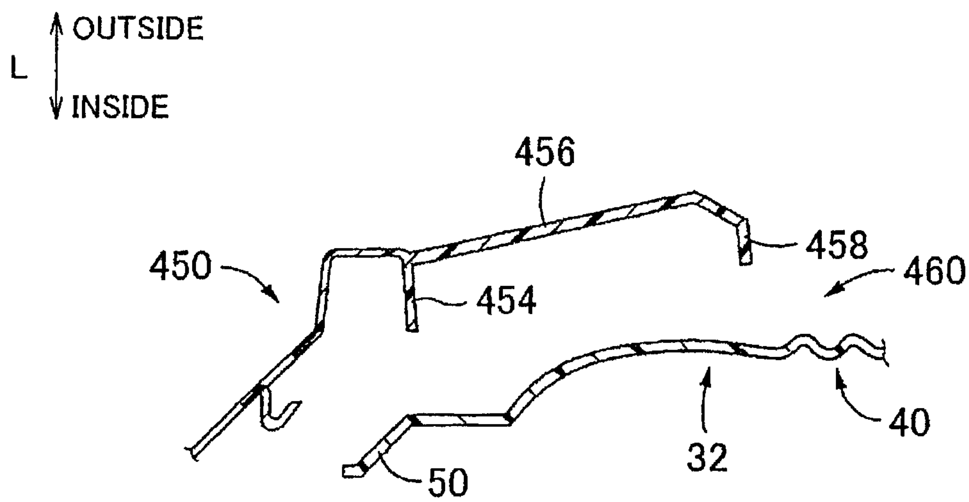
FIG. 24 is a sectional view (a portion) of a cover/attaching portion connecting portion of a wheel cover according to a thirteenth example embodiment of the invention.

Next, a wheel cover according to a thirteenth example embodiment of the invention will be described with reference to FIG. 24. In this example embodiment, the structure of the cover/attaching portion connecting portion differs from that described in the first example embodiment. The other portions are the same as they are in the first example embodiment, so descriptions thereof will be omitted. A plurality of arm portions 456 that extend out in the radial direction are provided in positions separated from each other in the circumferential direction of a pressure apply portion 454 of a center attaching portion 450. The arm portions 456 extend in the radial direction, with the tip ends thereof being bent inwards to form pushing portions 458. These pushing portions 458 are of a length that reaches the bead 40 of the cover main body 32. Also, the arm portions 456 are formed in shapes largely bent so as to protrude out on the outside, such that the middle portions of the arm portions 456 will not interfere with the cover main body 32. When the center attaching portion 450 is inserted into the ornament receiving hole 20, force in a direction parallel to the L consequently acts on the arm portions 456, and the pushing portions 458 push the middle portion (i.e., the position where the bead 40 is provided) in the radial direction of the cover main body 32 toward the wheel 10. As a result, the outer peripheral edge 44 of the cover main body 32 is able to be well abutted against the tire 14. In this example embodiment, the arm portions 456, the pushing portions 458, and the bead 40 and the like form a cover/attaching portion connecting portion 460. The arm portions 456, the pushing portions 458, and the bead 40 and the like may also be regarded as forming a middle pushing portion.

Fourteenth Example Embodiment

Figure 25A:
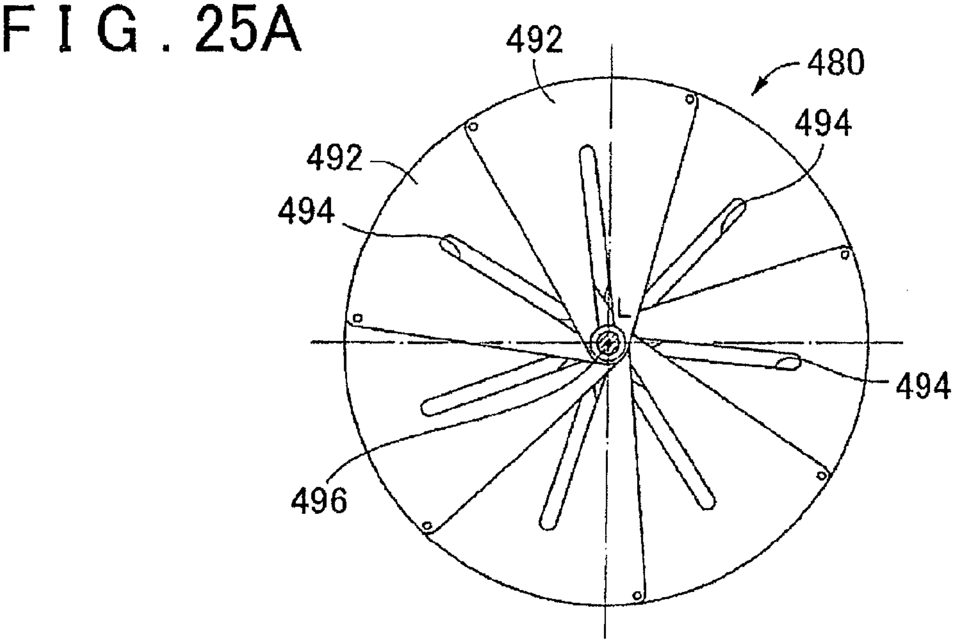
FIG. 25A is a front view of a cover main body of the wheel cover according to a fourteenth example embodiment of the invention when the radius of the cover main body is greatest.
Figure 25B:
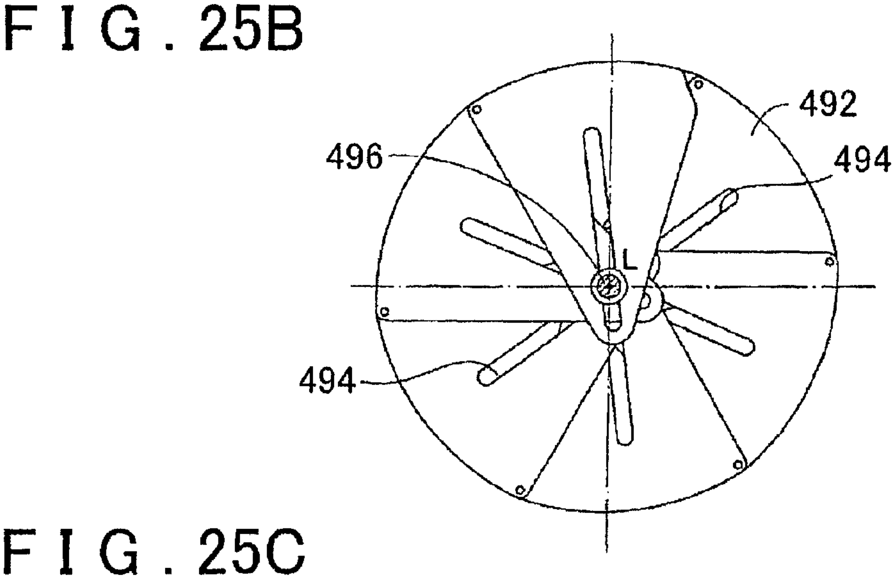
FIG. 25B is a front view of the cover main body according to the fourteenth example embodiment when the radius thereof is smaller than that shown in FIG. 25A.
Figure 25C:
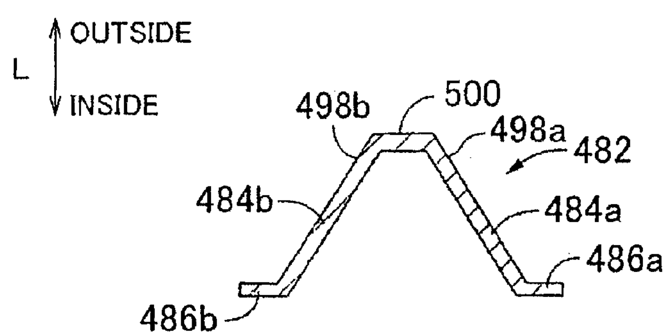
FIG. 25C is a sectional view of an attaching member that attaches the cover main body to a wheel, according to the fourteenth example embodiment.

Next, a wheel cover according to a fourteenth example embodiment of the invention will be described with reference to FIGS. 25A to 25C. A cover main body 480 is generally disc-shaped, as shown in FIGS. 25A and 25B, and a cover attaching portion 482 includes a pair of engaging members 484*a* and 484*b* that extend in a direction substantially parallel to the axis L when the wheel cover is attached to the wheel 10, and engaging protruding portions 486*a* and 486*b* that are provided on the engaging members 484*a* and 484*b*, respectively, as shown in FIG. 25C. The cover attaching portion 482 attaches the cover main body 480 to the wheel 10 using the spokes 24 of the wheel 10 (see FIG. 2A). The cover main body 480 includes seven main body portions 492 that are generally fan-shaped. An elongated hole 494 that extends from the center in the radial direction is formed in each of the main body portions 492, and the elongated holes 494 are connected together by a diameter adjusting rod 496. The degree of overlap of the main body portions 492 can be adjusted, and thus the size (i.e., the outside diameter) of the cover main body 480 can be adjusted, by the diameter adjusting rod 496 and the elongated holes 494. FIG. 25A is a view of a case in which the overlapping portion is minimal and the outside diameter of the cover main body 480 is the greatest. FIG. 25B is a view of a case in which one of the main body portions 492 is completely overlapped by the others, and the outside diameter is smaller than that shown in FIG. 25A. In this way, the outside diameter of the cover main body 480 is able to be adjusted by adjusting the degree of overlap of the seven main body portions 492. The cover attaching portion 482 has a shape in which a plate-like spring member is bent in an inverted. U-shape, with outside end portions (one end portions) 498*a* and 498*b* of the pair of engaging members 484*a* and 484*b* being connected together by a connecting member 500, and the engaging protruding portions 486*a* and 486*b* being provided on the inside end portions of the engaging members 484*a* and 484*b*.

After the outside diameter of the cover main body 480 has been adjusted to the desired size, a plurality of the cover attaching portions 482 are attached (connected) to the cover main body 480, with the connecting member 500 positioned on the outside between adjacent elongated holes 494, and the engaging members 484*a* and 484*b* passing through the adjacent elongated holes 494. A worker then places the cover attaching portions 482 impositions in the gaps between adjacent spokes 24, i.e., places the engaging protruding portions 486*a* and 486*b* in positions to the inside of adjacent spokes 24. As a result, the cover main body 480 is attached to the wheel 10 by the cover attaching portions 482. Also, if force in the direction that brings one end portions 498*a* and 498*b* of the pair of engaging members 484*a* and 484*b* of the cover attaching portion 482 closer together is applied to the one end portions 498*a* and 498*b*, the distance between these engaging protruding portions 486*a* and 486*b* will become shorter, such that the engaging protruding portions 486*a* and 486*b* will separate from the spokes 24 and be arranged in gaps between adjacent spokes 24. As a result, the cover attaching portions 482 can be removed from the wheel 10, so the wheel cover can be removed from the wheel 10.

The main body portions 492 of the cover main body 480 may be shaped such that the outer peripheral edge curves to the inside. As a result, the cover main body 480 is able to be bowl-shaped overall, with the outer peripheral edge being closest to the wheel 10.

Fifteenth Example Embodiment

Figure 26A:
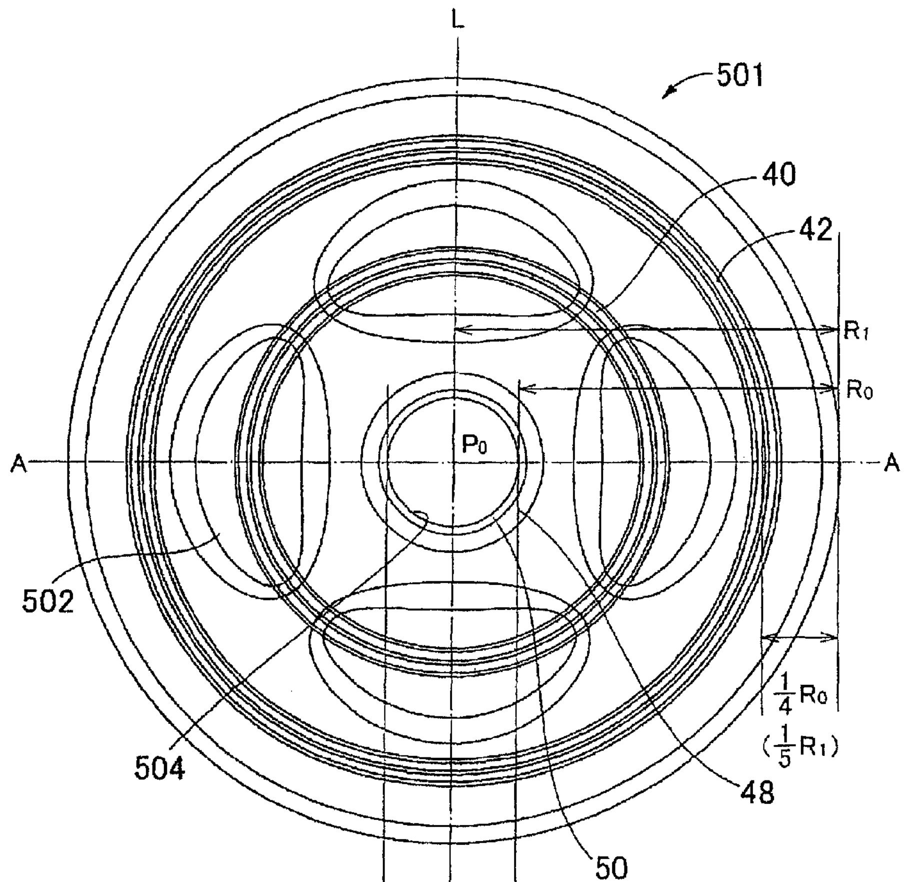
FIG. 26A is a front view of a cover member of a wheel cover according to a fifteenth example embodiment of the invention.
Figure 26B:
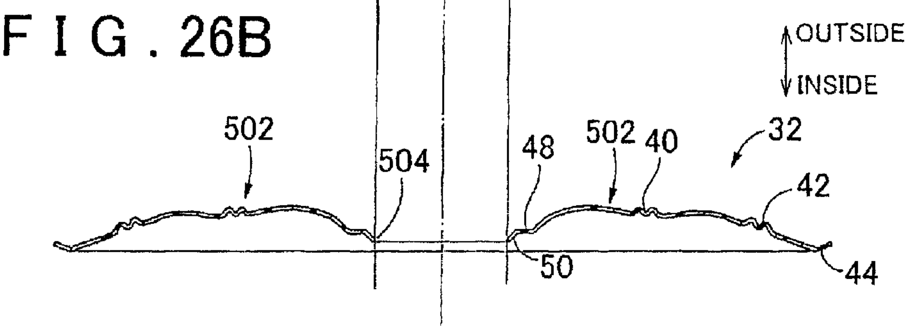
FIG. 26B is a sectional view taken along line A-A in FIG. 26A.

Next, a wheel cover according to a fifteenth example embodiment of the invention will be described with reference to FIGS. 26A and 26B. In a cover main body 501 of a wheel cover according to the fifteenth example embodiment, a plurality of depressions 502 (four in this Example Embodiment are individually provided spaced apart in the circumferential direction. A bottom surface of each of the depressions 502 is generally oval-shaped. The shapes of the depressions 502, however, are arbitrary. Also, as in the first example embodiment, depressions that connect adjacent depressions 502 together may also be provided. Also, a flat portion is not provided in the radial direction on an inner peripheral edge portion 504. In this example embodiment, the inner peripheral edge portion 504 corresponds to an inner peripheral edge.

Sixteenth Example Embodiment

Figure 33:
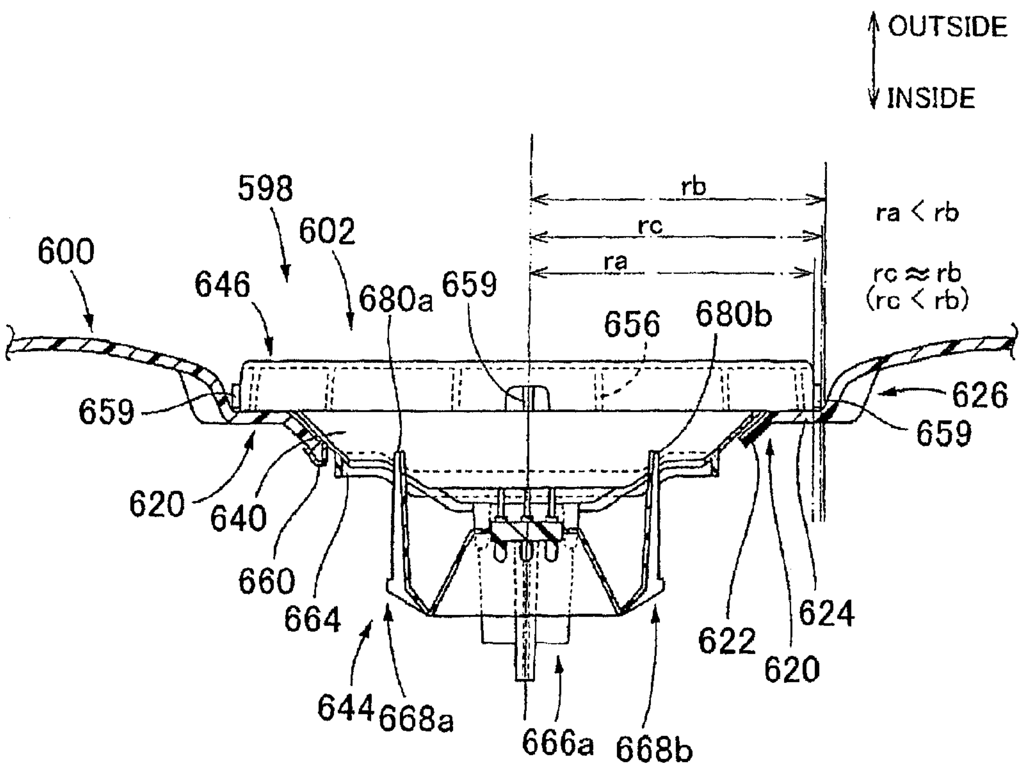
FIG. 33 is a sectional view of the cover attaching member connected to the cover main body, according to the sixteenth example embodiment.

Next, a wheel cover according to a sixteenth example embodiment of the invention will be described with reference to FIGS. 27 and 33. In the example embodiment below, portions having the same functions as those of the wheel covers according to the first to the fifteenth example embodiments will be denoted by the same reference characters, and descriptions thereof may be omitted. A wheel cover 598 (see FIG. 33) according to the sixteenth example embodiment includes a cover main body 600 and a center attaching portion 602 (FIGS. 29 to 33).

(Cover Main Body)

Figure 27:
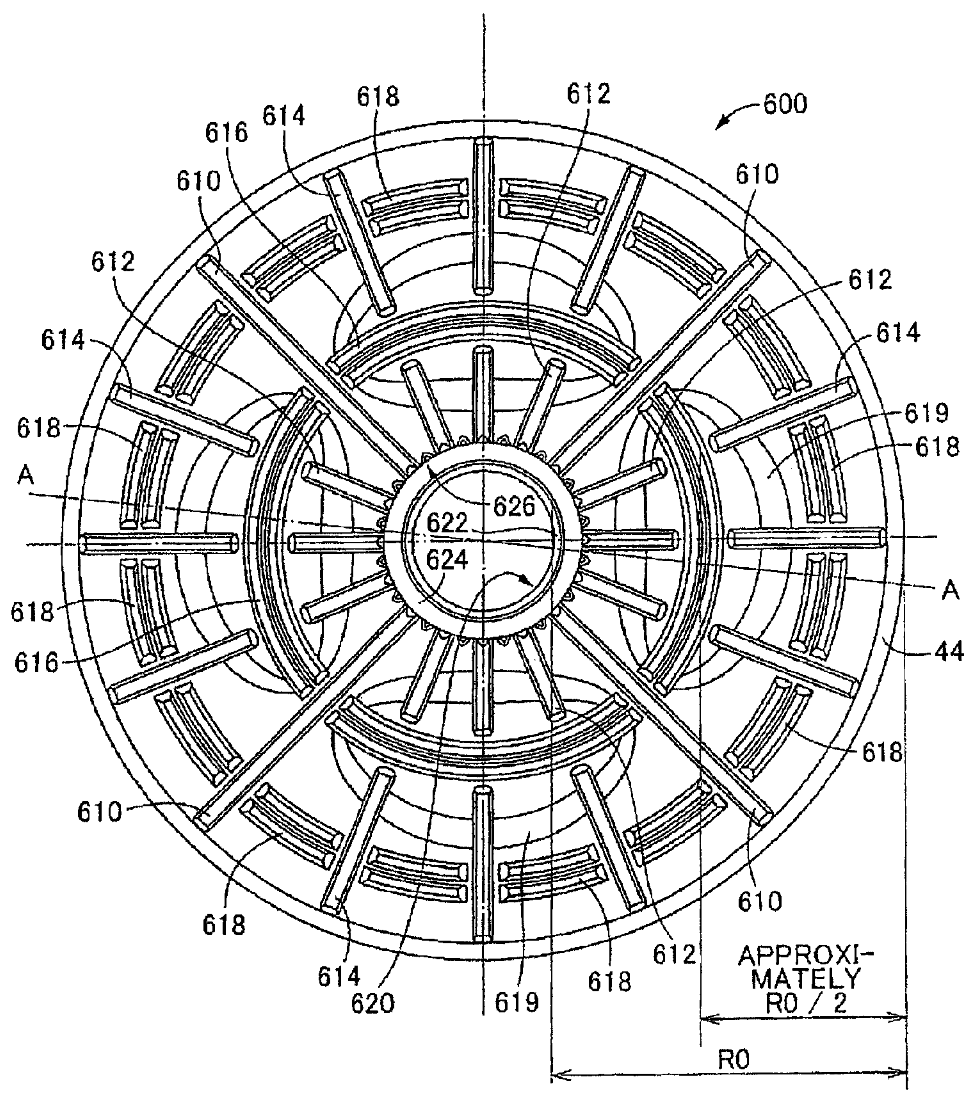
FIG. 27 is a front view of a cover main body of a wheel cover according to a sixteenth example embodiment of the invention.

As shown in FIG. 27, the cover main body 600 includes a plurality of radial beads that extend linearly in the radial direction, i.e., formed in a radial pattern (i.e., radially), and a plurality of arc-shaped beads that extend in the circumferential direction, i.e., formed in arc-shapes. The radial beads include four long beads 610 that extend from an inner peripheral portion of the cover main body 600 all the way to the outer peripheral portion of the cover main body 600, a plurality (such as 12) of inner peripheral side short beads 612 that extend from the inner peripheral portion to a middle portion, and a plurality (such as 12) of outer peripheral side short beads 614 that extend from the middle portion to the outer peripheral portion. The long beads 610 are provided in positions separated by center angles of 90°. Three each of the inner peripheral side short beads 612 and the outer peripheral side short beads 614 are formed at equidistant intervals (i.e.; separated by equal center angles) between two adjacent long beads 610. The inner peripheral side short beads 612 and the outer peripheral side short beads 614 are formed in same-phase positions. A middle arc-shaped bead 616 is formed between the inner peripheral side short beads 612 and the outer peripheral side short beads 614, and an outer peripheral side arc-shaped bead 618 is formed in the middle of the outer peripheral side short beads 614. The middle arc-shaped bead 616 is shaped like a circular ring that is broken up by the long beads 610. The middle arc-shaped bead 616 is provided in a set of two that are lined up in the radial direction between adjacent long beads 610. In other words, the middle arc-shaped beads 616 are lined up in the circumferential direction along the same circle. The outer peripheral side arc-shaped bead 618 is shaped like a circular ring that is broken up by the outer peripheral short beads 614 and the long beads 610 (i.e., the outer peripheral side arc-shaped bead 618 is arc-shaped). The outer peripheral side arc-shaped bead 618 is provided between adjacent outer peripheral side short beads 614, as well as between outer peripheral side short beads 614 and long beads 610 that are adjacent. The outer peripheral side arc-shaped bead 618 is also provided in a set of two that are lined up in the radial direction.

Resistance force against external force that tries to bend the cover main body 600 in the radial direction can be increased by the long beads 610. For example, while the vehicle is being transported, force may be applied that tries to bend the cover main body 600 from the inside toward the outside (i.e., force in a direction that lifts the cover main body 600 up), due to wind or the like, but even in this case, the long beads 610 extend from the inner peripheral portion all the way to the outer peripheral portion, so the cover main body 600 is able to be well inhibited from deforming. Therefore, it is desirable to provide at least three of the long beads 610 radially, spaced apart by equal center angles. Also, the arc-shaped beads 616 and 618 are able to increase the resistance force against external force that tries to bend the cover main body 600 in the circumferential direction. For example, while the vehicle is being transported, force may be applied that tries to bend the cover main body 600 in the circumferential direction, due to wind or the like, but even in this case, the middle arc-shaped bead 616 is able to well inhibit bending in the circumferential direction. The middle arc-shaped bead 616 is preferably provided in a position approximately ½ of the radial length R0 of the cover main body 600. The outer peripheral side arc-shaped bead 618 is provided to the inner peripheral side of the outer peripheral edge portion 44, and also serves to inhibit deformation of the outer peripheral edge portion 44. The outer peripheral side arc-shaped bead 618 is able to keep the outer peripheral edge portion 44 in good contact with the tire 14.

In this way, the plurality of long beads 610, short beads 612 and 614 that extend in the radial direction, and the arc-shaped beads 616 and 618 that extend in the circumferential direction enable the rigidity of the cover main body 600 to be increased. The resistance force against an external force such as wind can be increased, so the cover main body 600 will not easily deform. Also, the inner peripheral side short beads 612 and the outer peripheral side short beads 614 are provided with the same phase, so the overall rigidity of the cover main body 600 is able to be increased compared with when the phases are offset, i.e., compared with when the outer peripheral side short beads 614 are positioned between adjacent inner peripheral side short beads 612. Depressions 619 are formed separated by gaps in the circumferential direction, in the radially middle portion of the cover main body 600. The depressions 619 facilitate elastic deformation in a direction parallel to the axis L, so the cover main body 600 can be elastically attached to the wheel 10.

Figure 28:
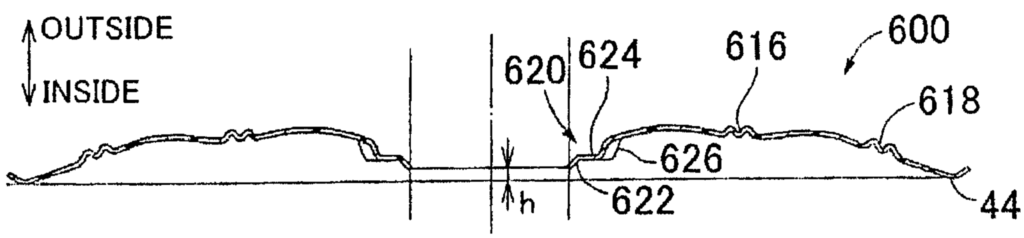
FIG. 28 is a sectional view taken along line A-A in FIG. 27.

Meanwhile, the inner peripheral portion of the cover main body 600 is a connectable portion (i.e., a center connectable portion) 620 to which the center attaching portion 602 connects. The connectable portion 620 is shaped having a stepped portion in the direction parallel to the axis L, and includes an inner peripheral side sloped portion 622 that is sloped with respect to the axis L, an annular flat surface portion 624, and an annular wall portion (a corrugated wall portion) 626. The inner peripheral side sloped portion 622 is formed on an inner peripheral edge, and the flat surface portion 624 is provided continuous with the inner peripheral side sloped portion 622. The wall portion 626 is formed on the outer peripheral edge of the flat surface portion 624. The flat surface portion 624 is a portion against which a pressure apply portion of the center attaching portion 602 abuts. Also, the flat surface portion 624 is a portion that extends in the radial direction (i.e., in a direction substantially perpendicular to the axis L). The wall portion 626 extends in a direction crossing the flat surface portion 624, and has a generally corrugated shape with a plurality of radially recessed and protruding portions, as shown in FIGS. 27 and 28. Forming the wall portion 626 in a corrugated shape in this way enables the rigidity of the connectable portion 620 to be increased. Also, the wall portion 626 is able to divide the inner peripheral side of the wall portion 626 from the outer peripheral side of the wall portion 626, so even if the outer peripheral side elastically deforms, the connectable portion 620 will not easily be effected. In other words, the center attaching portion 602 will not easily come off due to external force applied to the cover main body 600. Also, the connectable portion 620 of the cover main body 600 is positioned to the outer peripheral side of an inserting portion 644 of the center attaching portion 602 of the wheel cover 598, as shown in FIG. 33, and is positioned to the outer peripheral side of the ornament receiving hole 20 when the wheel cover 598 is attached to the wheel 10.

Also, as shown in FIG. 28, a difference h in the direction parallel to the axis L is provided between the inner peripheral edge and the outer peripheral edge portion 44, such that the cover main body 600 is able to be attached to the wheel 10 while being elastically deformed in the direction parallel to the axis L. The difference h may be determined as appropriate based on the shape of the wheel to which the wheel cover is to be applied, and the amount of desired pushing force and the like. For example, the difference h may be determined such that the cover main body 600 elastically deforms at equal to or greater than a first set value in the direction parallel to the axis L, or such that the cover main body 600 is able to push the tire 14 with a pushing force of equal to or greater than a second set value, when the wheel cover 598 is attached to the wheel 10. The long beads 610 and the inner peripheral side short beads 612 extend from the corrugated wall portion 626, which also enables to the portion to the inner peripheral side of the wall portion 626 to be less prone to being affected by the elastic deformation of the portion to the outer peripheral side and the like. Further, the outer peripheral side short beads 614 extend to the inner peripheral side of the outer peripheral edge portion 44, which enables the outer peripheral edge portion 44 to maintain good contact with the tire 14.

(Center Attaching Portion)

The center attaching portion 602 includes an attaching portion main body 640 and the inserting portion 644, as shown in FIGS. 29 to 32.

(Attaching Portion Main Body)

Figure 30:
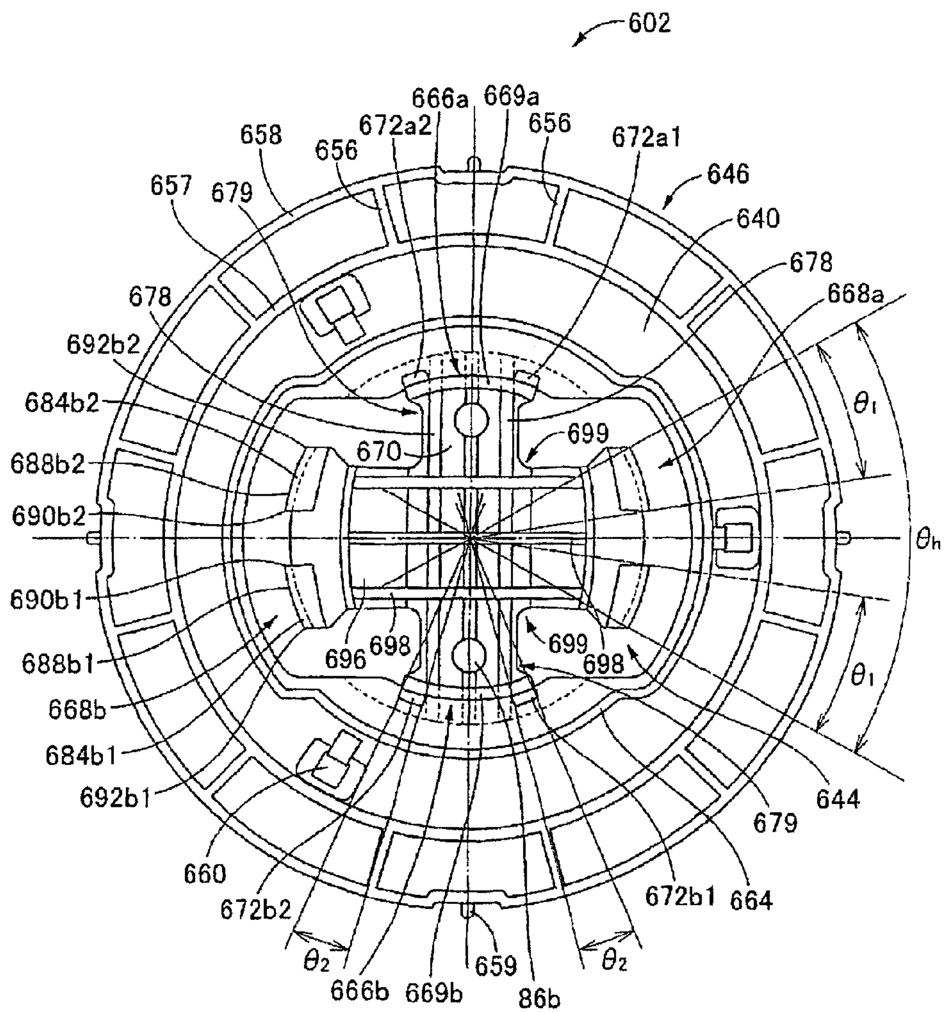
FIG. 30 is a bottom view of the cover attaching portion according to the sixteenth example embodiment.
Figure 31:
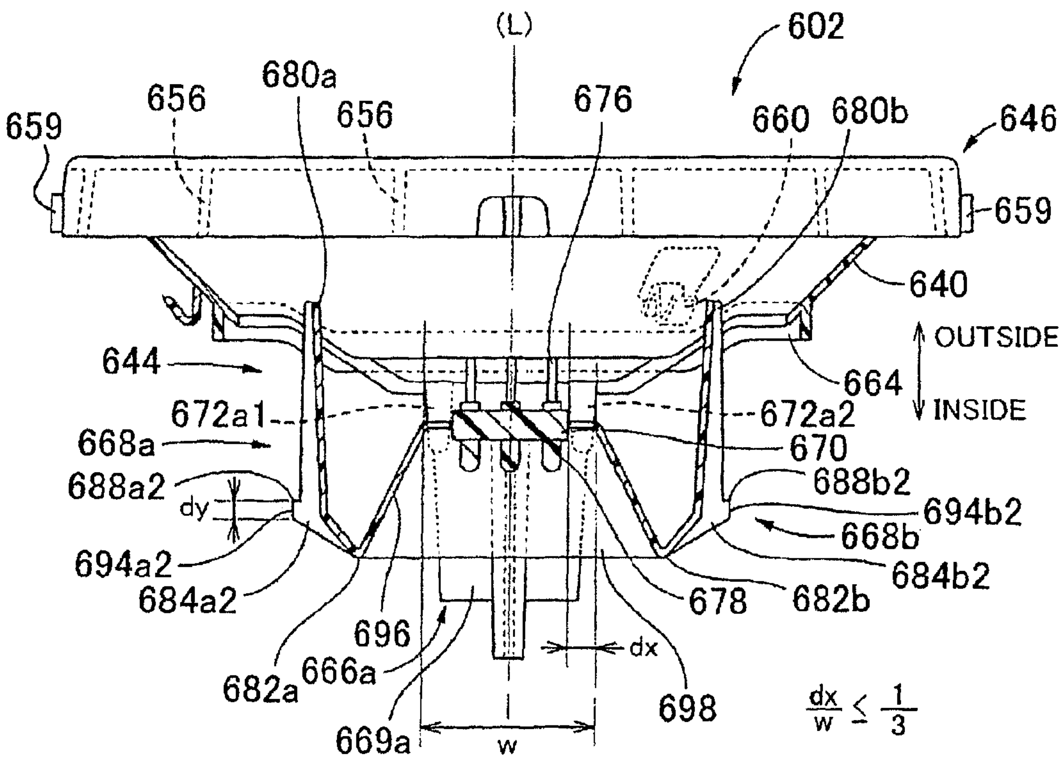
FIG. 31 is a sectional view taken along line B-B in FIG. 29.

The attaching portion main body 640 is provided with a sloped surface that is sloped with respect to the axis L, and a pressure apply portion 646 is provided on the outside outer peripheral edge of this sloped surface. The pressure apply portion 646 is a pressure apply portion that is groove-shaped (this portion may also be referred to as a "groove-shaped pressure apply portion") and has a generally U-shaped cross-section. The outside of the pressure apply portion 646 is a flat surface, as shown in FIGS. 31 and 32, and the inside of the pressure apply portion 646 is open, as shown in FIGS. 29 and 30. Also, a plurality of plate-shaped reinforcing members (ribs) 656 that extend in the radial direction are provided on the pressure apply portion 646, and these reinforcing members 656 connect an inner peripheral wall portion 657 of the pressure apply portion 646 with an outer peripheral wall portion 658 of the pressure apply portion 646. These reinforcing members 656 help the pressure apply portion 646 to resist deformation, even if force in the radial direction acts on the center attaching portion 602. Thus, these reinforcing members 656 increase the rigidity of the pressure apply portion 646.

A plurality of protruding portions 659 that protrude in the radial direction at equidistant intervals are formed on the outer peripheral wall portion 658 of the pressure apply portion 646. As shown in FIG. 33, the pressure apply portion 646 opposes the flat surface portion 624 when the wheel cover 598 is attached to the wheel 10 (i.e., when the cover main body 600 and the center attaching portion 602 are connected together). In this case, an outside radius ra of the pressure apply portion 646 (i.e., the outside radius of the outer peripheral wall portion 658, not including the protruding portions 659) is smaller than an inside radius rb of the corrugated wall portion 626 (i.e., the inside radius of a portion protruding farthest to the inner peripheral side) (i.e., ra<rb), and an outer radius rc to the protruding portions 659 is substantially the same as, or slightly smaller than, the inside radius rb of the corrugated wall portion 626 (i.e., rc<rb, rc≈rb). In this way, the outside radius ra of the pressure apply portion 646 is smaller than the inside radius rb of the corrugated wall portion 626, so the center attaching portion 602 is able to be smoothly connected to the cover main body 600. Also, with the wheel cover 598 attached to the wheel 10, at least one of the plurality of protruding portions 659 abuts against the corrugated wall portion 626, so the center attaching portion 602 is able to be prevented from rattling against the cover main body 600. The protruding portions 659 are preferably provided in a plurality of sets in opposing positions (i.e., in positions separated by a center angle of 180°). In this example embodiment, two sets are provided (with adjacent protruding portions 659 being separated by center angles of 90°). In this sense, the protruding portions 659 may also be referred to as "rattle-preventing protruding portions".

Three connecting pawls 660 are provided in positions separated by center angles of 120° on the outer peripheral side of the middle portion of the attaching portion main body 640. Also, a plate-shaped reinforcing member 664 is provided protruding from the outer peripheral side in the direction parallel to the axis L, along an opening 662. This plate-shaped reinforcing member 664 is provided in an annular shape (i.e., a ring shape), thus increasing the rigidity of the attaching portion main body 640.

(Inserting Portion)

The inserting portion 644 includes a pair of guide members 666*a* and 666*b*, and a pair of engaging members 668*a* and 668*b*.

(Guides)

Each of the pair of guide members 666*a* and 666*b* includes a guide member main body 669*a* and 669*b*, and two force receiving portions 672*a*1, 672*a*2, 672*b*1, and 672*b*2, one provided on each end portion in the width direction of the guide member main bodies 669*a* and 669*b*. As shown in FIG. 32, the guide member main bodies 669*a* and 669*b* are fixed to the attaching portion main body 640, and connected together by a guide connecting member 670. A width dx (i.e., the length in the circumferential direction) of the force receiving portions 672*a*1, 672*a*2, 672*b*1, and 672*b*2 is equal to or less than ⅓ of a width w of the guide member main bodies 669*a* and 669*b* (see FIG. 31) (i.e., 0<dx≤w/3). If the width dx of the force receiving portions 672*a*1, 672*a*2, 672*b*1, and 672*b*2 is too large, the resistance when attaching the center attaching portion 602 to the wheel 10 will be too great. Also, if the width dx is too small, it will be difficult to realize the function of positioning the inserting portion 644 (i.e., the function of inhibiting movement of the inserting portion 644). Therefore, in this example embodiment, the width of the force receiving portions 672*a*1, 672*a*2, 672*b*1, and 672*b*2 is made larger than 1 mm and no more than ⅓ of the width w of the guide members 666*a* and 666*b*. The ratio of the width of the force receiving portions 672*a*1, 672*a*2, 672*b*1, and 672*b*2 to the width of the guide member main bodies 669*a* and 669*b* may be equal to or greater than 1/20, equal to or greater than 1/15, equal to or greater than 1/10, or equal to or greater than ⅛, and may be equal to or less than ⅙, equal to or less than ⅕, or equal to or less than ¼. Also, if the width of the guide member main bodies 669*a* and 669*b* changes from the inside toward the outside, a maximum value of the width may be used, a minimum value of the width may be used, or an average value of the width may be used.

Also, a center angle θg (see FIG. 29) between the force receiving portions 672*a*1 and 672*a*2 (and also between the force receiving portions 672*b*1 and 672*b*2) is preferably at least 10° (θg≥10°). The center angle θg between these may also be equal to or greater than 15° or equal to or greater than 20°. The force receiving portions 672*a*1, 672*a*2, 672*b*1, and 672*b*2 serve to receive force applied to the inserting portion 644 and thus inhibit the movement of the inserting portion 644 (i.e., define the position of the inserting portion 644), as described above. Therefore, the force receiving portions 672*a*1, 672*a*2, 672*b*1, and 672*b*2 are preferably provided along the entire circumference of the inserting portion 644. Thus, the interval between the force receiving portions 672*a*1 and 672*a*2 provided on the guide member 666*a* (and the interval between the force receiving portions 672*b*1 and 672*b*2 provided on the guide member 666*b*) is equal to or greater than a center angle of 10°. The interval between the force receiving portions 672*a*1 and 672*a*2 (and the interval between the force receiving portions 672*b*1 and 672*b*2) may be regarded as substantially corresponding to the center angle of the width of the guide member main body 669*a* (and the guide member main body 669*b*).

A plate-shaped outside reinforcing member 676 that extends in the radial direction and protrudes outward, and a plate-shaped inside reinforcing member 678 that extends in the radial direction and protrudes inward are provided on the guide connecting member 670. In this way, the plate-shaped reinforcing members 676 and 678 are provided on the outside and the inside, respectively, so the guide connecting member 670 will not easily deform in the radial direction, and the pair of guide members 666*a* and 666*b* will not easily separate from the inner peripheral surface 21 of the ornament receiving hole 20. In this example embodiment, three each of the plate-shaped outside reinforcing member 676 and the plate-shaped inside reinforcing member 678 are provided, but the number of these plate-shaped reinforcing members 676 and 678 may be appropriately determined based on the desired rigidity, material cost, and weight and the like. Also, the shape of a connecting portion 679 of the guide member main bodies 669*a* and 669*b* and the guide connecting member 670 is R-shaped. As a result, the connecting portion 679 will not easily break, so the strength can be increased.

(Engaging Portion)

With the pair of the engaging members 668*a* and 668*b*, one end portions 680*a* and 680*b* protrude outward from the opening 662, and two each of engaging protruding portions 684*a*1, 684*a*2, 684*b*1, and 684*b*2 are formed on other end portions 682*a* and 682*b*, as shown in FIG. 31. Outer peripheral edges 688*a*1 and 688*a*2 that protrude farthest in the radial direction of the engaging protruding portions 684*a*1 and 684*a*2 (the same also applies for the engaging protruding portions 684*b*1 and 684*b*2, so a description thereof will be omitted) extend along an arc, as shown in FIGS. 29 and 30. In other words, the outer peripheral edges 688*a*1 and 688*a*2 extend generally along the inner peripheral surface 21 of the ornament receiving hole 20. Therefore, when force in a direction that brings the one end portions 680*a* and 680*b* closer together (i.e., force in the inner peripheral direction) is applied to the one end portions 680*a* and 680*b*, a change in the height of the outer peripheral edges 688*a*1 and 688*a*2 is able to be reduced compared with when the outer peripheral edges 688*a*1 and 688*a*2 extend in a generally straight line. As a result, when force that has been applied to the one end portions 680*a* and 680*b* is released, the entire outer peripheral edges 688*a*1 and 688*a*2 are able to catch well on the engageable protruding portion 22 of the ornament receiving hole 20.

Also, a radius ri (the distance from the axis L; see FIG. 29) of end portions 690*a*1 and 690*a*2 (hereinafter, referred to as "near side end portions") of the outer peripheral edges 688*a*1 and 688*a*2 on the side where the two engaging protruding portions 684*a*1 and 684*a*2 are close together is smaller than a radius ro (the distance from the axis L) of end portions (hereinafter, referred to as "non-near side end portions") 692*a*1 and 692*a*2 on the sides opposite the near sides (i.e., ri<ro). In this way, the radius of the non-near side end portions 692*a*1 and 692*a*2 is larger, so even if the near side end portions 690*a*1 and 690*a*2 come off of the engageable protruding portion 22 when a large external force toward the outside is applied to the center attaching portion 602, the non-near side end portions 692*a*1 and 692*a*2 will still be caught on the engageable protruding portion 22. Therefore, the force will be received at the non-near side end portions 692*a*1 and 692*a*2. In this case, the distance between the non-near side end portions 692*a*1 and 692*a*2 is large, so if the external force is the same, force received by one of the non-close side end portions 692*a*1 and 692*a*2 is reduced compared with when it is received by the close-side end portions 690*a*1 and 690*a*2. Therefore, when the strength of the engaging protruding portions 684*a*1 and 684*a*2 is the same, the maximum value of external force that is able to be received can be increased. In other words, increasing the radius of the non-near side end portions 692*a*1 and 692*a*2 of the outer peripheral edges 688*a*1 and 688*a*2 makes the center attaching portion 602 less apt to come off, even if a large external force is applied. Also, the outer peripheral edges 688*a*1 and 688*a*2 are less apt to break, be ground down, or plastic deform.

Furthermore, as shown in FIG. 31, the inside of the outer peripheral edge, 688*a*1 (688*a*2) of the engaging protruding portion 684*a*1 (684*a*2) is a cylindrical surface 694*a*1 (694*a*2). The cylindrical surface 694*a*1 (694*a*2) is able to abut against the inner peripheral surface 21 of the ornament receiving hole 20 while the center attaching portion 602 is inserted in the ornament receiving hole 20. Because the cylindrical surface 694*a*1 (694*a*2) abuts against the inner peripheral surface 21, friction force can be generated between the engaging protruding portions 684*a* and the ornament receiving hole 20. In this way, the outer peripheral edge 688*a*1 (688*a*2) catches on the engageable protruding portion 22, and the cylindrical surface 694*a*1 (694*a*2) abuts against the inner peripheral surface 21, so the outer peripheral edge 688*a*1 (688*a*2) will not easily come out, even if a large external force in the axial direction is applied to the engaging members 668*a*. Also, providing the cylindrical surface 694*a*1 (694*a*2) and the like enables the load applied to the outer peripheral edge 688*a*1 (688*a*2) to be lessened. Thus, the outer peripheral edge 688*a*1 (688*a*2) is less apt to break, be ground down, or plastic deform. The cylindrical surface 694*a*1 (694*a*2) may be referred to as an abutting surface (engaging portion side abutting surface) or a friction surface, and preferably has a length dy in the direction parallel to the axis L of 5 mm or more. The length of the cylindrical surface 694*a*1 (694*a*2) may also be equal to or greater than 7 mm, equal to or greater than 10 mm, or equal to or greater than 12 mm.

Also, a center angle θh (see FIG. 30) that corresponds to a length (width) in the circumferential direction of the engaging members 668*a* and 668*b* is preferably equal to or greater than 60° (π/3) (i.e., θh≥60°). Increasing the width of the engaging members 668*a* and 668*b* enables the interval of the two engaging protruding portions 684*a*1 and 684*a*2, and the interval of the two engaging protruding portions 684*b*1 and 68462 to be increased. Therefore, as described above, the force received by the engaging protruding portions 684*a*1, 684*a*2, 684*b*1, and 684*b*2 can be reduced. Also, the cylindrical surfaces 694*a*1, 694*a*2, 694*b*1, and 694*b*2 also have a positioning function, as well as serve to inhibit movement of the engaging members 668*a* and 668*b*. In order to display these functions, the cylindrical surfaces 694*a*1, 694*a*2, 694*b*1, and 694*b*2 are preferably provided all along the entire inserting portion 644 in the circumferential direction. In this way, increasing the center angle θh enables movement of the inserting portion 644 to be well inhibited. For example, movement of the inserting portion 644 is able to be well inhibited even if force in a direction orthogonal to the axis L is applied to a portion other than the engaging members 668*a* and 668*b*. The center angle θh may also be equal to or greater than 70°, equal to or greater than 80°, or equal to or greater than 90°.

Moreover, it is preferable that the ratio of the sum of a center angle θ1 corresponding to the length in the circumferential direction of the engaging protruding portions 684*a*1, 684*a*2, 684*b*1, and 684*b*2 and a center angle θ2 corresponding to the length in the circumferential direction of the force receiving portions 672*a*1, 672*a*2, 672*b*1, and 672*b*2, to 360° (2π) be equal to or greater than 0.2(($θ1×4+θ2×4)/360°≥0.2$). That is, when the wheel cover 598 is attached to the wheel 10, a higher ratio of the sum of the portions that abut against the inner peripheral surface 21 of the ornament receiving hole 20 (including the portion that is engaged with the engageable protruding portion 22), to the total circumference is able to more stably maintain the attached state. Therefore, in this example embodiment, the ratio is equal to or greater than 0.2. This ratio may also be equal to or greater than 0.25, equal to or greater than 0.3, or equal to or greater than 0.4.

Also, the pair of engaging members 668*a* and 668*b* are connected by an engaging portion connecting member 696 that is formed in a general U-shape, and three plate-shaped reinforcing members (ribs) 698 that extend in the radial direction are provided on the engaging portion connecting member 696. The plate-shaped reinforcing members 698 are generally trapezoidal-shaped, as shown in FIG. 31, and directly connect the other end portions of the pair of engaging members 668 together in the radial direction. In this way, the trapezoidal-shaped reinforcing members 698 are provided between the pair of engaging members 668*a* and 668*b*, so the engaging portion connecting member 696 will not easily deform in the radial direction. As a result, the pair of engaging members 668*a* and 668*b* will not easily come closer to one another. Thus, the engaging protruding portions 684*a*1, 684*a*2, 684*b*1, and 684*b*2 will not easily become unhooked from the engageable protruding portion 22 (i.e., the wheel 10). Also, a connecting portion 699 of the engaging portion connecting member 696 and the guide connecting member 670 is also R-shaped. Therefore, the strength near the connecting portion of the engaging portion connecting member 696 and the guide connecting member 670 is able to be increased, so the strength of the center attaching portion 602 is able to be increased. Also, the thickness of the plate-shaped reinforcing members (ribs) 656, 664, 676, 678, and 698 and the like is preferably at least 0.5 mm. Further, the thickness of the attaching portion main body 640 is also preferably at least 0.5 mm. The attaching and removing operation is the same as it is in the first example embodiment, so a description thereof will be omitted.

As described above, in this example embodiment, the rigidity of the cover main body 600 is strengthened, so even if force is applied that tries to bend the cover main body 600 outward, due to wind or the like, when the vehicle is being transported, the cover main body 600 will not easily deform.

Also, the rigidity of the center attaching portion 602 is also increased, so even if force in the radial direction or in the axial direction is applied, the pair of engaging members 668*a* and 668*b* and the pair of guide members 666*a* and 666*b* will not easily come closer together, so the center attaching portion 602 will not easily come off. Also, the inserting portion 644 will not easily move in the ornament receiving hole 20. Moreover, the abutting surfaces of the force receiving portions 672*a*1, 672*a*2, 672*b*1, and 672*b*2 and the abutting surfaces 694*a*1, 694*a*2, 694*b*1, and 694*b*2 that abut against the inner peripheral surface 21 of the ornament receiving hole 20 and the like make the outer peripheral edges 688*a*1, 688*a*2, 688*b*1, and 688*b*2 of, the engaging protruding portions 684*a*1, 684*a*2, 684*b*1, and 684*b*2 more resistant to breaking, being ground down, or plastic deforming or the like.

With the cover main body, the number of long beads 610, and the number of inner peripheral side short beads 612 and outer peripheral side short beads 614 are arbitrary, but the number of outer peripheral side short beads 614 is preferably equal to or less than the number of inner peripheral side short beads 612. Even if the cover main body 600 were to deform by bending outward at a portion to the outer peripheral side from a middle portion due to the number of outer peripheral side short beads 614 provided being small, if the inner peripheral side portion will not easily deform, the entire cover main body 600 is able to resist deforming in which it bends outward with the pressure apply portion 646 of the center attaching portion 602 as the fulcrum. Also, external force acting on the cover main body 600 is not easily affected by the center attaching portion 602, so external force parallel to the axis L is not easily applied to the center attaching portion 602. Preferably at least two of the inner peripheral side short beads 612 are provided between adjacent long beads 610 when the long beads 610 are provided at intervals of 90°. Also, preferably four or more long beads 610 are radially provided. Five or more or six or more long beads 610 may also be radially provided.

Seventeenth Example Embodiment

Figure 34A:
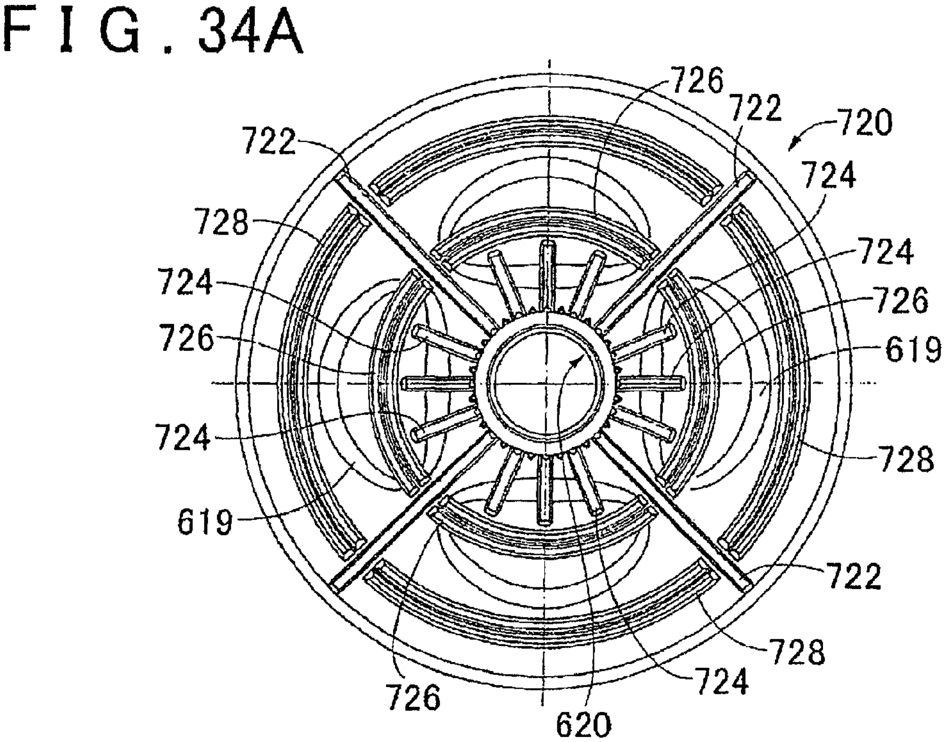
FIG. 34A is a front view of a cover main body of a wheel cover according to a seventeenth example embodiment of the invention.

An example of a cover main body in which the number of outer peripheral side short beads is less than the number of inner peripheral side short beads will be described with reference to FIGS. 34A and 34B. As shown in FIG. 34A, in a cover main body 720, four long beads 722 are radially provided and 12 inner peripheral side short beads 724 are provided. Also, a middle arc-shaped bead 726 and an outer peripheral side arc-shaped bead 728 are provided between adjacent long beads 722. In this example embodiment, no (0) outer peripheral side short beads are provided (0<12), so the outer peripheral side arc-shaped bead 728 is longer in the circumferential direction than it is in the sixteenth example embodiment. For example, when air gets in through the outer peripheral edge of the cover main body 720 and creates force that tries to bend the cover main body 720 toward the outside from the inside (i.e., force that tries to lift the cover main body 720 up), the rigidity of the portion on the inner peripheral side of the inner peripheral side short beads 724 of the cover main body 720 is large, so the portion on the inner peripheral side will not easily bend even if the portion on the outer peripheral side bends. As a result, the cover main body 720 will not easily bend with the connectable portion as a fulcrum, so the external force acting on the portion on the outer peripheral side of the cover main body 720 will not easily reach the center attaching portion 602.

Figure 34B:
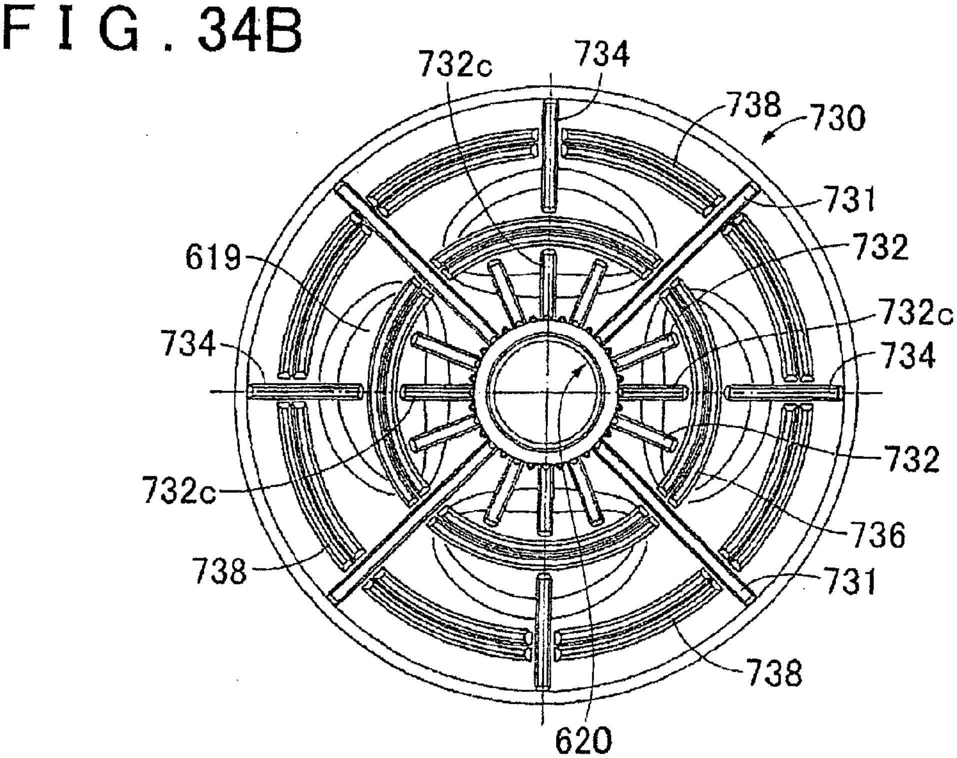
FIG. 34B is a plan view of a cover main body in which a portion of the cover main body shown in FIG. 34A has been modified.

Also, as shown in FIG. 34B, in a cover main body 730, four long beads 731, 12 inner peripheral side short beads 732, four outer peripheral side short beads 734, a middle arc-shaped bead 736, and an outer peripheral side arc-shaped bead 738 are provided (4<12). The outer peripheral side arc-shaped bead 738 is provided between the long beads 731 and the outer peripheral side short beads 734. Also, the outer peripheral side short beads 734 are formed in the same phases as inner peripheral side short beads 732*c* that are positioned in the center, among three of the inner peripheral side short beads 732 that are positioned between adjacent long beads 731. Forming the inner peripheral side short beads 732*c* and the outer peripheral side short beads 734 in same-phase positions in this way enables the overall rigidity of the cover main body 730 to be increased compared with when they are formed in different-phase positions.

Eighteenth Example Embodiment

Figure 35A:
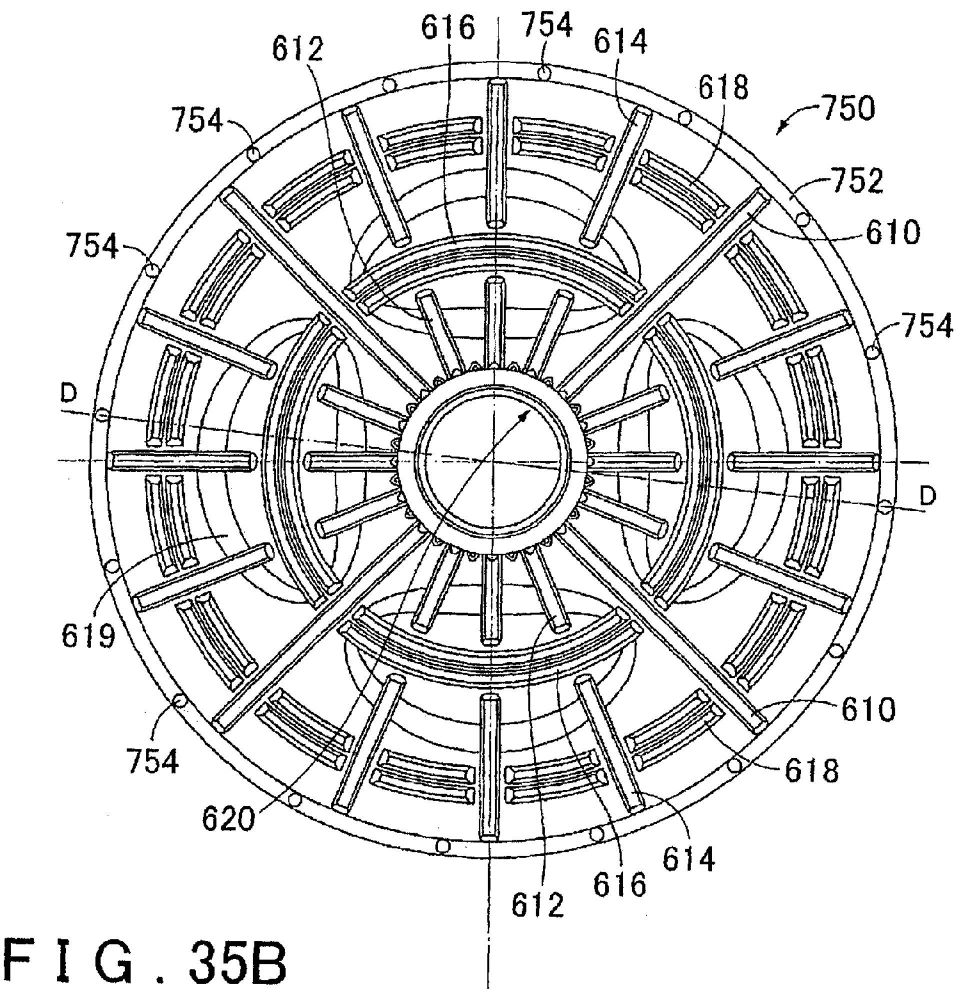
FIG. 35A is a front view of a cover main body of a wheel cover according to an eighteenth example embodiment of the invention.
Figure 35B:
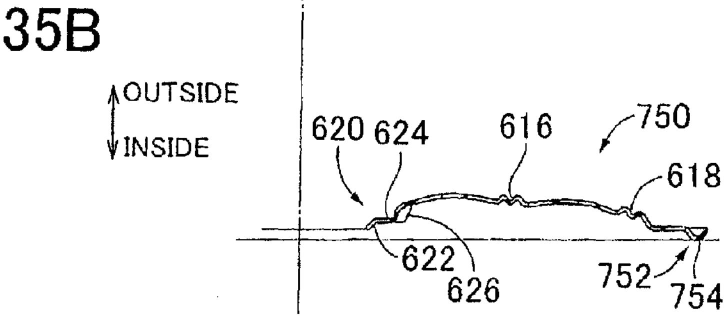
FIG. 35B is a sectional view (a portion) taken along line D-D in FIG. 35A.

In the first to the seventeenth example embodiments, the outer peripheral edge of the cover main body is R-shaped, but the shape of the outer peripheral edge is not limited to that in the foregoing example embodiments. For example, as shown in FIGS. 35A and 35B, a plurality of protruding portions that protrude to the inside may be formed at equidistant intervals on the outer peripheral edge portion. With a cover main body 750, a plurality of protruding portions 754 are formed at equidistant intervals on an outer peripheral edge portion 752. The protruding portions 754 have generally semispherical shapes, and protrude to the inside, parallel to the axis L. Providing the protruding portions 754 increases the contact force between the cover main body 750 and the tire 14, and reduces the gap between the cover main body 750 and the tire 14, when the cover main body 750 is elastically deformed and attached to the wheel 10. As a result, with the cover main body 750 according to the eighteenth example embodiment, the gap between the outer peripheral edge portion 752 and the tire 14 is small, so wind and the like that would get in through the gap between the cover main body and the tire and create force that tries to bend the cover main body outward is not able to easily enter the gap, hence force that tries to bend the cover main body 750 outward is not easily generated. Also, the contact force between the cover main body 750 and the tire 14 is able to be increased, so relative rotation in which there is sliding contact between the cover main body 750 and the tire 14 (hereinafter, simply referred to as "relative rotation") can be inhibited. When the vehicle is running under its own power with a wheel cover attached to a wheel, the cover main body may rotate relative to the wheel 10 such that there is sliding contact between the cover main body and the tire. Also, the cover main body may rotate relative to the wheel due to vibration or the like when the vehicle is being transported. Therefore, with the cover main body 750, the contact force between it and the tire 14 is increased, so relative rotation between the cover main body 750 and the tire 14 is able to be inhibited, resulting in the tire 14 being less apt to be scratched. In this sense, the protruding portion 754 and the like may be regarded as forming a relative rotation inhibiting portion.

Nineteenth Example Embodiment

Figure 36:
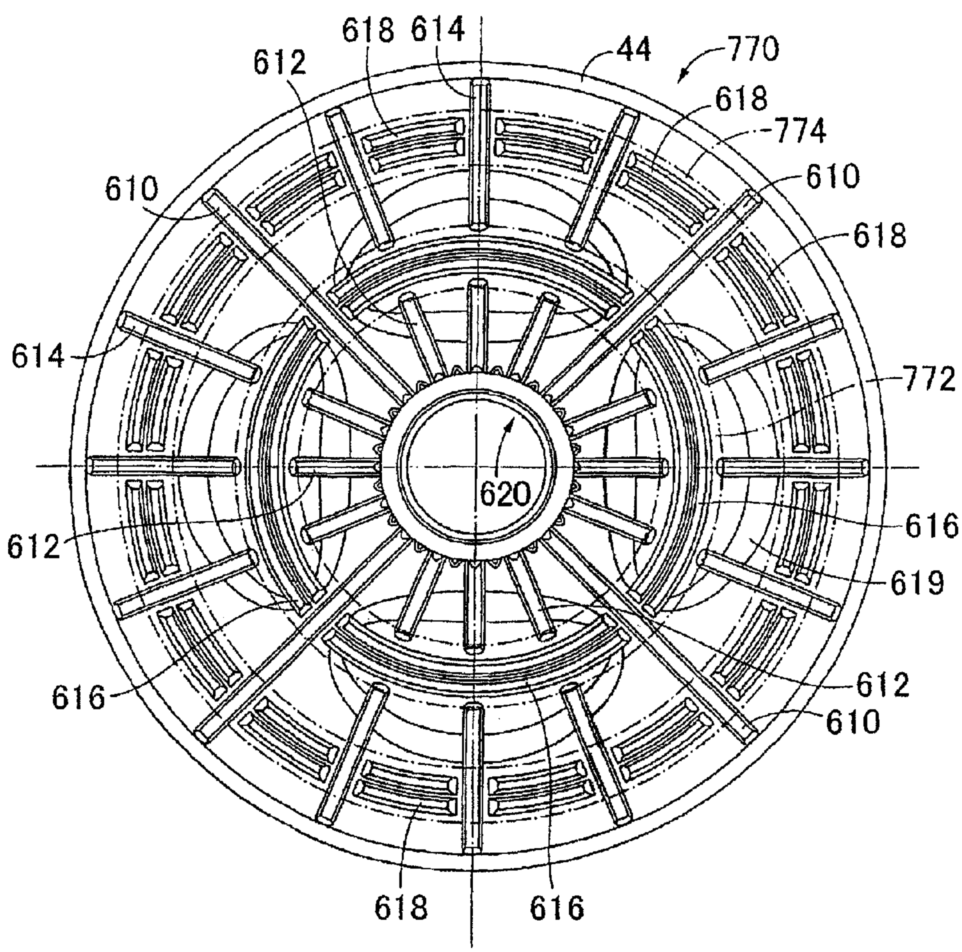
FIG. 36 is a front view of a cover main body of a wheel cover according to a nineteenth example embodiment of the invention.

The entire cover main body does not necessarily have to be formed with the same material. That is, a portion of the cover main body, may be formed with material that is different from the material of other portions. For example, as shown in FIG. 36, a portion 772 that includes the middle arc-shaped bead 616 that extends in the circumferential direction of a cover main body 770, and a portion 774 that includes the outer peripheral side arc-shaped bead 618 may be formed with material having a smaller thermal expansion coefficient than the other portions. The portion 772 that includes the middle arc-shaped bead 616, and the portion 774 that includes the outer peripheral side arc-shaped bead 618 and the like will elastically deform easier than the other portions, and easily deform by heat. Thus, by forming the portion 772 that includes the middle arc-shaped bead 616, and the portion 774 that includes the outer peripheral side arc-shaped bead 618 and the like with material that does not easily thermally expand, deformation of the cover main body 770 due to heat can be reduced, so the cover main body 770 is able to remain well attached to the wheel 10. Also, as a result, contact between the outer peripheral edge 44 and the tire 14 can be well maintained, so relative rotation of the cover main body 770 with respect to the wheel 10 is able to be well inhibited. Material with a small thermal expansion coefficient also includes material having a thermal expansion coefficient that is a negative value. If this kind of material is used, the dimensional stability with respect to heat is able to be improved, so deformation due to heat can be better inhibited. Also, the entire cover main body 770 may also be formed with material having a small thermal expansion coefficient.

Twentieth Example Embodiment

Figures 37A, 37B:
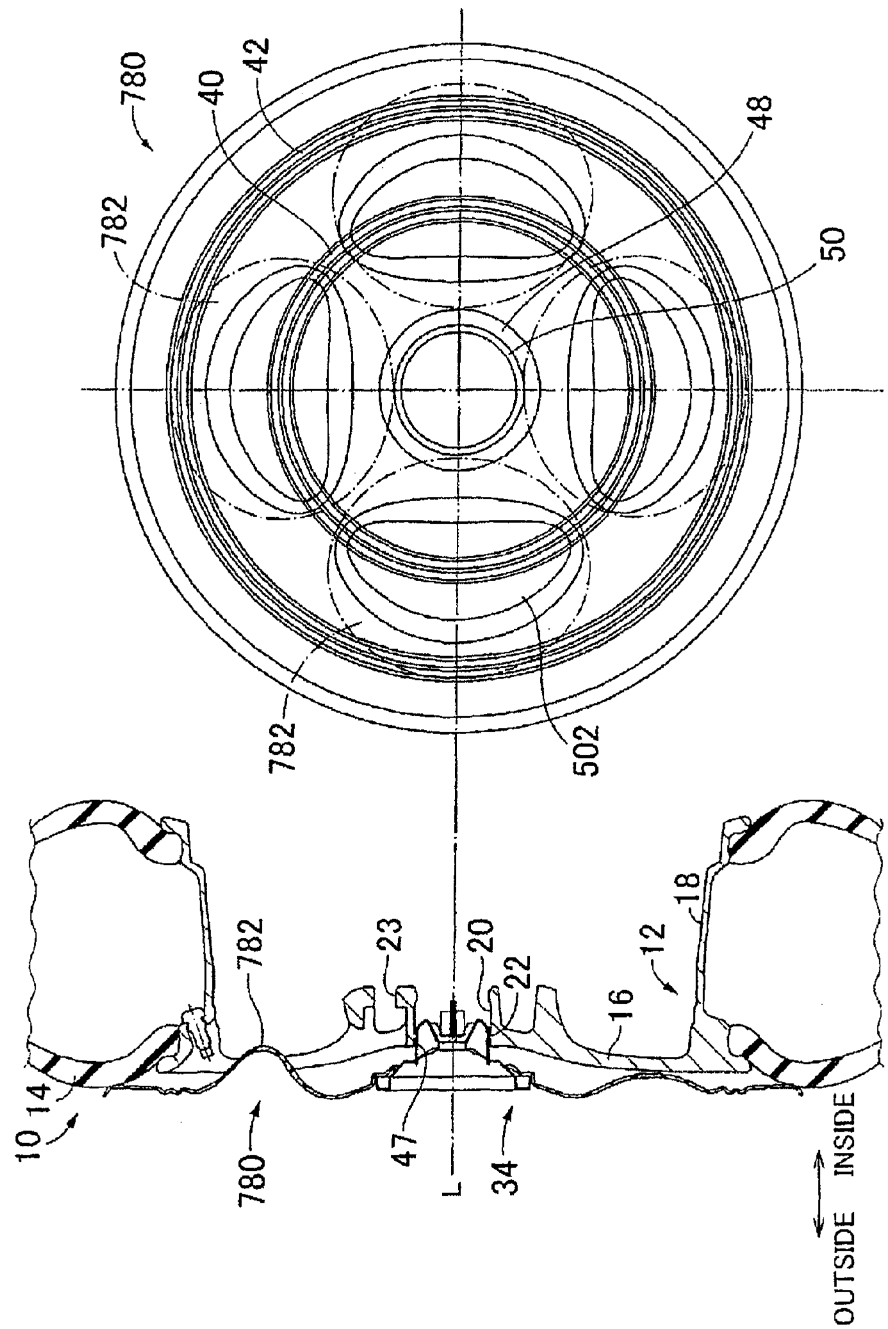
FIG. 37A is a sectional view of a wheel cover according to a twentieth example embodiment of the invention attached to a wheel.
FIG. 37B is a front view of a cover main body of the wheel cover according to the twentieth example embodiment.

In this example embodiment, a relative rotation inhibiting portion that inhibits relative rotation of the cover main body with respect to the wheel 10 is provided on the cover main body. FIGS. 37A and 37B are views of an example of the relative rotation inhibiting portion. A plurality of depressions 782 that protrude to the inside are provided with gaps therebetween in the circumferential direction, on a middle portion of a cover main body 780. The depressions 782 are shaped and sized to be able to fit into the gaps between adjacent spokes 24, as shown in FIGS. 2A and 2B. When a portion of the cover main body 780 is set into the gaps between the spokes 24, relative rotation of the cover main body 780 with respect to the wheel 10 is able to be inhibited, so sliding contact between the outer surface of the tire 14 and the cover main body 780 is able to be inhibited. Also, the cover main body 780 can be attached to the wheel 10 before being connected to the center attaching portion 602. Therefore, by inserting the center attaching portion 602 into the ornament receiving hole 20 after the cover main body 780 is attached to the wheel 10, the cover main body 780 is able to be attached to the wheel 10 at the same time that the center attaching portion 602 is connected to the cover main body 780. The shape of the wheel 10 differs depending on the type of vehicle, so the positions of the spokes 24 also differ. However, if a plurality of depressions 782 are provided in the circumferential direction, there will be at least one depression 782 in which the relative position matches (i.e., is aligned with) a gap between the spokes 24. Therefore, the depression 782 that matches this relative position need simply be inserted into the gap. In this example embodiment, the depressions 782 and the gaps between spokes of the wheel 10 and the like may be regarded as forming the relative rotation inhibiting portion.

Twenty-First Example Embodiment

Figures 38A, 38B:
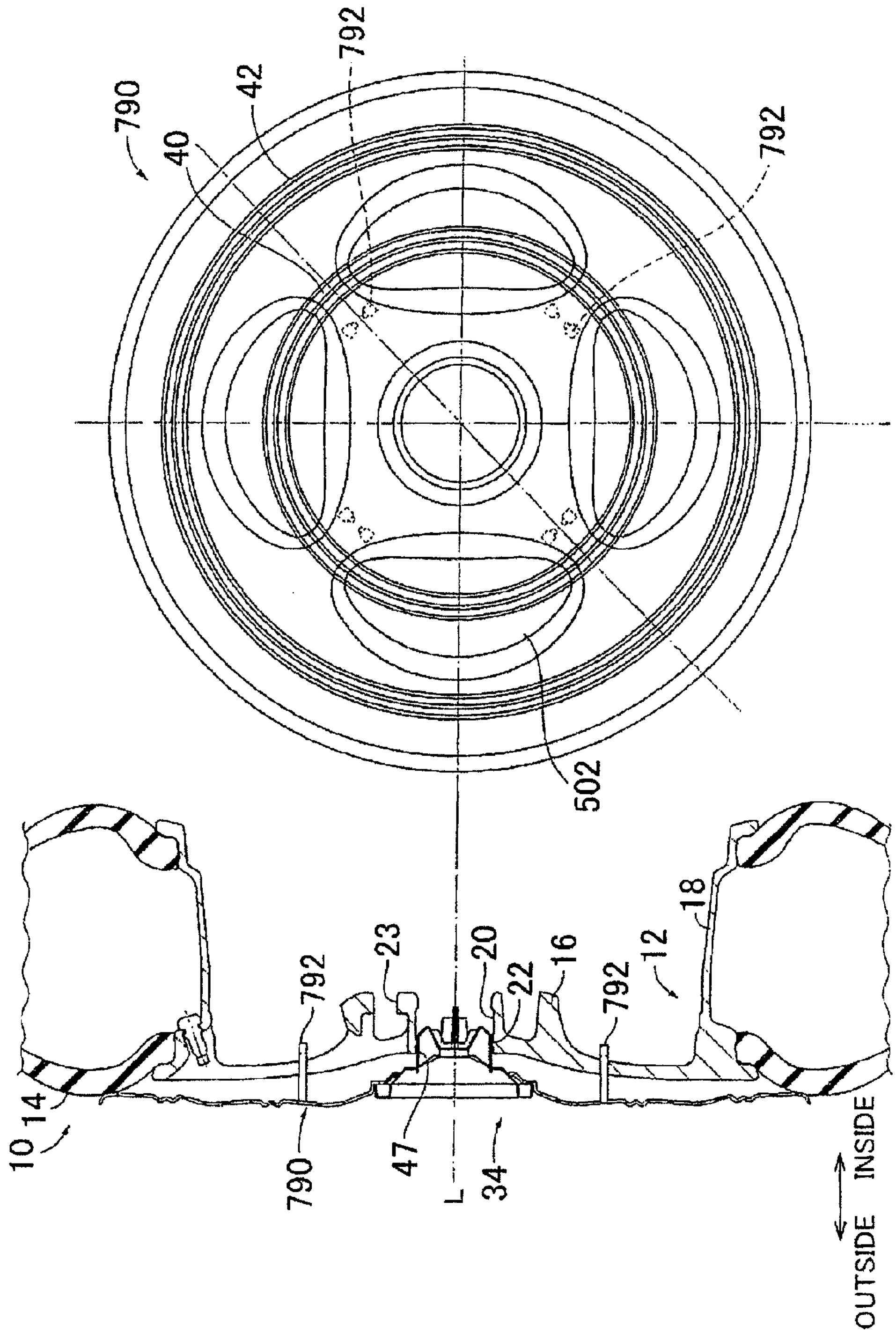
FIG. 38A is a sectional view of a wheel cover according to a twenty-first example embodiment of the invention attached to a wheel.
FIG. 38B is a front view of a cover main body of the wheel cover according to the twenty-first example embodiment.

FIGS. 38A and 38B are views of another example of a relative rotation inhibiting portion. In a twenty-first example embodiment, a plurality of pairs of hook-shaped protruding portions 792 are provided on an inside surface of a middle portion of a cover main body 790. Attaching the cover main body 790 to the wheel 10 with the hook-shaped protruding portions 792 caught on both sides of one spoke 24 enables relative rotation between the wheel 10 and the cover main body 790 to be inhibited. In this example embodiment, the protruding portions 792 and the spokes 24 and the like form the relative rotation inhibiting portion. It should be noted that instead of the pairs of hook-shaped protruding portions 792, generally U-shaped hooks may also be used. Also, the invention is not limited to hook-shaped protruding portions. For example, a plurality of protruding portions that are able to engage with the spokes 24 at side surfaces thereof in the circumferential direction (i.e., the direction of relative rotation) may also be provided. If the protruding portions are arranged, in a state in which they are able to engage with the side surfaces of the spokes 24, in the gaps between the spokes 24, relative rotation between the cover main body 790 and the wheel 10 in the forward and reverse directions of the vehicle can be inhibited by the protruding portions abutting against the side surfaces of the spokes 24.

Twenty-Second Example Embodiment

Figure 39:
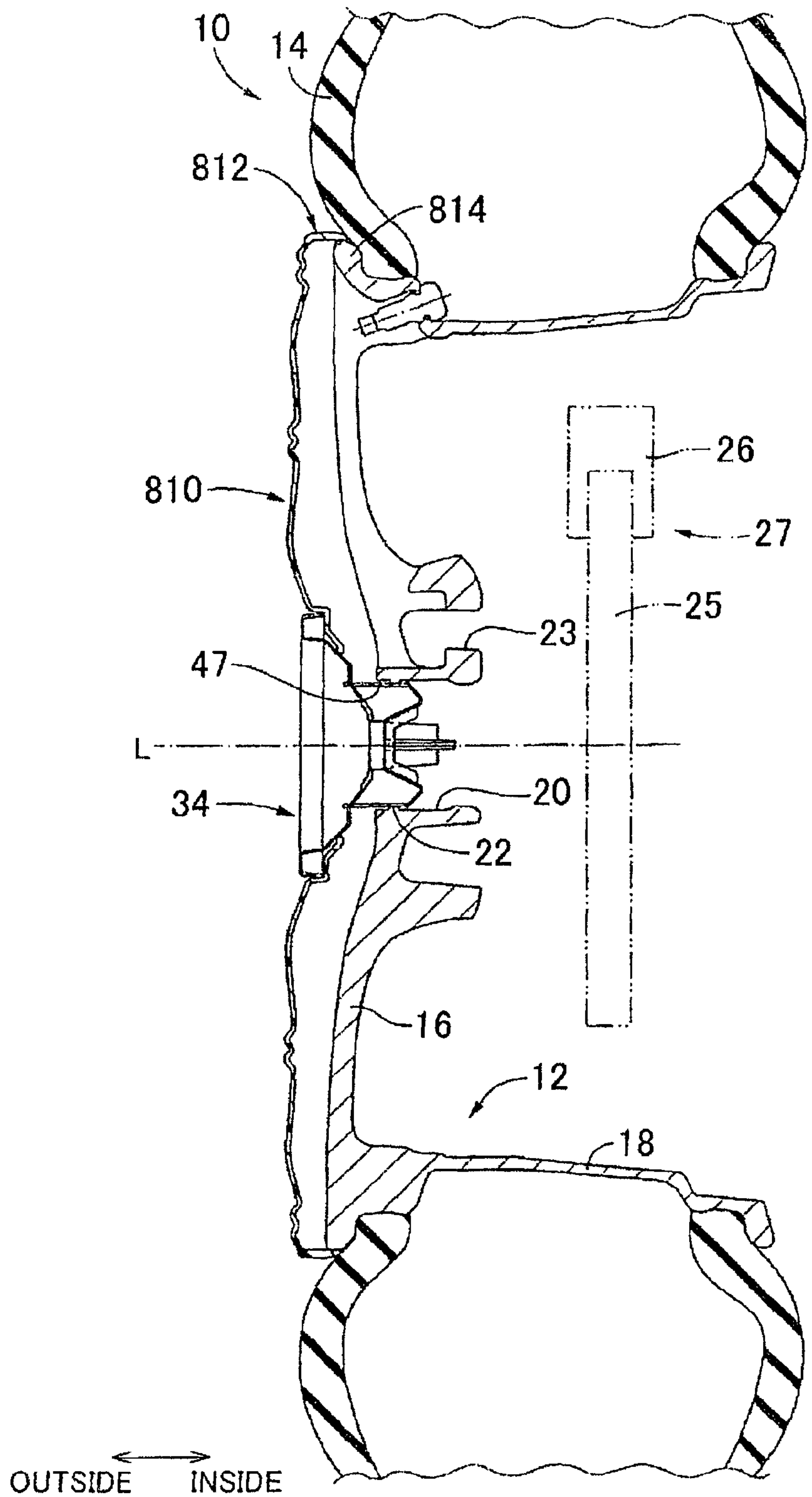
FIG. 39 is a sectional view of a wheel cover according to a twenty-second example embodiment of the invention attached to a wheel.

FIG. 39 is a view of yet another example of a relative rotation inhibiting portion. In a cover main body 810, an outer peripheral edge portion 812 is bent inward in the direction parallel to the axis L, to be a cylindrical engaging protruding portion. The cover main body 810 is attached to the wheel 10 by this cylindrical engaging protruding portion 812 catching on an outer peripheral end portion 814 of the disc portion 16 (or the rim 18) of the wheel 10. As a result, relative rotation between the cover main body 810 and the wheel 10 is inhibited. In this example embodiment, the outer peripheral edge portion 812 and the outer peripheral end portion 814 and the like form the relative rotation inhibiting portion.

Twenty-Third Example Embodiment

Figure 40A:
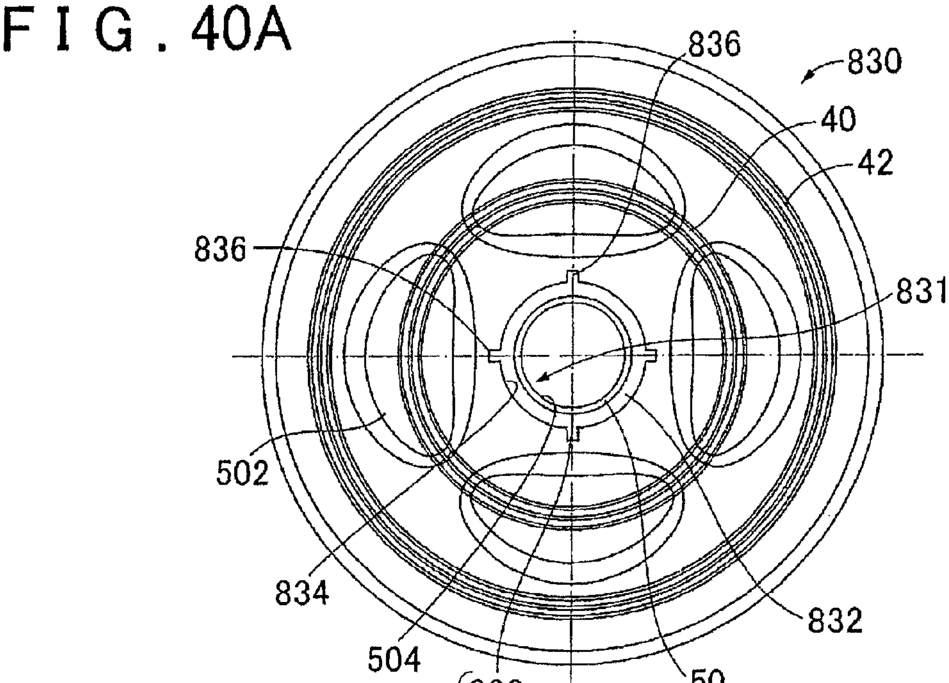
FIG. 40A is a front view of a cover main body of a wheel cover according to a twenty-third example embodiment of the invention.
Figure 40B:
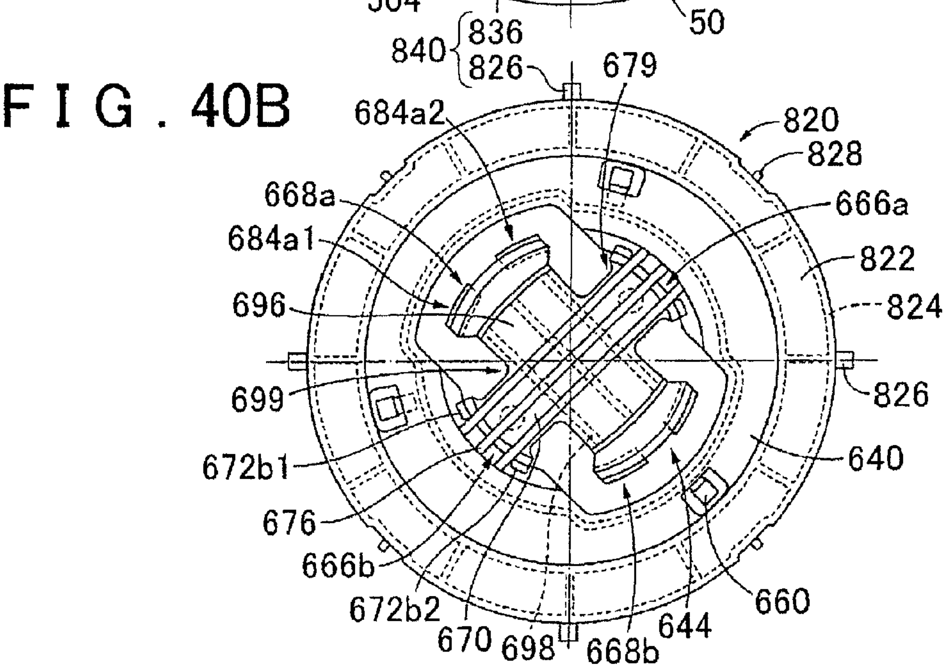
FIG. 40B is a plan view of a cover attaching portion of the wheel cover according to the twenty-third example embodiment.

FIGS. 40A and 40B are views of still another example of a relative rotation inhibiting portion. In a twenty-third example embodiment, relative rotation between a cover main body and the wheel 10 is inhibited by inhibiting relative rotation between the cover main body and a center attaching portion. At least one rotation preventing protruding portion 826 that protrudes outward is provided on an outer peripheral wall portion 824 of a pressure apply portion 822 of a center attaching portion 820. In this example embodiment, the radially protruding amount of the rotation preventing protruding portion 826 is larger than that of a rattling preventing protruding portion 828, and four of these rotation preventing protruding portions 826 are provided in positions separated from each other by center angles of 90°. Meanwhile, at least one rotation preventing recessed portion 836 with which the rotation preventing protruding portion 826 is able to engage is provided on a stepped portion 834 on the outer peripheral side of a flat surface portion 832 of a connectable portion 831 of a cover main body 830. In this example embodiment, four of these rotation preventing recessed portions 836 are provided in positions separated by center angles of 90°, corresponding to the rotation preventing protruding portions 826. Also, the center attaching portion 820 connects to the cover main body 830 with the rotation preventing protruding portions 826 fit into the rotation preventing recessed portions 836. As a result, relative rotation between the cover main body 830 and the center attaching portion 820 is able to be inhibited. In this twenty-third example embodiment, the rotation preventing protruding portion 826 and the rotation preventing recessed portion 836 and the like form a relative rotation inhibiting portion 840.

The center attaching portion 820 has the friction surfaces 684*a*1, 684*a*2, 684*b*1, and 684*b*2, and 672*a*1, 672*a*2, 672*b*1, and 672*b*2 that abut against the inner peripheral surface 21 of the ornament receiving hole 20 of the wheel 10, so it will not rotate relative to the wheel 10 as easily the cover main body 830 will. Therefore, at times such as when the vehicle is running under its own power, or when vibration while the vehicle is being transported is applied, even if force in a direction that tries to make the cover main body 830 rotate relative to the wheel 10 is applied to the cover main body 830, that force is received at the center attaching portion 820. Relative rotation of the cover main body 830 with respect to the wheel 10 is inhibited, so sliding contact between the cover main body 830 and the tire 14 is inhibited. The structure of the relative rotation inhibiting portion 840 (that may also be referred to as a "unified rotation allowing portion") that inhibits its relative rotation between the cover main body and the center attaching portion is not limited to this. The relative rotation inhibiting portion 840 according to this example embodiment may also be regarded as a portion of the cover/attaching portion connecting portion.

Twenty-Fourth Example Embodiment

Figure 41:
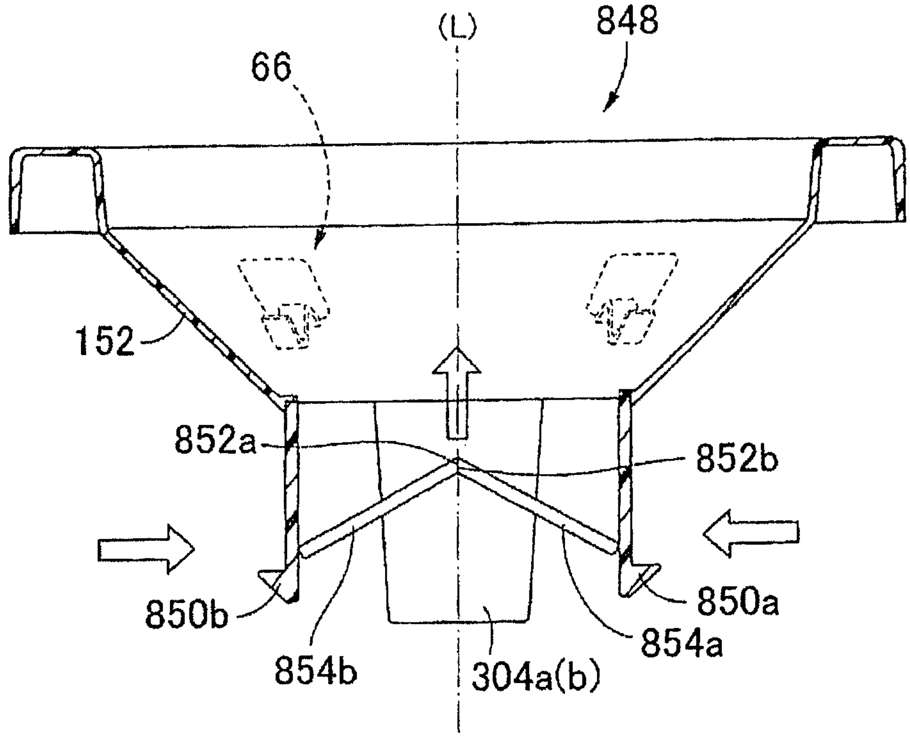
FIG. 41 is a front sectional view of a cover attaching portion of a wheel cover according to a twenty-fourth example embodiment of the invention.

The center attaching portion may be structured as shown in FIG. 41. In a center attaching portion 848, brace members 854*a* and 854*b* that have opposable abutting surfaces 852*a* and 852*b* are provided on inner peripheral surfaces of a pair of engaging members 850*a* and 850*b*. The brace members 854*a* and 854*b* are provided slanted on the pair of engaging members 850*a* and 850*b*, as shown in the drawing. Also, the brace members 854*a* and 854*b* are formed by spring members or the like, for example, and are able to elastically deform (i.e., able to bend) when force of equal to or greater than a set value is applied. When the center attaching portion 848 is inserted into the ornament receiving hole 20, the abutting surfaces 852*a* and 852*b* of the pair of brace members 854*a* and 854*b* abut against each other. As a result, even if force that tries to bring the pair of engaging members 850*a* and 850*b* closer together is applied, sliding contact between the abutting surfaces is inhibited, such that the engaging members 850*a* and 850*b* are inhibited from coming closer together, by friction force acting between the abutting surfaces 852*a* and 852*b*. Also, when force of equal to or greater than the set value is applied in the radial direction, (i.e., when a worker applies force that brings to two closer together, the abutting surfaces slidably contact one another, such that the pair of engaging members 850*a* and 850*b* are brought closer together, and engaging protruding portions 858*a* and 858*b* are disengaged from the engageable protruding portion 22.

As described above, in this example embodiment, as long as a large force in the radial direction is not applied to the center attaching portion 848, the pair of engaging members 850*a* and 850*b* will not come closer together. Therefore, even if force in the radial direction is mistakenly applied to the engaging members 850*a* and 850*b* when the center attaching portion 848 is attached, the engaging members 850*a* and 850*b* will not easily come closer together, so a good engagement state can be maintained.

As described above, a plurality of example embodiments of the invention have been described, but the invention may also be carried out by combining these example embodiments together. Also, the invention may also be carried out by combining parts of a plurality of example embodiments, or applying a portion of one example embodiment to another example embodiment, or the like. Furthermore, the invention may be carried out in modes that have been modified or improved in any of a variety of ways based on the knowledge of one skilled in the art, in addition to the modes of the foregoing example embodiments.

The invention claimed is:

1. A wheel cover that covers at least a portion of an outside of a wheel, comprising:

a cover main body that has an annular shape; and a cover attaching portion that attaches the cover main body to the wheel by being attached to the wheel on an inner peripheral side of the cover main body, wherein the cover attaching portion includes a) a plurality of engaging members, each of which has an engaging portion that selectively engages with an engagable portion of the wheel, the plurality of engaging members extending in a direction that includes a component of a direction parallel to an axis of the cover attaching portion, and b) an engaging member retaining portion that holds the plurality of engaging members to the cover attaching portion at the other end portion of each of the engaging members, in a state where the engaging portion of each of the engaging members is separated from the engagable portion of the wheel when force in a direction intersecting the axis is applied to one end portion of each of the plurality of engaging members, wherein the cover attaching portion includes at least one guide member that extends in a direction parallel to the axis;

the cover attaching portion is inserted into an insertion hole of the wheel provided along a center axis of the wheel;

the at least one guide member includes a) a guide portion main body, and b) a force receiving portion that is provided protruding radially outward on the guide portion main body, and that has an abutting surface that abuts against an inner peripheral surface of the insertion hole, when the cover attaching portion is inserted into the insertion hole; and the cover main body and the cover attaching portion are two distinct elements.

2. The wheel cover according to claim 1, wherein:

the engagable portion of the wheel includes an engagable protruding portion provided on an inner peripheral surface of an insertion hole provided along a center axis of the wheel;

the cover attaching portion is a center attaching portion that attaches the cover main body to the wheel by being inserted into the insertion hole; and the plurality of engaging members each has an engaging protruding portion as the engaging portion provided in a state opposing at least a portion of the engagable protruding portion.

3. The wheel cover according to claim 2, wherein:

each of the plurality of engaging members has a shape that extends parallel to the axis, and the engaging members are provided separated from each other in a circumferential direction; and the engaging member retaining portion holds the plurality of engaging members to the cover attaching portion at the other end portion, on an inner peripheral side of the plurality of engaging members, and is a rigid retaining portion that forms a structure that is harder to deform in a radial direction of the cover attaching portion than the plurality of engaging members are.

4. The wheel cover according to claim 2, wherein:

the center attaching portion has a pair of the engaging members that oppose each other;

the pair of engaging members each has a curved shape;

the one end portion is positioned to an inner peripheral side of the other end portion; and the engaging member retaining portion retains the pair of engaging members at the other end portion.

5. The wheel cover according to claim 1, wherein each of the plurality of engaging members includes at least two engaging protruding portions provided separated by a gap in a circumferential direction, the engaging protruding portion serving as the engaging portion.

6. The wheel cover according to claim 5, wherein:

each of the plurality of engaging members includes a pair of the engaging protruding portions; and each of the pair of engaging protruding portions has a shape in which, on an outer peripheral edge of the engaging protruding portions, a distance, from the axis, of an end portion on a side opposite a side where the pair of engaging protruding portions are close together is greater than a distance, from the axis, of an end portion on the side where the pair of engaging protruding portions are close together.

7. The wheel cover according to claim 1, wherein:

the engagable portion of the wheel includes an engagable protruding portion provided on an inner peripheral surface of an insertion hole provided along a center axis of the wheel; and each of the plurality of engaging members includes i) an engaging protruding portion that selectively engages with the engagable protruding portion, and ii) an abutting surface that abuts against the inner peripheral surface.

8. The wheel cover according to claim 7, wherein the at least one guide member includes a sloped surface that is sloped in a direction extending farther radially outward toward an outside of the wheel, when the wheel cover is attached to the wheel.

9. The wheel cover according to claim 1, wherein the cover attaching portion includes i) a plurality of the guide members, ii) a guide connecting member that connects the plurality of guide members together, and iii) a reinforcing member that is provided on the guide connecting member and inhibits deformation in a radial direction of the cover attaching portion.

10. The wheel cover according to claim 1, wherein:

the wheel includes a tire, and a tire retaining portion that retains the tire; and the cover main body has a shape that abuts against the tire when the cover main body is attached to the wheel by the cover attaching portion.

11. The wheel cover according to claim 10, wherein an outer peripheral edge of the cover main body has a curved portion that abuts against the tire.

12. The wheel cover according to claim 1, wherein the cover main body includes at least one depression formed in a middle portion in a radial direction of the cover main body, and an annular concavo-convex portion provided on an outer peripheral side of the at least one depression.

13. The wheel cover according to claim 12, wherein the annular concavo-convex portion is provided on the outer peripheral side of a position that is ⅓ a length in the radial direction of the cover main body from the outer peripheral edge of the cover main body.

14. The wheel cover according to claim 1, wherein the cover main body includes a plurality of linear concavo-convex portions that extend in a radial direction of the cover main body.

15. The wheel cover according to claim 14, wherein the cover main body includes a plurality of arc-shaped concavo-convex portions, each provided aligned in a circumferential direction, between the plurality of linear concavo-convex portions that extend in the radial direction of the cover main body.

16. The wheel cover according to claim 1, wherein:

the cover main body includes i) a plurality of inner peripheral side short concavo-convex portions that extend linearly in a radial direction of the cover main body, from an inner peripheral portion to a middle portion, and ii) a plurality of outer peripheral side short concavo-convex portions that extend linearly in the radial direction of the cover main body, from the middle portion to an outer peripheral portion; and the number of the outer peripheral side short concavo-convex portions is equal to or less than the number of the inner peripheral side short concavo-convex portions, and the outer peripheral side short concavo-convex portions and the inner peripheral side short concavo-convex portions are provided in the same phase.

17. The wheel cover according to claim 1, wherein the wheel cover includes a relative rotation inhibiting portion that inhibits relative rotation between the cover main body and the wheel.

18. The wheel cover according to claim 1, wherein the wheel cover includes a cover/attaching portion connecting portion that connects the cover main body and the cover attaching portion together.

19. The wheel cover according to claim 18, wherein:

the cover/attaching portion connecting portion includes a plurality of connecting pawls that are provided on an outer peripheral surface of the cover attaching portion and protrude radially outward; and the cover main body is connected to the cover attaching portion by the plurality of connecting pawls being caught on an inner peripheral edge portion of the cover main body.

20. The wheel cover according to claim 1, wherein each of the plurality of engaging members includes an engaging member main body that retains the engaging portion, and the engaging portion is formed with material having a larger friction coefficient than the engaging member main body.

21. The wheel cover according to claim 1, wherein each of the plurality of engaging members includes plurality of engaging protruding portions having a different protrusion amount in a radial direction of the cover attaching portion and being separated at intervals in a direction of the axis from each other, the engaging protruding portion serving as the engaging portion.

* * * * *